(12) United States Patent
Chen et al.

(10) Patent No.: US 12,510,738 B2
(45) Date of Patent: Dec. 30, 2025

(54) OPTICAL PHOTOGRAPHING LENS ASSEMBLY, IMAGE CAPTURING UNIT AND ELECTRONIC DEVICE

(71) Applicant: LARGAN PRECISION CO., LTD., Taichung (TW)

(72) Inventors: Po-Wei Chen, Taichung (TW); Kuan-Ting Yeh, Taichung (TW); Cheng-Yu Tsai, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 329 days.

(21) Appl. No.: 18/232,733

(22) Filed: Aug. 10, 2023

(65) Prior Publication Data

US 2025/0004248 A1 Jan. 2, 2025

(30) Foreign Application Priority Data

Jun. 30, 2023 (TW) .................. 112124619

(51) Int. Cl.
*G02B 13/00* (2006.01)
*G02B 9/62* (2006.01)

(52) U.S. Cl.
CPC .......... *G02B 13/0045* (2013.01); *G02B 9/62* (2013.01)

(58) Field of Classification Search
CPC ........ G02B 9/62; G02B 9/64; G02B 13/0045; G02B 13/0015; G02B 13/16; G02B 13/18; G02B 27/0025; G02B 27/0012; G02B 27/0172; G02B 15/146; H04N 5/222; H04N 5/2254

USPC ......... 359/656–658, 708, 713, 749, 756–762
See application file for complete search history.

(56) References Cited

U.S. PATENT DOCUMENTS

| | | | |
|---|---|---|---|
| 8,335,043 B2 | 12/2012 | Huang | |
| 9,557,531 B2 | 1/2017 | Nishihata et al. | |
| 9,857,563 B2 | 1/2018 | Liao et al. | |
| 10,678,021 B2 | 6/2020 | Sekine et al. | |
| 11,079,570 B2 | 8/2021 | Chen | |
| 11,215,798 B2 | 1/2022 | Lin et al. | |
| 11,262,543 B2 | 3/2022 | Nitta et al. | |
| 2014/0071543 A1 | 3/2014 | Shinohara | |

(Continued)

FOREIGN PATENT DOCUMENTS

| | | |
|---|---|---|
| CN | 204241750 U | 4/2015 |
| CN | 106646833 A | 5/2017 |

(Continued)

*Primary Examiner* — Travis S Fissel
(74) *Attorney, Agent, or Firm* — Maschoff Brennan

(57) ABSTRACT

An optical photographing lens assembly includes six lens elements which are, in order from an object side to an image side along an optical path, a first lens element, a second lens element, a third lens element, a fourth lens element, a fifth lens element, and a sixth lens element. Each of the six lens elements has an object-side surface facing toward the object side and an image-side surface facing toward the image side. The first lens element has positive refractive power. The fourth lens element has positive refractive power. The image-side surface of the fourth lens element is convex in a paraxial region thereof. The image-side surface of the fifth lens element is concave in a paraxial region thereof. The sixth lens element has negative refractive power. The object-side surface of the sixth lens element is convex in a paraxial region thereof.

30 Claims, 32 Drawing Sheets

(56) References Cited

U.S. PATENT DOCUMENTS

2014/0355134 A1* 12/2014 Sekine ............... G02B 27/0025
                                                    359/713
2015/0109685 A1   4/2015  Shinohara et al.
2016/0116715 A1   4/2016  Ota
2016/0124192 A1   5/2016  Koreeda
2016/0216484 A1   7/2016  Chen et al.
2017/0153422 A1   6/2017  Tang et al.
2017/0153423 A1   6/2017  Tang et al.
2017/0315333 A1  11/2017  Hsu et al.
2022/0179177 A1   6/2022  Huang et al.
2022/0326485 A1  10/2022  Ikemori et al.

FOREIGN PATENT DOCUMENTS

| CN | 107065136 A   |  8/2017 |
| CN | 107121761 A   |  9/2017 |
| CN | 108345092 A   |  7/2018 |
| CN | 109581625 A   |  4/2019 |
| CN | 211741695 U   | 10/2020 |
| CN | 113866961 A   | 12/2021 |
| CN | 113946032 A   |  1/2022 |
| CN | 114114640 A   |  3/2022 |
| CN | 216526486 U   |  5/2022 |
| CN | 114637096 A   |  6/2022 |
| CN | 217181317 U   |  8/2022 |
| CN | 217932241 U   | 11/2022 |
| CN | 218481694 U   |  2/2023 |
| JP | 2020-012925 A |  1/2020 |
| WO | 2013/145547 A1| 10/2013 |
| WO | 2014/006822 A1|  1/2014 |

* cited by examiner

OPTICAL PHOTOGRAPHING LENS ASSEMBLY, IMAGE CAPTURING UNIT AND ELECTRONIC DEVICE

RELATED APPLICATIONS

This application claims priority to Taiwan Application 112124619, filed on Jun. 30, 2023, which is incorporated by reference herein in its entirety.

BACKGROUND

Technical Field

The present disclosure relates to an optical photographing lens assembly, an image capturing unit and an electronic device, more particularly to an optical photographing lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an optical photographing lens assembly includes six lens elements. The six lens elements are, in order from an object side to an image side along an optical path, a first lens element, a second lens element, a third lens element, a fourth lens element, a fifth lens element and a sixth lens element. Each of the six lens elements has an object-side surface facing toward the object side and an image-side surface facing toward the image side.

Preferably, the first lens element has positive refractive power. Preferably, the fourth lens element has positive refractive power. Preferably, the image-side surface of the fourth lens element is convex in a paraxial region thereof. Preferably, the object-side surface of the fifth lens element has at least one concave critical point in an off-axis region thereof. Preferably, the image-side surface of the fifth lens element is concave in a paraxial region thereof. Preferably, the sixth lens element has negative refractive power. Preferably, the object-side surface of the sixth lens element is convex in a paraxial region thereof. Preferably, the optical photographing lens assembly further includes an aperture stop.

When an axial distance between the first lens element and the second lens element is T12, an axial distance between the second lens element and the third lens element is T23, a central thickness of the first lens element is CT1, a central thickness of the fourth lens element is CT4, a minimum value among Abbe numbers of all lens elements of the optical photographing lens assembly is Vmin, a focal length of the optical photographing lens assembly is f, a focal length of the second lens element is f2, a focal length of the fourth lens element is f4, and an axial distance between the aperture stop and the image-side surface of the sixth lens element is SD, the following conditions are preferably satisfied:

$$0 < 10 \times T23/CT1 < 3.20;$$

$$10.0 < V\text{min} < 21.5;$$

$$-0.90 < f4/f2 < 0.15;$$

$$0.10 < (CT4T12)/CT1 < 0.50; \text{ and}$$

$$0.85 < SD/f < 1.50.$$

According to another aspect of the present disclosure, an optical photographing lens assembly includes six lens elements. The six lens elements are, in order from an object side to an image side along an optical path, a first lens element, a second lens element, a third lens element, a fourth lens element, a fifth lens element and a sixth lens element. Each of the six lens elements has an object-side surface facing toward the object side and an image-side surface facing toward the image side.

Preferably, the first lens element has positive refractive power. Preferably, the fourth lens element has positive refractive power. Preferably, the image-side surface of the fourth lens element is convex in a paraxial region thereof. Preferably, the image-side surface of the fifth lens element is concave in a paraxial region thereof. Preferably, the sixth lens element has negative refractive power. Preferably, the object-side surface of the sixth lens element is convex in a paraxial region thereof. Preferably, the optical photographing lens assembly further includes an aperture stop. Preferably, the aperture stop is disposed between an imaged object and the first lens element.

When a focal length of the optical photographing lens assembly is f, a focal length of the second lens element is f2, a focal length of the fourth lens element is f4, a focal length of the fifth lens element is f5, a focal length of the sixth lens element is f6, an axial distance between the second lens element and the third lens element is T23, a central thickness of the first lens element is CT1, a central thickness of the fourth lens element is CT4, a minimum value among Abbe numbers of all lens elements of the optical photographing lens assembly is Vmin, an Abbe number of the second lens element is V2, and an Abbe number of the third lens element is V3, the following conditions are preferably satisfied:

$$0 < (|f/f2| + |f/f5|)/|f/f4| < 1.60;$$

$$0 < 10 \times T23/CT1 < 3.00;$$

$$10.0 < V\text{min} < 20.5;$$

$$0.01 < CT4/CT1 < 0.85;$$

$$-2.00 < f/f6 < -0.36; \text{ and}$$

$$0.01 < V2/V3 < 0.90.$$

According to another aspect of the present disclosure, an optical photographing lens assembly includes six lens elements. The six lens elements are, in order from an object side to an image side along an optical path, a first lens element, a second lens element, a third lens element, a fourth lens element, a fifth lens element and a sixth lens element. Each of the six lens elements has an object-side surface facing toward the object side and an image-side surface facing toward the image side.

Preferably, the first lens element has positive refractive power. Preferably, the second lens element has negative refractive power. Preferably, the fourth lens element has positive refractive power. Preferably, the image-side surface of the fourth lens element is convex in a paraxial region thereof. Preferably, the image-side surface of the fifth lens element is concave in a paraxial region thereof. Preferably, the sixth lens element has negative refractive power. Preferably, the object-side surface of the sixth lens element is convex in a paraxial region thereof. Preferably, the optical photographing lens assembly further includes an aperture stop. Preferably, the aperture stop is disposed between an imaged object and the first lens element.

When a focal length of the optical photographing lens assembly is f, a focal length of the second lens element is f2, a focal length of the fourth lens element is f4, a focal length of the fifth lens element is f5, a minimum value among Abbe numbers of all lens elements of the optical photographing lens assembly is Vmin, a central thickness of the first lens element is CT1, a central thickness of the fourth lens element is CT4, an axial distance between the first lens element and the second lens element is T12, an axial distance between the second lens element and the third lens element is T23, an axial distance between the third lens element and the fourth lens element is T34, an axial distance between the fifth lens element and the sixth lens element is T56, a curvature radius of the image-side surface of the fifth lens element is R10, and a curvature radius of the object-side surface of the sixth lens element is R11, the following conditions are preferably satisfied:

$$0 < (|f/f2| + |f/f5|)/|f/f4| < 1.60;$$

$$10.0 < V\text{min} < 20.5;$$

$$0.10 < (CT4T12)/CT1 < 0.50;$$

$$0.10 < R11/R10 < 1.50;$$

$$0.30 < T12/T34 < 2.00; \text{ and}$$

$$0.01 < (T23 + T56)/CT1 < 1.00.$$

According to another aspect of the present disclosure, an image capturing unit includes one of the aforementioned optical photographing lens assemblies and an image sensor, wherein the image sensor is disposed on an image surface of the optical photographing lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An optical photographing lens assembly includes six lens elements. The six lens elements are, in order from an object side to an image side along an optical path, a first lens element, a second lens element, a third lens element, a fourth lens element, a fifth lens element and a sixth lens element. Each of the six lens elements of the optical photographing lens assembly has an object-side surface facing toward the object side and an image-side surface facing toward the image side.

The first lens element has positive refractive power. Therefore, it is favorable for light rays convergence so as to reduce the size of the optical photographing lens assembly.

The second lens element can have negative refractive power. Therefore, it is favorable for correcting aberrations, such as spherical aberration and coma generated due to miniaturization of the optical photographing lens assembly.

The object-side surface of the third lens element can be convex in a paraxial region thereof. Therefore, it is favorable for adjusting the traveling direction of light so as to enlarge an image surface.

The fourth lens element has positive refractive power. Therefore, it is favorable for converging light to effectively adjust light traveling direction, thereby reducing a back focal length. The image-side surface of the fourth lens element is convex in a paraxial region thereof. Therefore, it is favorable for adjusting the traveling direction of emergent light at the fourth lens element so as to enhance illuminance.

The object-side surface of the fifth lens element can be convex in a paraxial region thereof. Therefore, it is favorable for adjusting the lens shape as well as the refractive power of the fifth lens element so as to reduce the size of the optical photographing lens assembly and correct distortion. The image-side surface of the fifth lens element is concave in a paraxial region thereof. Therefore, it is favorable for adjusting the lens shape of the image-side surface of the fifth lens element so as to reduce light spot at the central field of view.

The sixth lens element has negative refractive power. Therefore, it is favorable for effectively adjusting the back focal length so as to prevent an overly long total track length of the optical photographing lens assembly. The object-side surface of the sixth lens element is convex in a paraxial region thereof. Therefore, it is favorable for adjusting the incident angle of light onto the image surface so as to maintain brightness at the peripheral image and correct off-axis aberrations.

Figure 28:
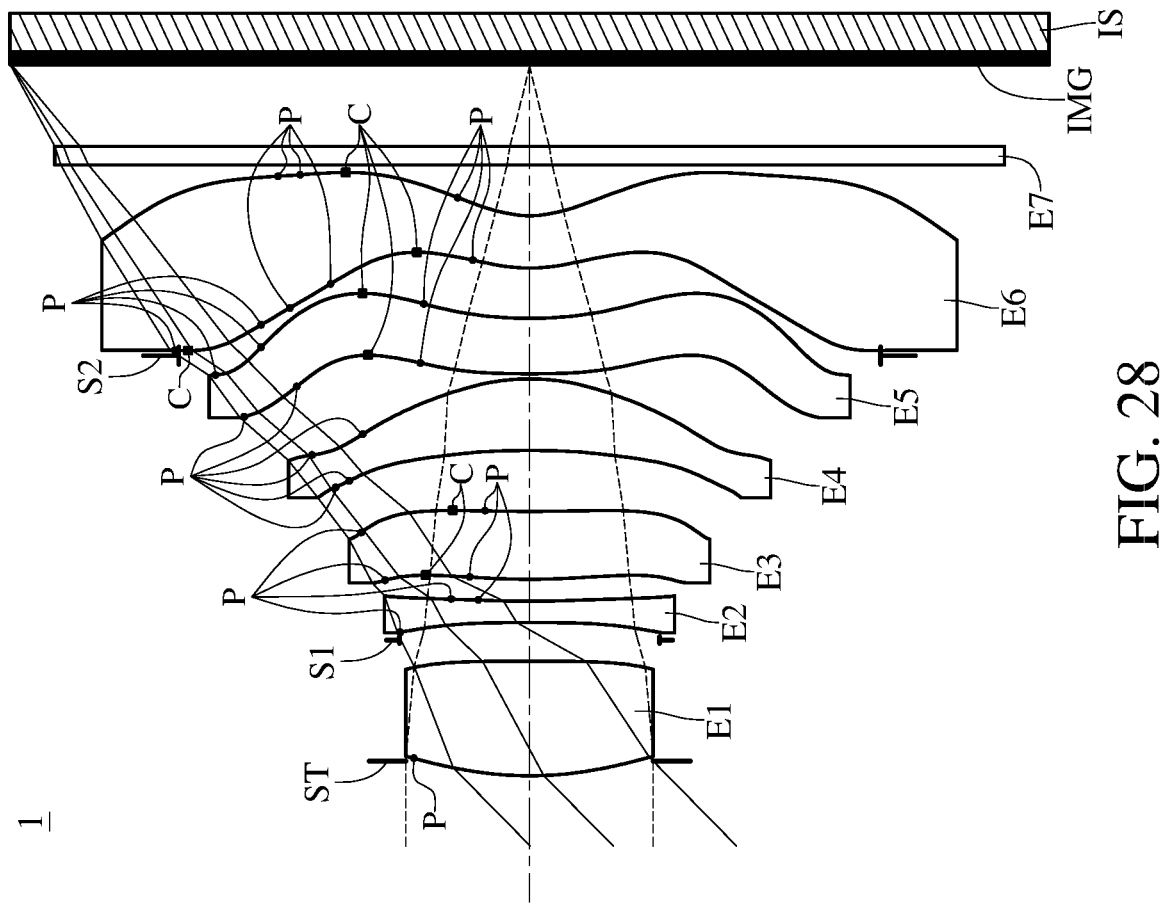
FIG. 28 shows a schematic view of inflection points on several lens surfaces and critical points on several lens surfaces according to the 1st embodiment of the present disclosure.

At least one of the object-side surface and the image-side surface of the fifth lens element can have at least one inflection point. Therefore, it is favorable for enhancing the design flexibility of the shape of the fifth lens element so as to correct astigmatism. Moreover, the object-side surface of the fifth lens element can have at least one inflection point. Moreover, the image-side surface of the fifth lens element can have at least one inflection point. The image-side surface of the sixth lens element can have at least one inflection point. Therefore, it is favorable for reducing the back focal length so as to adjust the total track length of the optical photographing lens assembly while correcting and compensating field curvature at the peripheral image. Please refer to FIG. 28, which shows a schematic view of all inflection points P on lens elements according to the 1st embodiment of the present disclosure. The aforementioned one or more inflection points P on any lens surface in FIG. 28 are only exemplary. Each of lens surfaces in various embodiments of the present disclosure may also have one or more inflection points.

The object-side surface of the fifth lens element can have at least one concave critical point in an off-axis region thereof. Therefore, it is favorable for adjusting the incident angle of light on the object-side surface of the fifth lens element so as to prevent poor convergence at the periphery due to an overly large incident angle. The image-side surface of the sixth lens element can have at least one convex critical point in an off-axis region thereof. Therefore, it is favorable for adjusting the incident angle of light onto the image surface so as to control the angle of light at the periphery, thereby preventing vignetting and correcting distortion. Please refer to FIG. 28, which shows a schematic view of all critical points C on lens elements according to the 1st embodiment of the present disclosure. The third lens element, the fifth lens element and the sixth lens element according to the 1st embodiment of the present disclosure has multiple critical points. FIG. 28 exemplarily depicts a concave critical point C on the object-side surface of the fifth lens element, and a convex critical point C on the image-side surface of the sixth lens element. The one or more critical points on any lens surface in FIG. 28 are only exemplary. Each of lens surfaces in various embodiments of the present disclosure may also have one or more critical points in an off-axis region thereof.

When a minimum value among Abbe numbers of all lens elements of the optical photographing lens assembly is Vmin, the following condition is satisfied: $10.0 < Vmin < 21.5$. Therefore, it is favorable for selecting materials of lens elements and correcting chromatic aberration so as to improve image quality. Moreover, the following condition can also be satisfied: $10.0 < Vmin < 20.5$. Moreover, the following condition can also be satisfied: $12.0 < Vmin < 20.0$. Moreover, the following condition can also be satisfied: $14.0 < Vmin < 19.8$. Moreover, the following condition can also be satisfied: $16.3 \leq Vmin \leq 19.5$.

When an axial distance between the second lens element and the third lens element is T23, and a central thickness of the first lens element is CT1, the following condition can be satisfied: $0 < 10 \times T23/CT1 < 3.20$. Therefore, it is favorable for obtaining a balance between the axial distance between the second lens element and the third lens element and the central thickness of the first lens element so as to adjust the size of the optical photographing lens assembly. Moreover, the following condition can also be satisfied: $0 < 10 \times T23/CT1 < 3.00$. Moreover, the following condition can also be satisfied: $0.20 < 10 \times T23/CT1 < 2.80$. Moreover, the following condition can also be satisfied: $0.50 \leq 10 \times T23/CT1 \leq 2.25$.

When a focal length of the second lens element is f2, and a focal length of the fourth lens element is f4, the following condition can be satisfied: $-0.90 < f4/f2 < 0.15$. Therefore, it is favorable for adjusting the refractive power of the second lens element and the fourth lens element so as to facilitate the symmetry of the optical photographing lens assembly and reduce light spot at the central field of view. Moreover, the following condition can also be satisfied: −0.80<f4/f2<−0.10. Moreover, the following condition can also be satisfied: −0.73≤ f4/f2≤0.05.

When the central thickness of the first lens element is CT1, a central thickness of the fourth lens element is CT4, and an axial distance between the first lens element and the second lens element is T12, the following condition can be satisfied: 0.10< (CT4−T12)/CT1<0.50. Therefore, it is favorable for adjusting a thickness ratio of the first lens element as well as the fourth lens element, and balancing the thickness ratio by the axial distance between the first lens element and the second lens element so as to effectively reduce the total track length of the optical photographing lens assembly. Moreover, the following condition can also be satisfied: 0.12< (CT4−T12)/CT1<0.46. Moreover, the following condition can also be satisfied: 0.15≤ (CT4−T12)/CT1≤0.43.

The optical photographing lens assembly can further include an aperture stop. The aperture stop can be disposed between an imaged object and the first lens element. Therefore, it is favorable for adjusting the imaging range and the incident angle of light on the image surface so as to increase relative illumination at the peripheral field of view. When an axial distance between the aperture stop and the image-side surface of the sixth lens element is SD, and a focal length of the optical photographing lens assembly is f, the following condition can be satisfied: 0.85<SD/f<1.50. Therefore, it is favorable for positioning the aperture stop so as to obtain a balance between the field of view and compactness. Moreover, the following condition can also be satisfied: 0.90<SD/f<1.35. Moreover, the following condition can also be satisfied: 0.95≤ SD/f≤1.24.

When the focal length of the optical photographing lens assembly is f, the focal length of the second lens element is f2, the focal length of the fourth lens element is f4, and a focal length of the fifth lens element is f5, the following condition can be satisfied: 0< (|f/f2|+|f/f5|)/|f/f4|<1.60. Therefore, it is favorable for strengthening light converging ability of the fourth lens element and balancing said ability by the second and fifth lens elements so as to reduce the total track length of the optical photographing lens assembly. Moreover, the following condition can also be satisfied: 0.05< (|f/f2|+|f/f5|)/|f/f4|<1.50. Moreover, the following condition can also be satisfied: 0.10< (|f/f2|+|f/f5|)/|f/f4|<1.40. Moreover, the following condition can also be satisfied: 0.26≤ (|f/f2|+|f/f5|)/|f/f4|≤1.22.

When the central thickness of the first lens element is CT1, and the central thickness of the fourth lens element is CT4, the following condition can be satisfied: 0.01<CT4/CT1<0.85. Therefore, it is favorable for adjusting a thickness ratio of the first lens element as well as the fourth lens element so as to improve space utilization. Moreover, the following condition can also be satisfied: 0.20<CT4/CT1<0.82. Moreover, the following condition can also be satisfied: 0.40≤CT4/CT1≤0.80.

When the focal length of the optical photographing lens assembly is f, and a focal length of the sixth lens element is f6, the following condition can be satisfied: −2.00<f/f6<−0.36. Therefore, it is favorable for adjusting the refractive power of the sixth lens element so as to reduce the back focal length. Moreover, the following condition can also be satisfied: −1.50<f/f6<−0.45. Moreover, the following condition can also be satisfied: −1.13≤ f/f6≤−0.50.

When an Abbe number of the second lens element is V2, and an Abbe number of the third lens element is V3, the following condition can be satisfied: 0.01<V2/V3<0.90. Therefore, it is favorable for adjusting the optical path of the optical photographing lens assembly so as to balance the convergence ability at different wavelengths and correct chromatic aberration. Moreover, the following condition can also be satisfied: 0.20<V2/V3<0.70. Moreover, the following condition can also be satisfied: 0.29≤V2/V3≤0.52.

When a curvature radius of the image-side surface of the fifth lens element is R10, and a curvature radius of the object-side surface of the sixth lens element is R11, the following condition can be satisfied: 0.10<R11/R10<1.50. Therefore, it is favorable for adjusting a ratio of curvature radii of the image-side surface of the fifth lens element as well as the object-side surface of the sixth lens element so as to correct astigmatism and distortion. Moreover, the following condition can also be satisfied: 0.20<R11/R10<0.80. Moreover, the following condition can also be satisfied: 0.23≤ R11/R10≤1.14.

When the axial distance between the first lens element and the second lens element is T12, and an axial distance between the third lens element and the fourth lens element is T34, the following condition can be satisfied: 0.30<T12/T34<2.00. Therefore, it is favorable for adjusting the distance between the first and second lens elements and the distance between the third and fourth lens elements so as to balance a spatial configuration of the lens elements to thereby reduce the sensitivity of the optical photographing lens assembly. Moreover, the following condition can also be satisfied: 0.40<T12/T34<1.50. Moreover, the following condition can also be satisfied: 0.53≤T12/T34≤1.27.

When the axial distance between the second lens element and the third lens element is T23, an axial distance between the fifth lens element and the sixth lens element is T56, and the central thickness of the first lens element is CT1, the following condition can be satisfied: 0.01< (T23+T56)/CT1<1.00. Therefore, it is favorable for adjusting the distance between lens groups as well as the thickness of the first lens element so as to control the optical path to thereby assist in balancing the back focal length of the optical photographing lens assembly. Moreover, the following condition can also be satisfied: 0.30< (T23+T56)/CT1<0.90. Moreover, the following condition can also be satisfied: 0.47≤ (T23+T56)/CT1≤0.87.

When a maximum field of view of the optical photographing lens assembly is FOV, the following condition can be satisfied: 82.0 degrees<FOV<110.0 degrees. Therefore, it is favorable for the optical photographing lens assembly to have sufficient imaging range so as to meet the requirements of the field of view for application and prevent aberrations, such as distortion, caused by an overly large viewing angle. Moreover, the following condition can also be satisfied: 85.0 degrees<FOV<100.0 degrees.

When a curvature radius of the image-side surface of the second lens element is R4, and the curvature radius of the object-side surface of the sixth lens element is R11, the following condition can be satisfied: 0.10< (R4-R11)/(R4+R11)<2.00. Therefore, it is favorable for adjusting the curvature radii of the image-side surface of the second lens element as well as the object-side surface of the sixth lens element so as to correct aberrations and field curvature. Moreover, the following condition can also be satisfied: 0.25< (R4-R11)/(R4+R11)<1.50.

When a curvature radius of the object-side surface of the first lens element is R1, and the curvature radius of the object-side surface of the sixth lens element is R11, the following condition can be satisfied: 0< (R1-R11)/(R1+R11)<1.00. Therefore, it is favorable for balancing the curvature radii of the object-side surface of the first lens element as well as the object-side surface of the sixth lens element so as to adjust the optical path of the optical photographing lens assembly, and thus the first and sixth lens elements can work with each other to improve image quality at a central region. Moreover, the following condition can also be satisfied: $0.01<(R1-R11)/(R1+R11)<0.60$.

When the axial distance between the first lens element and the second lens element is T12, and the axial distance between the second lens element and the third lens element is T23, the following condition can be satisfied: $0.01<T23/T12<0.70$. Therefore, it is favorable for adjusting a ratio of the distance between the first and second lens elements as well as the distance between the second and third lens elements so as to reduce manufacturing sensitivity and correct aberrations. Moreover, the following condition can also be satisfied: $0.05<T23/T12<0.65$.

When the focal length of the optical photographing lens assembly is f, a curvature radius of the object-side surface of the fifth lens element is R9, and the curvature radius of the image-side surface of the fifth lens element is R10, the following condition can be satisfied: $0.50<|f/R9|+f/R10<3.00$. Therefore, it is favorable for adjusting the shape and the refractive power of the fifth lens element so as to improve image quality. Moreover, the following condition can also be satisfied: $0.80<|f/R9|+f/R10<2.60$.

When the curvature radius of the image-side surface of the second lens element is R4, and a curvature radius of the object-side surface of the third lens element is R5, the following condition can be satisfied: $0.10<R5/R4<1.00$. Therefore, it is favorable for effectively balancing the lens shapes of the second and third lens elements so as to correct spherical aberration at the central region to thereby improve image quality. Moreover, the following condition can also be satisfied: $0.20<R5/R4<0.85$.

Figure 29:
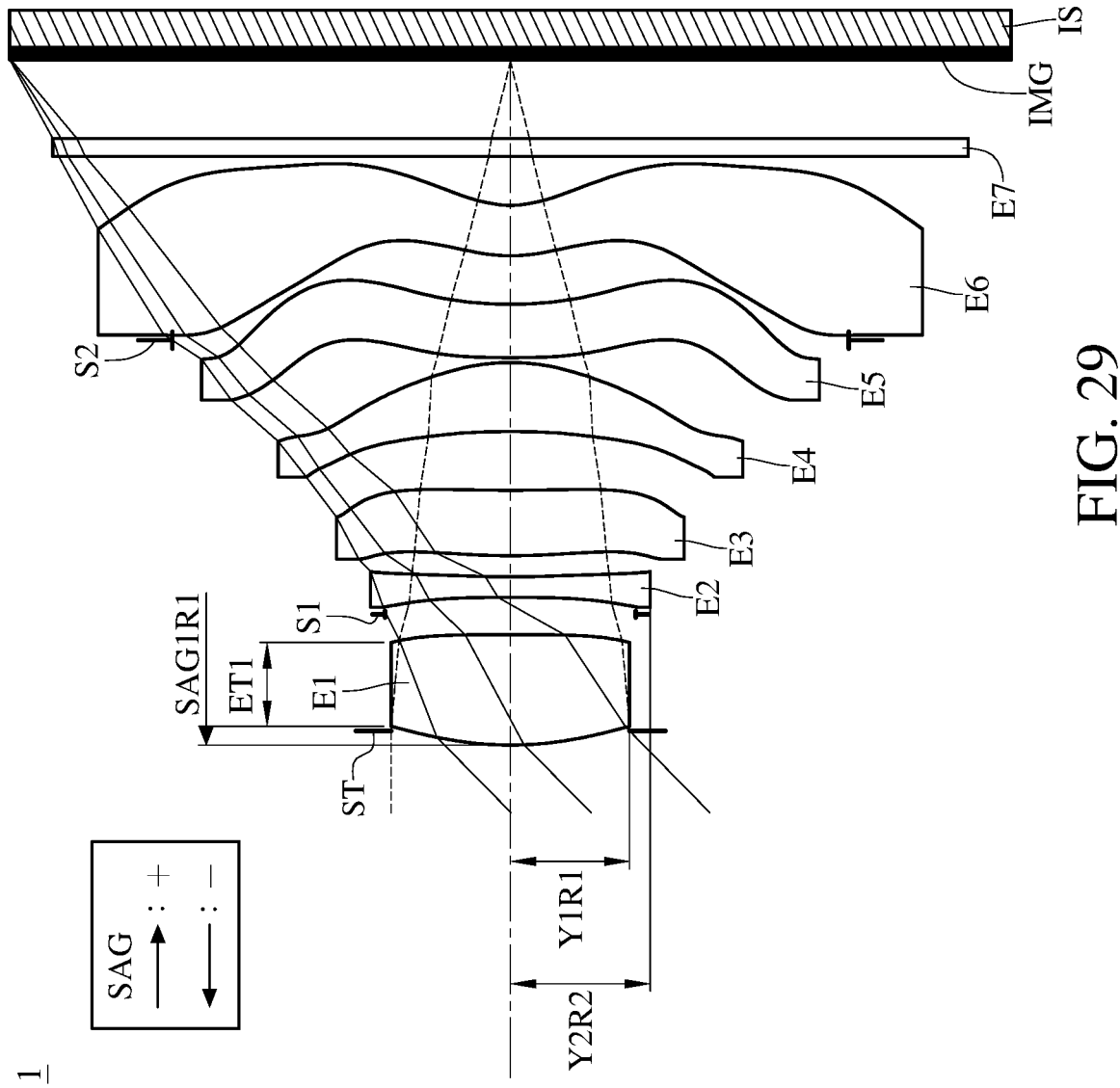
FIG. 29 shows a schematic view of Y1R1, Y2R2, ET1 and SAG1R1 according to the 1st embodiment of the present disclosure.

When a maximum effective radius of the object-side surface of the first lens element is Y1R1, and a maximum effective radius of the image-side surface of the second lens element is Y2R2, the following condition can be satisfied: $0.80<Y2R2/Y1R1<1.40$. Therefore, it is favorable for balancing the effective radii of the first and second lens elements so as to enlarge the field of view and reduce the size of the optical photographing lens assembly. Moreover, the following condition can also be satisfied: $1.00<Y2R2/Y1R1<1.30$. Please refer to FIG. 29, which shows a schematic view of Y1R1, Y2R2 according to the 1st embodiment of the present disclosure.

When a distance in parallel with an optical axis between the maximum effective radius position on the object-side surface of the first lens element and a maximum effective radius position on the image-side surface of the first lens element is ET1, and the central thickness of the first lens element is CT1, the following condition can be satisfied: $0.60<ET1/CT1<1.00$. Therefore, it is favorable for adjusting a ratio of the thicknesses of the first lens element at its center and periphery so as to maintain sufficient peripheral thickness to thereby improve assembling yield rate. Moreover, the following condition can also be satisfied: $0.65<ET1/CT1<0.85$. Please refer to FIG. 29, which shows a schematic view of ET1 according to the 1st embodiment of the present disclosure.

When a displacement in parallel with the optical axis from an axial vertex on the object-side surface of the first lens element to the maximum effective radius position on the object-side surface of the first lens element is SAG1R1, and the central thickness of the first lens element is CT1, the following condition can be satisfied: $0.01<SAG1R1/CT1<0.35$. Therefore, it is favorable for adjusting the curvature at the periphery of the first lens element so as to reduce the total track length as well as the outer diameter at the object side of the optical photographing lens assembly, and correct coma. Moreover, the following condition can also be satisfied: $0.10<SAG1R1/CT1<0.30$. Please refer to FIG. 29, which shows a schematic view of SAG1R1 according to the 1st embodiment of the present disclosure. When the direction from the axial vertex of one surface to the maximum effective radius position of the same surface is facing towards the image side of the optical photographing lens assembly, the value of displacement is positive; when the direction from the axial vertex of the surface to the maximum effective radius position of the same surface is facing towards the object side of the optical photographing lens assembly, the value of displacement is negative.

When the maximum effective radius of the object-side surface of the first lens element is Y1R1, and a maximum image height of the optical photographing lens assembly (can be half of a diagonal length of an effective photosensitive area of an image sensor) is ImgH, the following condition can be satisfied: $0.15<Y1R1/ImgH<0.35$. Therefore, it is favorable for adjusting the effective radius of the object-side surface of the first lens element so as to increase imaging size and reduce the outer diameter at the object side of the optical photographing lens assembly. Moreover, the following condition can also be satisfied: $0.20<Y1R1/ImgH<0.30$.

When the focal length of the optical photographing lens assembly is f, and the curvature radius of the object-side surface of the first lens element is R1, the following condition can be satisfied: $0.70<f/R1<2.00$. Therefore, it is favorable for adjusting the lens shape of object-side surface of the first lens element so as to reduce the size thereof and correct spherical aberration. Moreover, the following condition can also be satisfied: $0.90<f/R1<1.90$.

When an axial distance between the object-side surface of the first lens element and the image surface is TL, and the maximum image height of the optical photographing lens assembly is ImgH, the following condition can be satisfied: $0.50<TL/ImgH<1.40$. Therefore, it is favorable for obtaining a balancing between short total track length and large image surface. Moreover, the following condition can also be satisfied: $0.80<TL/ImgH<1.40$. Moreover, the following condition can also be satisfied: $1.00<TL/ImgH<1.40$.

When the curvature radius of the image-side surface of the second lens element is R4, and the curvature radius of the image-side surface of the fifth lens element is R10, the following condition can be satisfied: $0<(R4-R10)/(R4+R10)<2.00$. Therefore, it is favorable for adjusting the curvature radii of the image-side surface of the second lens element as well as the image-side surface of the fifth lens element so as to obtain a balance between convergence quality at central region and the lens size. Moreover, the following condition can also be satisfied: $0.05<(R4-R10)/(R4+R10)<1.50$.

When an entrance pupil diameter of the optical photographing lens assembly is EPD, the central thickness of the first lens element is CT1, and the axial distance between the first lens element and the second lens element is T12, the following condition can be satisfied: $1.10<EPD/(CT1+T12)<2.00$. Therefore, it is favorable for adjusting a ratio of front length of the optical photographing lens assembly as well as the entrance pupil diameter so as to ensure sufficient amount of incident light to thereby enhance brightness. Moreover, the following condition can also be satisfied: $1.30<EPD/(CT1+T12)<1.85$.

When the axial distance between the first lens element and the second lens element is T12, and the central thickness of the fourth lens element is CT4, the following condition can be satisfied: 0.30<T12/CT4<1.00. Therefore, it is favorable for adjusting a ratio of the distance between the first and second lens elements as well as the central thickness of the fourth lens element so as to reduce manufacturing error. Moreover, the following condition can also be satisfied: 0.40<T12/CT4<0.85.

When the focal length of the optical photographing lens assembly is f, a focal length of the first lens element is f1, a focal length of the third lens element is f3, and the focal length of the sixth lens element is f6, the following condition can be satisfied: 0.90< (|f/f3|+|f/f6|)/|f/f1|<2.00. Therefore, it is favorable for balancing the refractive power distribution of the lens elements at the front section and middle or rear section so as to reduce eccentricity sensitivity. Moreover, the following condition can also be satisfied: 1.00< (|f/f3|+|f/f6|)/|f/f1|<1.80.

When the axial distance between the fifth lens element and the sixth lens element is T56, and the central thickness of the first lens element is CT1, the following condition can be satisfied: 0.30<T56/CT1<1.00. Therefore, it is favorable for obtaining a balance between assembling error and manufacturability so as to improve manufacturing yield rate. Moreover, the following condition can also be satisfied: 0.33<T56/CT1<0.70.

When the focal length of the sixth lens element is f6, the curvature radius of the object-side surface of the sixth lens element is R11, and a curvature radius of the image-side surface of the sixth lens element is R12, the following condition can be satisfied: 5.00<|f6/R11|+|f6/R12|<20.00. Therefore, it is favorable for balancing the lens shape and the refractive power of the sixth lens element so as to reduce the size thereof and correct distortion and field curvature. Moreover, the following condition can also be satisfied: 8.00<|f6/R11|+|f6/R12|<18.00.

When the axial distance between the first lens element and the second lens element is T12, the axial distance between the second lens element and the third lens element is T23, and an axial distance between the fourth lens element and the fifth lens element is T45, the following condition can be satisfied: 0.01< (T23+T45)/T12<1.60. Therefore, it is favorable for adjusting the spacing between adjacent lens elements so as to effectively compress the space in the optical photographing lens assembly to thereby meet the requirement of compactness. Moreover, the following condition can also be satisfied: 0.15< (T23+T45)/T12<1.20.

When the curvature radius of the object-side surface of the first lens element is R1, and the curvature radius of the image-side surface of the sixth lens element is R12, the following condition can be satisfied: 0.01<R12/R1<0.60. Therefore, it is favorable for enhancing the optical path control ability of the lens elements so as to balance spherical aberration and field curvature to thereby improve image quality. Moreover, the following condition can also be satisfied: 0.20<R12/R1<0.50.

When the curvature radius of the image-side surface of the second lens element is R4, and the curvature radius of the object-side surface of the sixth lens element is R11, the following condition can be satisfied: 0.01<|R11/R4|<0.50. Therefore, it is favorable for adjusting a ratio of curvature radii of the image-side surface of the second lens element as well as the object-side surface of the sixth lens element so as to correct spherical aberration and astigmatism at the central region. Moreover, the following condition can also be satisfied: 0.10<|R11/R4|<0.45.

When the focal length of the third lens element is f3, and the focal length of the sixth lens element is f6, the following condition can be satisfied: 0.45<|f6/f3|<2.00. Therefore, it is favorable for adjusting the refractive power distribution so as to balance the back focal length of the optical photographing lens assembly to thereby meet various applications. Moreover, the following condition can also be satisfied: 0.48<|f6/f3|<1.50.

When the focal length of the optical photographing lens assembly is f, and the curvature radius of the image-side surface of the fifth lens element is R10, the following condition can be satisfied: 0.50<f/R10<2.00. Therefore, it is favorable for effectively balancing the lens shape as well as the refractive power of the fifth lens element so as to correct astigmatism and eliminate stray light in the optical photographing lens assembly. Moreover, the following condition can also be satisfied: 0.60<f/R10<1.80.

When the displacement in parallel with the optical axis from the axial vertex on the object-side surface of the first lens element to the maximum effective radius position on the object-side surface of the first lens element is SAG1R1, and the curvature radius of the object-side surface of the first lens element is R1, the following condition can be satisfied: 0.10<10×SAG1R1/R1<1.50. Therefore, it is favorable for adjusting an overall shape of the object-side surface of the first lens element so as to reduce aberrations and reduce the size of the optical photographing lens assembly to thereby meet the requirement of compactness. Moreover, the following condition can also be satisfied: 0.30<10×SAG1R1/R1<1.20.

According to the present disclosure, the aforementioned features and conditions can be utilized in numerous combinations so as to achieve corresponding effects.

According to the present disclosure, the lens elements of the optical photographing lens assembly can be made of either glass or plastic material. When the lens elements are made of glass material, the refractive power distribution of the optical photographing lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the optical photographing lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally add an additive which generates light absorption and light interference effects, so as to alter the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the aforementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the optical photographing lens assembly, based on the corresponding image sensor, can be flat or curved, especially a curved surface being concave facing towards the object side of the optical photographing lens assembly.

According to the present disclosure, an image correction unit, such as a field flattener, can be optionally disposed between the lens element closest to the image side of the optical photographing lens assembly along the optical path and the image surface for correction of aberrations such as field curvature. The optical characteristics of the image correction unit, such as curvature, thickness, refractive index, position and surface shape (convex or concave surface with spherical, aspheric, diffractive or Fresnel types), can be adjusted according to the requirements of the image capturing unit. In general, a preferable image correction unit is, for example, a thin plano-concave element having a concave object-side surface and a planar image-side surface, and the thin plano-concave element is disposed near the image surface.

Figure 30:
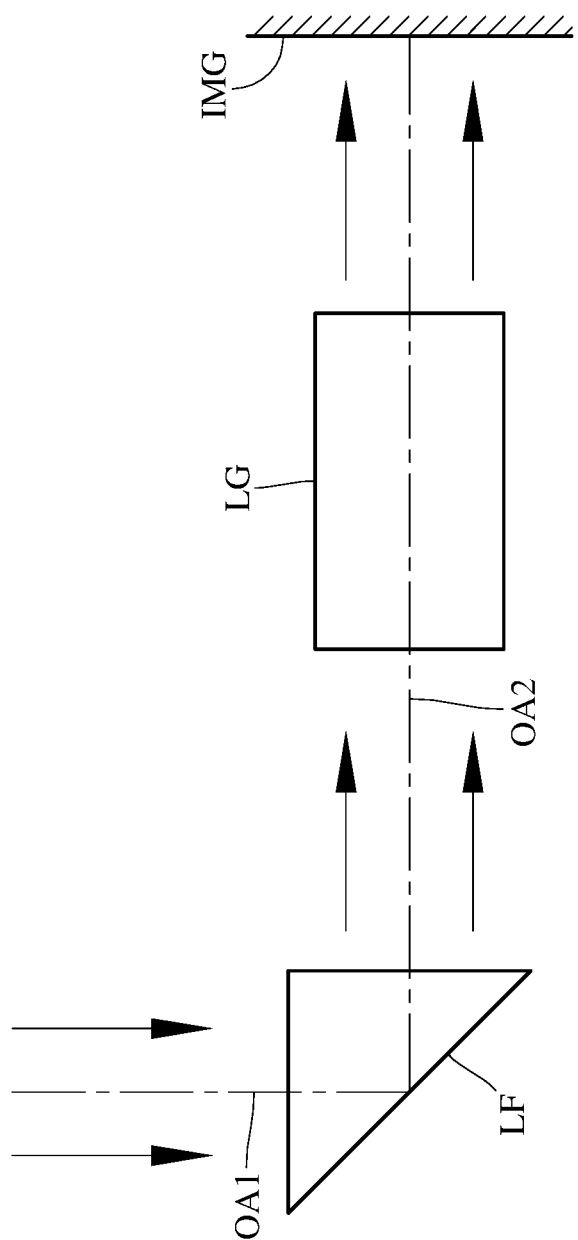
FIG. 30 shows a schematic view of a configuration of one light-folding element in an optical photographing lens assembly according to one embodiment of the present disclosure.
Figure 31:
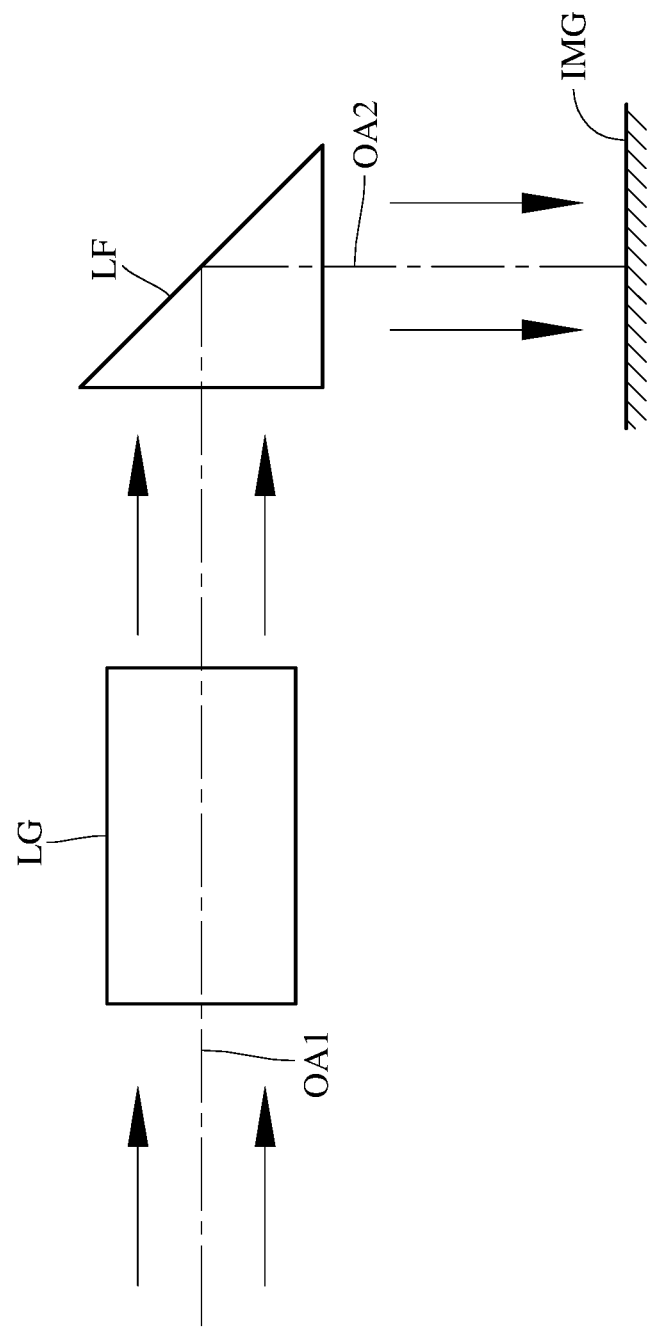
FIG. 31 shows a schematic view of another configuration of one light-folding element in an optical photographing lens assembly according to one embodiment of the present disclosure.
Figure 32:
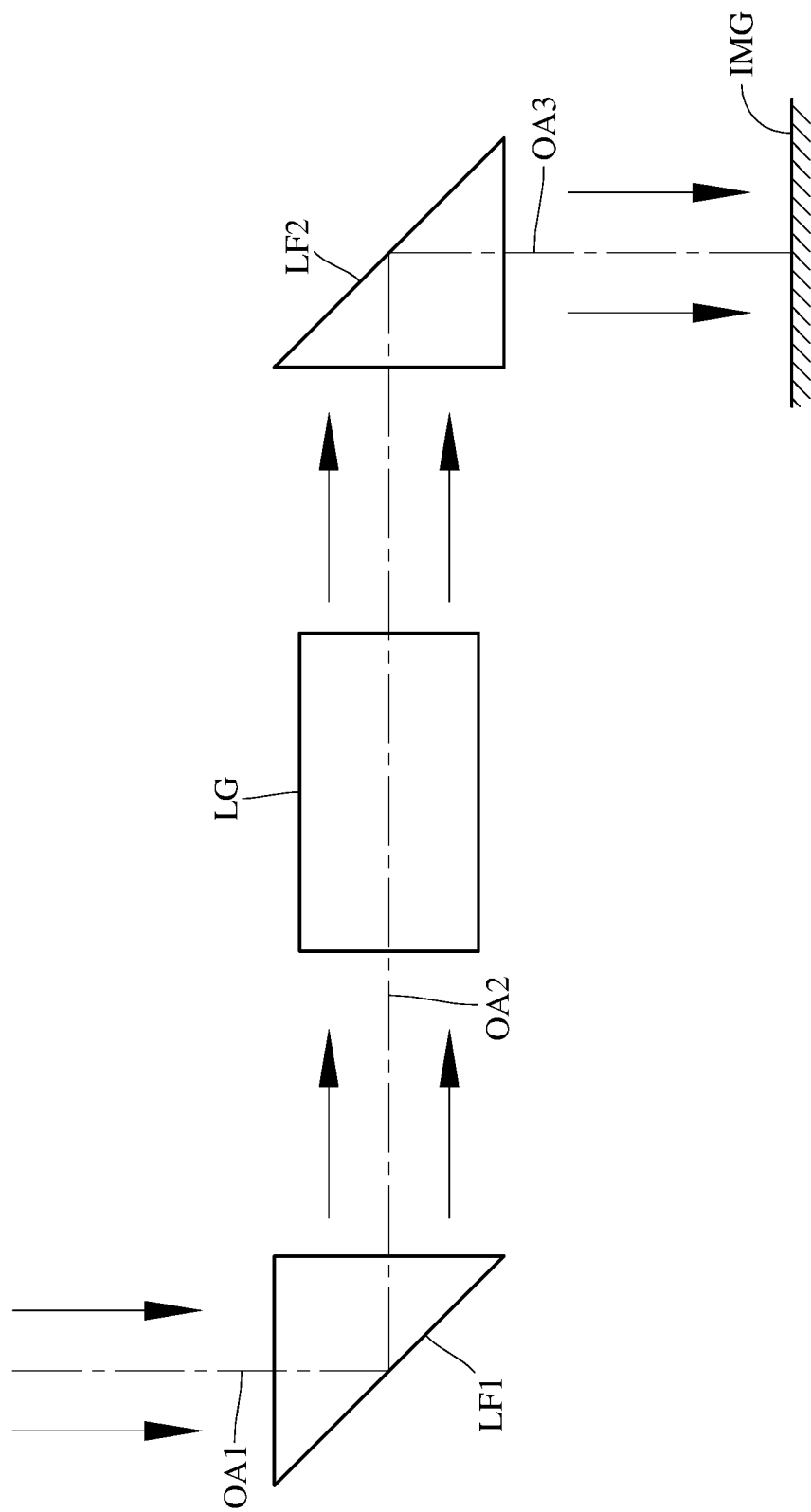
FIG. 32 shows a schematic view of a configuration of two light-folding elements in an optical photographing lens assembly according to one embodiment of the present disclosure.

According to the present disclosure, at least one light-folding element, such as a prism or a mirror, can be optionally disposed between an imaged object and the image surface on the imaging optical path, and the surface shape of the prism or mirror can be planar, spherical, aspheric or freeform surface, such that the optical photographing lens assembly can be more flexible in space arrangement, and therefore the dimensions of an electronic device is not restricted by the total track length of the optical photographing lens assembly. Specifically, please refer to FIG. 30 and FIG. 31. FIG. 30 shows a schematic view of a configuration of one light-folding element in an optical photographing lens assembly according to one embodiment of the present disclosure, and FIG. 31 shows a schematic view of another configuration of one light-folding element in an optical photographing lens assembly according to one embodiment of the present disclosure. In FIG. 30 and FIG. 31, the optical photographing lens assembly can have, in order from an imaged object (not shown in the figures) to an image surface IMG along an optical path, a first optical axis OA1, a light-folding element LF and a second optical axis OA2. The light-folding element LF can be disposed between the imaged object and a lens group LG of the optical photographing lens assembly as shown in FIG. 30, or disposed between a lens group LG of the optical photographing lens assembly and the image surface IMG as shown in FIG. 31. Furthermore, please refer to FIG. 32, which shows a schematic view of a configuration of two light-folding elements in an optical photographing lens assembly according to one embodiment of the present disclosure. In FIG. 32, the optical photographing lens assembly can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the optical photographing lens assembly, the second light-folding element LF2 is disposed between the lens group LG of the optical photographing lens assembly and the image surface IMG. The optical photographing lens assembly can be optionally provided with three or more light-folding elements, and the present disclosure is not limited to the type, amount and position of the light-folding elements of the embodiments disclosed in the aforementioned figures.

According to the present disclosure, the optical photographing lens assembly can include at least one stop, such as an aperture stop, a glare stop or a field stop. Said stop can be disposed between an imaged object and the first lens element, between adjacent lens elements, or between the last lens element and the image surface, and is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical photographing lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the optical photographing lens assembly and thereby provides a wider field of view for the same.

According to the present disclosure, the optical photographing lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or exposure speed.

According to the present disclosure, the optical photographing lens assembly can include one or more optical elements for limiting the form of light passing through the optical photographing lens assembly. Each optical element can be, but not limited to, a filter, a polarizer, etc., and each optical element can be, but not limited to, a single-piece element, a composite component, a thin film, etc. The optical element can be located at the object side or the image side of the optical photographing lens assembly or between any two adjacent lens elements so as to allow light in a specific form to pass through, thereby meeting application requirements.

According to the present disclosure, the optical photographing lens assembly can include at least one optical lens element, an optical element, or a carrier, which has at least one surface with a low reflection layer. The low reflection layer can effectively reduce stray light generated due to light reflection at the interface. The low reflection layer can be disposed in an optical non-effective area of an object-side surface or an image-side surface of the said optical lens element, or a connection surface between the object-side surface and the image-side surface. The said optical element can be a light-blocking element, an annular spacer, a barrel element, a cover glass, a blue glass, a filter, a color filter, an optical path folding element, a prism, a mirror, etc. The said carrier can be a base for supporting a lens assembly, a micro lens disposed on an image sensor, a substrate surrounding the image sensor, a glass plate for protecting the image sensor, etc.

According to the present disclosure, the object side and image side are defined in accordance with the direction of the optical axis, and the axial optical data are calculated along the optical axis. Furthermore, if the optical axis is folded by a light-folding element, the axial optical data are also calculated along the folded optical axis.

According to the above description of the present disclosure, the following specific embodiments are provided for further explanation.

1st Embodiment

Figure 1:
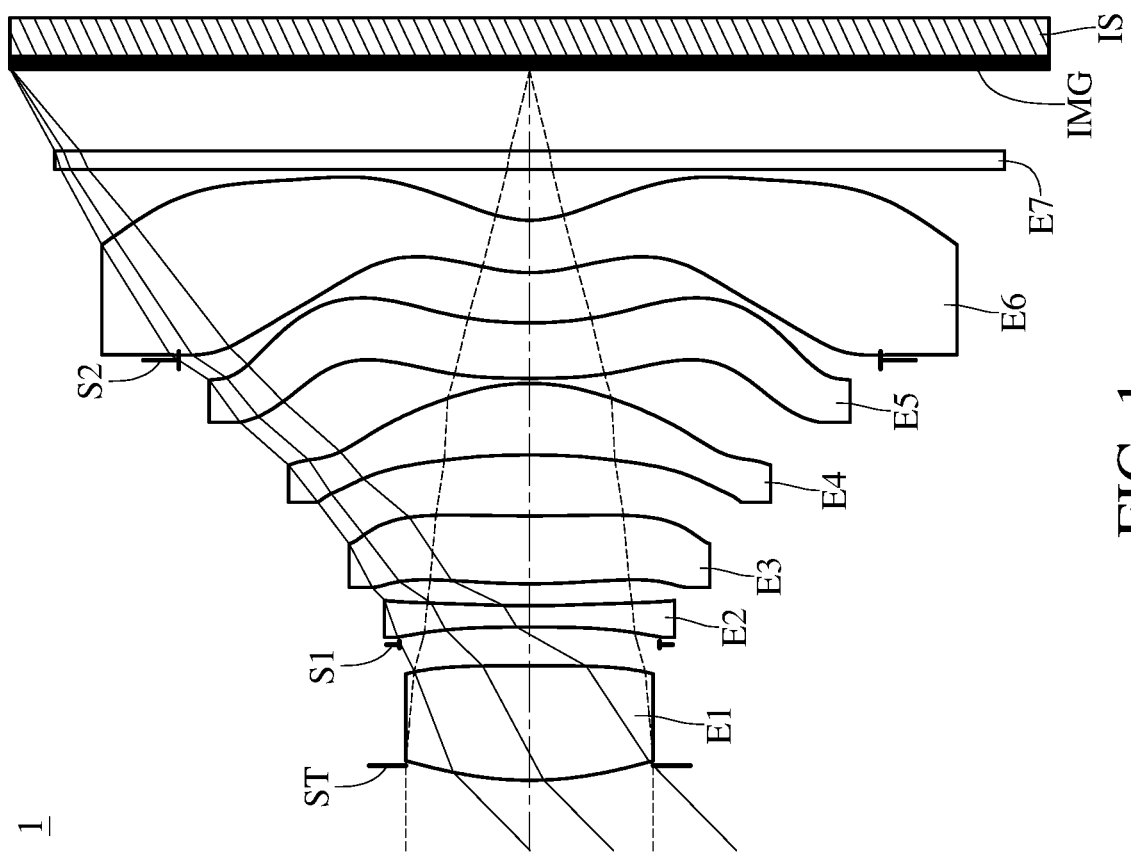
FIG. 1 is a schematic view of an image capturing unit according to the 1st embodiment of the present disclosure.
Figure 2:
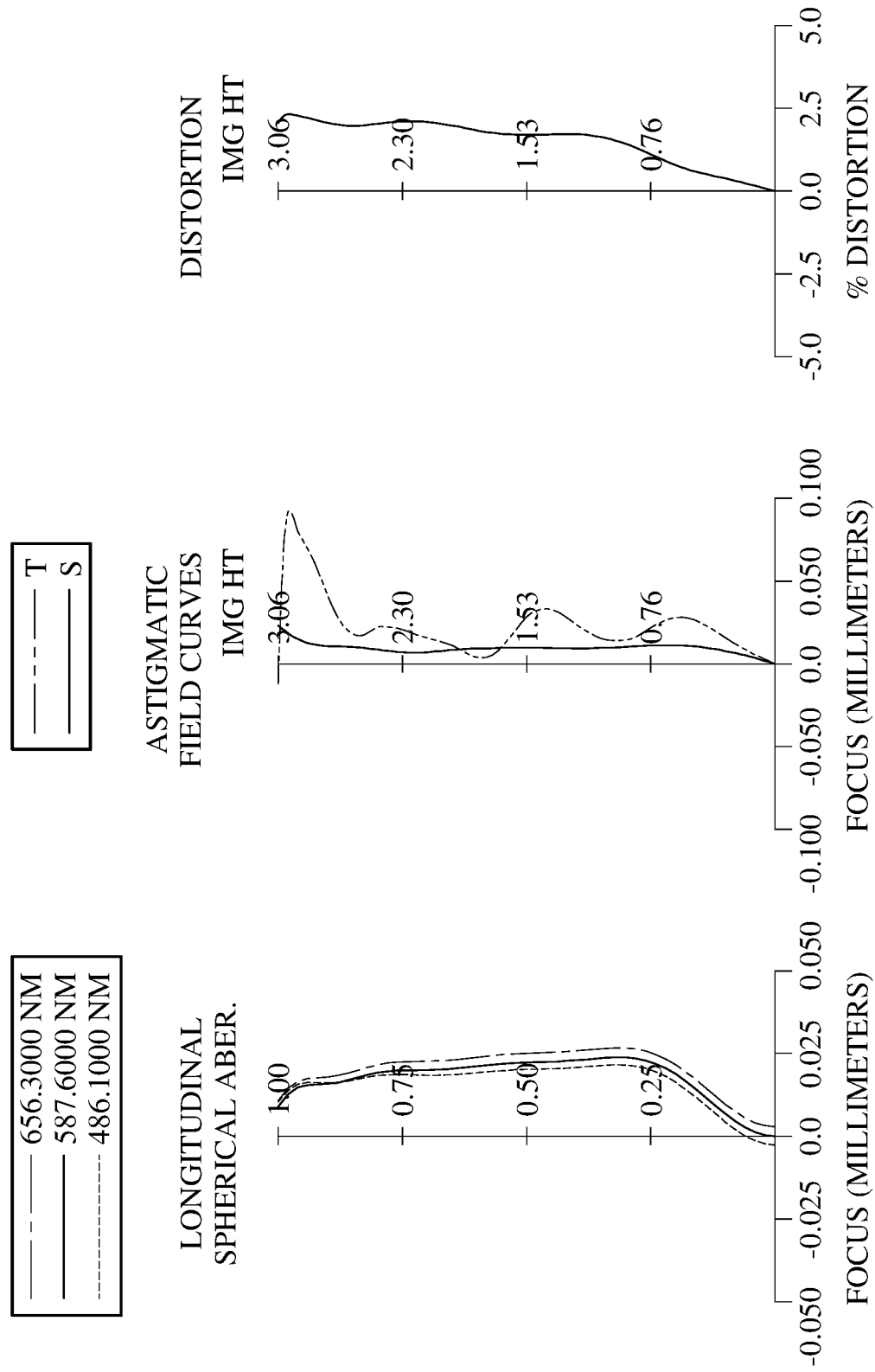
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes an optical photographing lens assembly (its reference numeral is omitted) of the present disclosure and an image sensor IS. The optical photographing lens assembly includes, in order from an object side to an image side along an optical path, an aperture stop ST, a first lens element E1, a stop S1, a second lens element E2, a third lens element E3, a fourth lens element E4, a fifth lens element E5, a stop S2, a sixth lens element E6, a filter E7 and an image surface IMG. The optical photographing lens assembly includes six lens elements (E1, E2, E3, E4, E5 and E6) with no additional lens element disposed between each of the adjacent six lens elements.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has one inflection point.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has two inflection points.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has two inflection points. The object-side surface of the third lens element E3 has one concave critical point in an off-axis region thereof. The image-side surface of the third lens element E3 has one convex critical point in an off-axis region thereof.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has three inflection points. The image-side surface of the fifth lens element E5 has three inflection points. The object-side surface of the fifth lens element E5 has one concave critical point in an off-axis region thereof. The image-side surface of the fifth lens element E5 has one convex critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has five inflection points. The image-side surface of the sixth lens element E6 has three inflection points. The object-side surface of the sixth lens element E6 has one concave critical point and one convex critical point in an off-axis region thereof. The image-side surface of the sixth lens element E6 has one convex critical point in an off-axis region thereof.

The filter E7 is made of glass material and located between the sixth lens element E6 and the image surface IMG, and will not affect the focal length of the optical photographing lens assembly. The image sensor IS is disposed on or near the image surface IMG of the optical photographing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the displacement in parallel with the optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22, 24, 26, 28 and 30.

In the optical photographing lens assembly of the image capturing unit 1 according to the 1st embodiment, when a focal length of the optical photographing lens assembly is f, an f-number of the optical photographing lens assembly is Fno, and half of a maximum field of view of the optical photographing lens assembly is HFOV, these parameters have the following values: f=3.03 millimeters (mm), Fno=2.08, and HFOV=44.6 degrees (deg.).

When the maximum field of view of the optical photographing lens assembly is FOV, the following condition is satisfied: FOV=89.2 degrees.

When an axial distance between the object-side surface of the first lens element E1 and the image surface IMG is TL, and a maximum image height of the optical photographing lens assembly is ImgH, the following condition is satisfied: TL/ImgH=1.37.

When an axial distance between the aperture stop ST and the image-side surface of the sixth lens element E6 is SD, and the focal length of the optical photographing lens assembly is f, the following condition is satisfied: SD/f=1.06.

When the focal length of the optical photographing lens assembly is f, and a focal length of the sixth lens element E6 is f6, the following condition is satisfied: f/f6=−0.57.

When a focal length of the second lens element E2 is f2, and a focal length of the fourth lens element E4 is f4, the following condition is satisfied: f4/f2=−0.47.

When a focal length of the third lens element E3 is f3, and the focal length of the sixth lens element E6 is f6, the following condition is satisfied: |f6/f3|=0.47.

When the focal length of the optical photographing lens assembly is f, the focal length of the second lens element E2 is f2, the focal length of the fourth lens element E4 is f4, and a focal length of the fifth lens element E5 is f5, the following condition is satisfied: (|f/f2|+|f/f5|)/| f/f4|=0.89.

When the focal length of the optical photographing lens assembly is f, a focal length of the first lens element E1 is f1, the focal length of the third lens element E3 is f3, and the focal length of the sixth lens element E6 is f6, the following condition is satisfied: (|f/f3|+| f/f6|)/|f/f1|=1.02.

When the focal length of the optical photographing lens assembly is f, and a curvature radius of the object-side surface of the first lens element E1 is R1, the following condition is satisfied: f/R1=1.45.

When the focal length of the optical photographing lens assembly is f, and a curvature radius of the image-side surface of the fifth lens element E5 is R10, the following condition is satisfied: f/R10=1.27.

When the focal length of the optical photographing lens assembly is f, a curvature radius of the object-side surface of the fifth lens element E5 is R9, and the curvature radius of the image-side surface of the fifth lens element E5 is R10, the following condition is satisfied: |f/R9|+f/R10=1.82.

When the focal length of the sixth lens element E6 is f6, a curvature radius of the object-side surface of the sixth lens element E6 is R11, and a curvature radius of the image-side surface of the sixth lens element E6 is R12, the following condition is satisfied: |f6/R11|+|f6/R12|=14.43.

When the curvature radius of the object-side surface of the first lens element E1 is R1, and the curvature radius of the object-side surface of the sixth lens element E6 is R11, the following condition is satisfied: (R1−R11)/(R1+R11)=0.39.

When a curvature radius of the image-side surface of the second lens element E2 is R4, and the curvature radius of the object-side surface of the sixth lens element E6 is R11, the following condition is satisfied: (R4-R11)/(R4+R11)=0.70.

When the curvature radius of the image-side surface of the second lens element E2 is R4, and the curvature radius of the image-side surface of the fifth lens element E5 is R10, the following condition is satisfied: (R4-R10)/(R4+R10)=0.37.

When the curvature radius of the image-side surface of the second lens element E2 is R4, and a curvature radius of the object-side surface of the third lens element E3 is R5, the following condition is satisfied: R5/R4=0.74.

When the curvature radius of the image-side surface of the second lens element E2 is R4, and the curvature radius of the object-side surface of the sixth lens element E6 is R11, the following condition is satisfied: |R11/R4|=0.18.

When the curvature radius of the image-side surface of the fifth lens element E5 is R10, and the curvature radius of the object-side surface of the sixth lens element E6 is R11, the following condition is satisfied: R11/R10=0.39.

When the curvature radius of the object-side surface of the first lens element E1 is R1, and the curvature radius of the image-side surface of the sixth lens element E6 is R12, the following condition is satisfied: R12/R1=0.30.

When an entrance pupil diameter of the optical photographing lens assembly is EPD, a central thickness of the first lens element E1 is CT1, and an axial distance between the first lens element E1 and the second lens element E2 is T12, the following condition is satisfied: EPD/(CT1+T12)=1.61. In this embodiment, an axial distance between two adjacent lens elements is a distance in a paraxial region between two adjacent lens surfaces of the two adjacent lens elements.

When the central thickness of the first lens element E1 is CT1, a central thickness of the fourth lens element E4 is CT4, and the axial distance between the first lens element E1 and the second lens element E2 is T12, the following condition is satisfied: (CT4−T12)/CT1=0.29.

When the central thickness of the first lens element E1 is CT1, and the central thickness of the fourth lens element E4 is CT4, the following condition is satisfied: CT4/CT1=0.62.

When the axial distance between the first lens element E1 and the second lens element E2 is T12, and the central thickness of the fourth lens element E4 is CT4, the following condition is satisfied: T12/CT4=0.54.

When the axial distance between the first lens element E1 and the second lens element E2 is T12, and an axial distance between the third lens element E3 and the fourth lens element E4 is T34, the following condition is satisfied: T12/T34=0.63.

When an axial distance between the second lens element E2 and the third lens element E3 is T23, and the central thickness of the first lens element E1 is CT1, the following condition is satisfied: 10×T23/CT1=1.92.

When the axial distance between the first lens element E1 and the second lens element E2 is T12, and the axial distance between the second lens element E2 and the third lens element E3 is T23, the following condition is satisfied: T23/T12=0.57.

When the axial distance between the first lens element E1 and the second lens element E2 is T12, the axial distance between the second lens element E2 and the third lens element E3 is T23, and an axial distance between the fourth lens element E4 and the fifth lens element E5 is T45, the following condition is satisfied: (T23+T45)/T12=0.70.

When the axial distance between the second lens element E2 and the third lens element E3 is T23, an axial distance between the fifth lens element E5 and the sixth lens element E6 is T56, and the central thickness of the first lens element E1 is CT1, the following condition is satisfied: (T23+T56)/CT1=0.63.

When the axial distance between the fifth lens element E5 and the sixth lens element E6 is T56, and the central thickness of the first lens element E1 is CT1, the following condition is satisfied: T56/CT1=0.44.

When a minimum value among Abbe numbers of all lens elements of the optical photographing lens assembly is Vmin, the following condition is satisfied: Vmin=19.5. In this embodiment, an Abbe number of the second lens element E2 is smaller than that of the other lens elements in the optical photographing lens assembly, and thus Vmin is equal to the Abbe number of the second lens element E2.

When the Abbe number of the second lens element E2 is V2, and an Abbe number of the third lens element E3 is V3, the following condition is satisfied: V2/V3=0.35.

When a distance in parallel with the optical axis between a maximum effective radius position on the object-side surface of the first lens element E1 and a maximum effective radius position on the image-side surface of the first lens element E1 is ET1, and the central thickness of the first lens element E1 is CT1, the following condition is satisfied: ET1/CT1=0.74.

When a displacement in parallel with the optical axis from an axial vertex on the object-side surface of the first lens element E1 to the maximum effective radius position on the object-side surface of the first lens element E1 is SAG1R1, and the curvature radius of the object-side surface of the first lens element E1 is R1, the following condition is satisfied: 10×SAG1R1/R1=0.56.

When the displacement in parallel with an optical axis from the axial vertex on the object-side surface of the first lens element E1 to the maximum effective radius position on the object-side surface of the first lens element E1 is SAG1R1, and the central thickness of the first lens element E1 is CT1, the following condition is satisfied: SAG1R1/CT1=0.17.

When a maximum effective radius of the object-side surface of the first lens element E1 is Y1R1, and a maximum effective radius of the image-side surface of the second lens element E2 is Y2R2, the following condition is satisfied: Y2R2/Y1R1=1.17.

When the maximum effective radius of the object-side surface of the first lens element E1 is Y1R1, and the maximum image height of the optical photographing lens assembly is ImgH, the 5 following condition is satisfied: Y1R1/ImgH=0.24.

The detailed optical data of the 1st embodiment are shown in Table 1A and the aspheric surface data are shown in Table 1B below.

TABLE 1A

1st Embodiment
f = 3.03 mm, Fno = 2.08, HFOV = 44.6 deg.

| Surface # |         | Curvature Radius | Thickness | Material | Index | Abbe # | Focal Length |
|-----------|---------|------------------|-----------|----------|-------|--------|--------------|
| 0 | Object | Plano | Infinity | | | | |
| 1 | Ape. Stop | Plano | −0.086 | | | | |
| 2 | Lens 1 | 2.0916 (ASP) | 0.677 | Plastic | 1.544 | 56.0 | 3.72 |
| 3 | | −55.5556 (ASP) | 0.125 | | | | |
| 4 | Stop | Plano | 0.103 | | | | |
| 5 | Lens 2 | −28.9854 (ASP) | 0.126 | Plastic | 1.669 | 19.5 | −6.55 |
| 6 | | 5.1678 (ASP) | 0.130 | | | | |
| 7 | Lens 3 | 3.8423 (ASP) | 0.401 | Plastic | 1.544 | 56.0 | 11.37 |
| 8 | | 9.7688 (ASP) | 0.360 | | | | |
| 9 | Lens 4 | −5.9265 (ASP) | 0.423 | Plastic | 1.544 | 56.0 | 3.05 |
| 10 | | −1.3276 (ASP) | 0.030 | | | | |
| 11 | Lens 5 | 5.4860 (ASP) | 0.328 | Plastic | 1.614 | 25.6 | −7.17 |
| 12 | | 2.3852 (ASP) | −0.221 | | | | |
| 13 | Stop | Plano | 0.518 | | | | |
| 14 | Lens 6 | 0.9258 (ASP) | 0.309 | Plastic | 1.544 | 56.0 | −5.36 |
| 15 | | 0.6200 (ASP) | 0.300 | | | | |
| 16 | Filter | Plano | 0.110 | Glass | 1.517 | 64.2 | — |
| 17 | | Plano | 0.483 | | | | |
| 18 | Image | Plano | — | | | | |

Note:
Reference wavelength is 587.6 nm (d-line).
An effective radius of the stop S1 (Surface 4) is 0.768 mm.
An effective radius of the stop S2 (Surface 13) is 2.071 mm.

TABLE 1B

Aspheric Coefficients

| Surface # | 2 | 3 | 5 | 6 |
|-----------|---|---|---|---|
| k = | −2.856920000E+00 | 0.000000000E+00 | 0.000000000E+00 | 1.105870000E+01 |
| A4 = | −3.447041257E−02 | −1.186889656E−01 | −2.793529577E−01 | −3.050272111E−01 |
| A6 = | 7.785452559E−01 | −4.827908477E−01 | −5.197834314E−02 | 6.295952163E−01 |
| A8 = | −8.823251920E+00 | 4.725793355E+00 | 5.223253782E+00 | −9.235793555E−01 |
| A10 = | 5.612747038E+01 | −2.810589973E+01 | −3.469702075E+01 | 2.283178157E+00 |
| A12 = | −2.208609462E+02 | 1.009880609E+02 | 1.305769843E+02 | −5.929774484E+00 |

TABLE 1B-continued

| Aspheric Coefficients | | | | |
|---|---|---|---|---|
| A14 = | 5.418267279E+02 | −2.230414585E+02 | −3.050960474E+02 | 7.725743093E+00 |
| A16 = | −8.065601464E+02 | 2.959341749E+02 | 4.348674983E+02 | −2.984373021E+00 |
| A18 = | 6.659251097E+02 | −2.156241133E+02 | −3.447195246E+02 | −2.178940708E+00 |
| A20 = | −2.337321471E+02 | 6.599059305E+01 | 1.161390702E+02 | 1.714306165E+00 |

| Surface # | 7 | 8 | 9 | 10 |
|---|---|---|---|---|
| k = | 0.000000000E+00 | −9.000000000E+01 | 0.000000000E+00 | −1.000000000E+00 |
| A4 = | −2.866040395E−01 | −1.553796297E−01 | −3.029563619E−01 | −3.385937316E−01 |
| A6 = | 1.632942206E+00 | 3.740092958E−01 | 2.513862973E−01 | 2.773455781E+00 |
| A8 = | −1.383101095E+01 | −1.040175000E+00 | 6.188186669E+00 | −8.707835399E+00 |
| A10 = | 7.264809762E+01 | −4.059596610E−02 | −3.480832234E+01 | 1.601886915E+01 |
| A12 = | −2.419263502E+02 | 4.996447256E+00 | 9.780739688E+01 | −1.877038439E+01 |
| A14 = | 5.187882040E+02 | −8.385622124E+00 | −1.730703117E+02 | 1.395370795E+01 |
| A16 = | −7.108240907E+02 | −1.647143105E+00 | 2.025854054E+02 | −6.208219187E+00 |
| A18 = | 5.953196735E+02 | 2.103139786E+01 | −1.549099267E+02 | 1.387692784E+00 |
| A20 = | −2.746189193E+02 | −2.753856510E+01 | 7.133335207E+01 | −2.535274077E−02 |
| A22 = | 5.294082369E+01 | 1.564507524E+01 | −1.406331077E+01 | −4.975308563E−02 |
| A24 = | — | −3.411625364E+00 | −2.776773491E+00 | 6.848601186E−03 |
| A26 = | — | — | 2.003355953E+00 | — |
| A28 = | — | — | −3.004773339E−01 | — |

| Surface # | 11 | 12 | 14 | 15 |
|---|---|---|---|---|
| k = | 0.000000000E+00 | −1.223060000E+01 | −8.534410000E+00 | −3.548040000E+00 |
| A4 = | −3.138035054E−02 | 5.412520345E−03 | −2.458568600E−01 | −3.802534555E−01 |
| A6 = | 2.508932538E+00 | 1.315749420E+00 | −5.938185863E−01 | 5.012129472E−01 |
| A8 = | −1.131649714E+01 | −5.382413205E+00 | 2.898551129E+00 | −6.232609741E−01 |
| A10 = | 2.688316997E+01 | 1.053514802E+01 | −7.043752134E+00 | 5.483768249E−01 |
| A12 = | −4.278442019E+01 | −1.312860328E+01 | 1.027749294E+01 | −3.180682755E−01 |
| A14 = | 4.898681963E+01 | 1.130187210E+01 | −9.674230175E+00 | 1.251815661E−01 |
| A16 = | −4.141357222E+01 | −6.918710953E+00 | 6.196592005E+00 | −3.456619911E−02 |
| A18 = | 2.600269051E+01 | 3.027869844E+00 | −2.787613371E+00 | 6.857337193E−03 |
| A20 = | −1.205553558E+01 | −9.359147573E−01 | 8.924172402E−01 | −9.944716292E−04 |
| A22 = | 4.062049526E+00 | 1.977381739E−01 | −2.026161051E−01 | 1.071668706E−04 |
| A24 = | −9.655194425E−01 | −2.663436867E−02 | 3.191518850E−02 | −8.711548741E−06 |
| A26 = | 1.532978479E−01 | 1.933239287E−03 | −3.318591197E−03 | 5.300821949E−07 |
| A28 = | −1.457984307E−02 | −3.396518293E−05 | 2.049395582E−04 | −2.207498251E−08 |
| A30 = | 6.277745837E−04 | −2.765356956E−06 | −5.694181147E−06 | 4.640804764E−10 |

In Table 1A, the curvature radius, the thickness and the focal length are shown in millimeters (mm). Surface numbers 0-18 represent the surfaces sequentially arranged from the object side to the image side along the optical axis. In Table 1B, k represents the conic coefficient of the equation of the aspheric surface profiles. A4–A30 represent the aspheric coefficients ranging from the 4th order to the 30th order. The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 3:
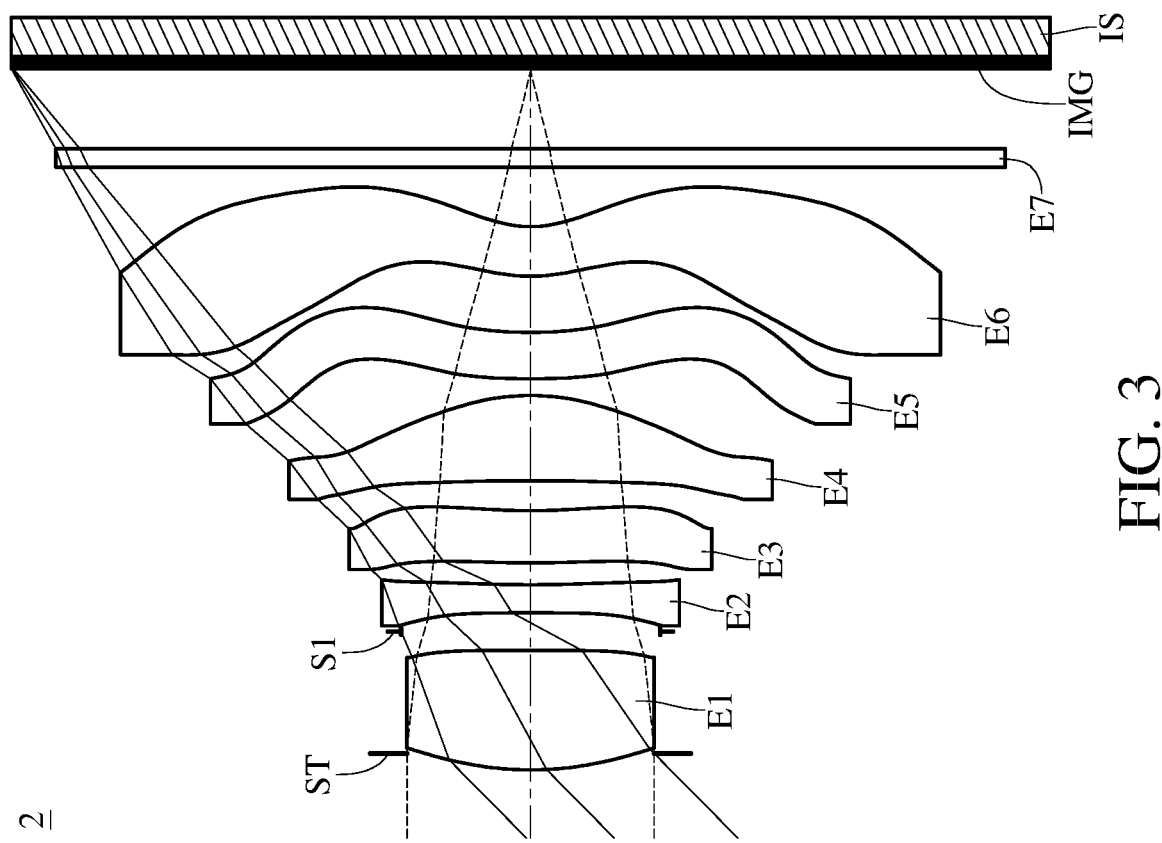
FIG. 3 is a schematic view of an image capturing unit according to the 2nd embodiment of the present disclosure.
Figure 4:
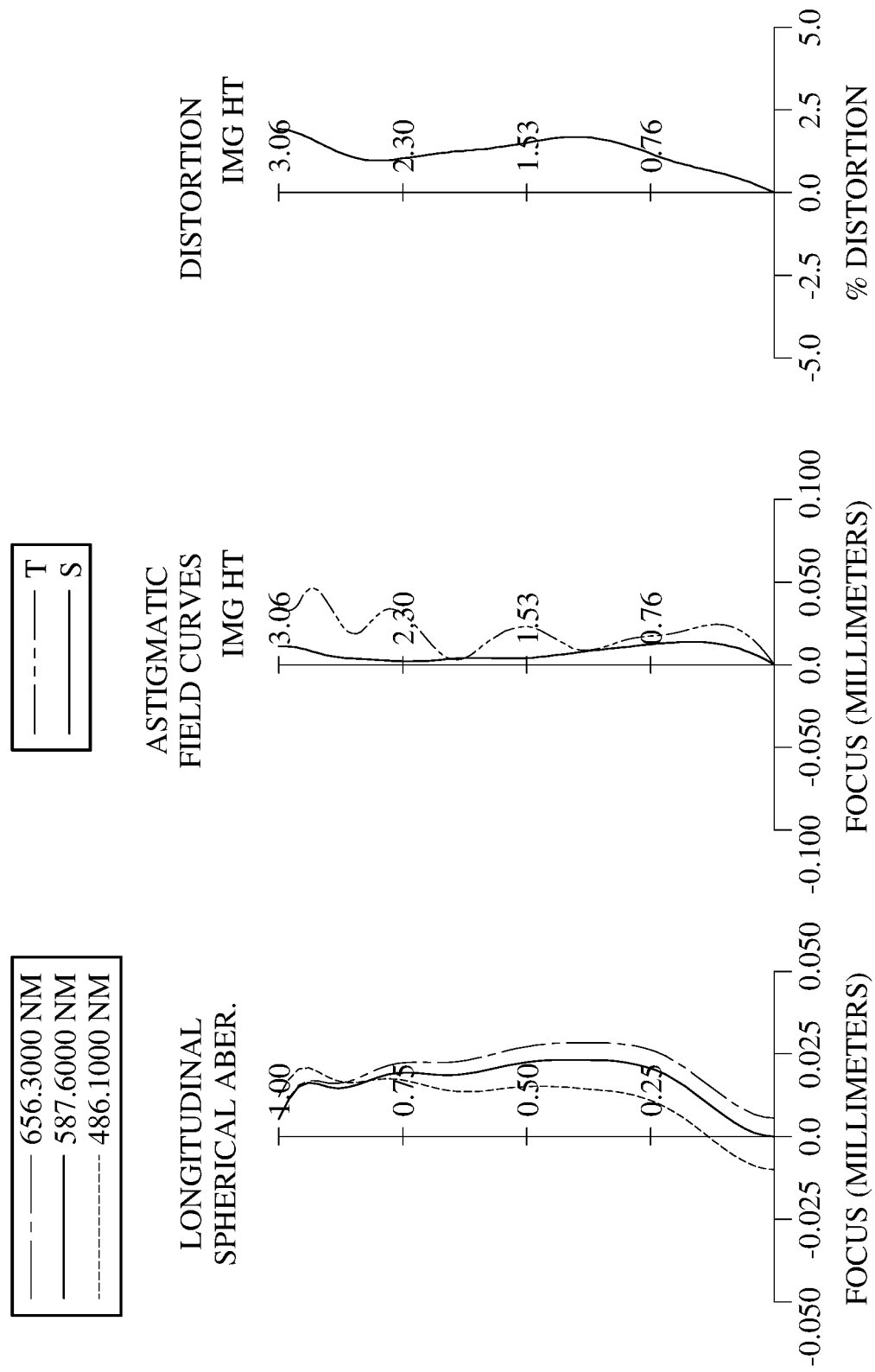
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes an optical photographing lens assembly (its reference numeral is omitted) of the present disclosure and an image sensor IS. The optical photographing lens assembly includes, in order from an object side to an image side along an optical path, an aperture stop ST, a first lens element E1, a stop S1, a second lens element E2, a third lens element E3, a fourth lens element E4, a fifth lens element E5 and a sixth lens element E6, a filter E7 and an image surface IMG. The optical photographing lens assembly includes six lens elements (E1, E2, E3, E4, E5 and E6) with no additional lens element disposed between each of the adjacent six lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The image-side surface of the first lens element E1 has one inflection point. The image-side surface of the first lens element E1 has one convex critical point in an off-axis region thereof.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has two inflection points.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has two inflection points. The object-side surface of the third lens element E3 has one concave critical point in an off-axis region thereof. The image-side surface of the third lens element E3 has one convex critical point in an off-axis region thereof.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has five inflection points. The image-side surface of the fourth lens element E4 has two inflection points. The object-side surface of the fourth lens element E4 has one concave critical point in an off-axis region thereof.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has three inflection points. The image-side surface of the fifth lens element E5 has three inflection points. The object-side surface of the fifth lens element E5 has one concave critical point in an off-axis region thereof. The image-side surface of the fifth lens element E5 has one convex critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has five inflection points. The image-side surface of the sixth lens element E6 has three inflection points. The object-side surface of the sixth lens element E6 has one concave critical point and one convex critical point in an off-axis region thereof. The image-side surface of the sixth lens element E6 has one convex critical point in an off-axis region thereof.

The filter E7 is made of glass material and located between the sixth lens element E6 and the image surface IMG, and will not affect the focal length of the optical photographing lens assembly. The image sensor IS is disposed on or near the image surface IMG of the optical photographing lens assembly.

The detailed optical data of the 2nd embodiment are shown in Table 2A and the aspheric surface data are shown in Table 2B below.

TABLE 2A

2nd Embodiment
f = 3.03 mm, Fno = 2.08, HFOV = 44.6 deg.

| Surface # |  | Curvature Radius | Thickness | Material | Index | Abbe # | Focal Length |
|---|---|---|---|---|---|---|---|
| 0 | Object | Plano | Infinity |  |  |  |  |
| 1 | Ape. Stop | Plano | −0.097 |  |  |  |  |
| 2 | Lens 1 | 1.9153 (ASP) | 0.705 | Plastic | 1.544 | 56.0 | 3.67 |
| 3 |  | 41.2195 (ASP) | 0.112 |  |  |  |  |
| 4 | Stop | Plano | 0.111 |  |  |  |  |
| 5 | Lens 2 | −31.6607 (ASP) | 0.166 | Plastic | 1.669 | 19.5 | −9.73 |
| 6 |  | 8.2084 (ASP) | 0.129 |  |  |  |  |
| 7 | Lens 3 | 5.5365 (ASP) | 0.308 | Plastic | 1.566 | 37.4 | −9.80 |
| 8 |  | 2.7155 (ASP) | 0.176 |  |  |  |  |
| 9 | Lens 4 | 12.0271 (ASP) | 0.505 | Plastic | 1.544 | 56.0 | 2.38 |
| 10 |  | −1.4285 (ASP) | 0.099 |  |  |  |  |
| 11 | Lens 5 | 4.7138 (ASP) | 0.274 | Plastic | 1.614 | 25.6 | −10.59 |
| 12 |  | 2.6718 (ASP) | 0.332 |  |  |  |  |
| 13 | Lens 6 | 0.9776 (ASP) | 0.293 | Plastic | 1.544 | 56.0 | −4.93 |
| 14 |  | 0.6407 (ASP) | 0.350 |  |  |  |  |
| 15 | Filter | Plano | 0.110 | Glass | 1.517 | 64.2 | — |
| 16 |  | Plano | 0.473 |  |  |  |  |
| 17 | Image | Plano | — |  |  |  |  |

Note:
Reference wavelength is 587.6 nm (d-line).
An effective radius of the stop S1 (Surface 4) is 0.765 mm.

TABLE 2B

Aspheric Coefficients

| Surface # | 2 | 3 | 5 | 6 |
|---|---|---|---|---|
| k = | −2.229410000E+00 | 0.000000000E+00 | 0.000000000E+00 | 3.472080000E+01 |
| A4 = | −3.999083061E−02 | −1.274478973E−01 | −1.289986282E−03 | 8.291100081E−02 |
| A6 = | 1.075777872E+00 | −3.125883727E−01 | −2.918030863E+00 | −1.732709013E+00 |
| A8 = | −1.226135245E+01 | 8.704505387E−01 | 2.369608946E+01 | 9.657369625E+00 |
| A10 = | 7.961090237E+01 | 2.556337826E+00 | −1.277796937E+02 | −3.409501944E+01 |
| A12 = | −3.195307979E+02 | −3.681110499E+01 | 4.491515738E+02 | 8.061604588E+01 |
| A14 = | 7.999667772E+02 | 1.467819852E+02 | −1.009768920E+03 | −1.254299536E+02 |
| A16 = | −1.216070850E+03 | −2.878598028E+02 | 1.401694312E+03 | 1.228151345E+02 |
| A18 = | 1.025988296E+03 | 2.837098205E+02 | −1.091986794E+03 | −6.833472315E+01 |
| A20 = | −3.681918282E+02 | −1.122962844E+02 | 3.643241280E+02 | 1.645829050E+01 |

TABLE 2B-continued

Aspheric Coefficients

| Surface # | 7 | 8 | 9 | 10 |
|---|---|---|---|---|
| k = | 0.000000000E+00 | −6.043680000E+01 | 0.000000000E+00 | −1.000000000E+00 |
| A4 = | −4.639544622E−01 | −6.840496554E−01 | −1.003744970E+00 | −5.313034307E−01 |
| A6 = | 3.826119647E+00 | 5.811791307E+00 | 5.839015189E+00 | 4.189482170E+00 |
| A8 = | −2.895633306E+01 | −3.182628088E+01 | −1.766868825E+01 | −1.444006123E+01 |
| A10 = | 1.363316102E+02 | 1.118626305E+02 | 2.630819035E+01 | 3.021921132E+01 |
| A12 = | −4.109884803E+02 | −2.713553019E+02 | 4.644143644E+00 | −4.133438554E+01 |
| A14 = | 8.094277968E+02 | 4.655907019E+02 | −1.097913532E+02 | 3.783006109E+01 |
| A16 = | −1.034703665E+03 | −5.665336561E+02 | 2.532861438E+02 | −2.316365962E+01 |
| A18 = | 8.229535826E+02 | 4.797943158E+02 | −3.288018332E+02 | 9.323127940E+00 |
| A20 = | −3.675529097E+02 | −2.695867123E+02 | 2.757240618E+02 | −2.360400097E+00 |
| A22 = | 6.999606453E+01 | 9.045026089E+01 | −1.523495620E+02 | 3.401537560E−01 |
| A24 = | — | −1.369878433E+01 | 5.368310750E+01 | −2.124652486E−02 |
| A26 = | — | — | −1.094437975E+01 | — |
| A28 = | — | — | 9.826985610E−01 | — |

| Surface # | 11 | 12 | 13 | 14 |
|---|---|---|---|---|
| k = | 0.000000000E+00 | −8.553970000E+00 | −9.719900000E+00 | −3.625620000E+00 |
| A4 = | 7.892306977E−02 | 2.854854825E−01 | −1.267159729E−01 | −3.542299293E−01 |
| A6 = | 2.287178953E+00 | 1.146441366E−01 | −1.067373470E+00 | 2.665666230E−01 |
| A8 = | −1.235073744E+01 | −3.236350983E+00 | 3.146554410E+00 | −1.093225028E−01 |
| A10 = | 3.242324305E+01 | 8.880439367E+00 | −5.500240641E+00 | −2.980875943E−02 |
| A12 = | −5.565108944E+01 | −1.378765984E+01 | 6.417171821E+00 | 7.948086684E−02 |
| A14 = | 6.791116694E+01 | 1.444336822E+01 | −5.100026373E+00 | −5.503054890E−02 |
| A16 = | −6.076677576E+01 | −1.082997745E+01 | 2.835260934E+00 | 2.077720158E−02 |
| A18 = | 4.018862365E+01 | 5.942733313E+00 | −1.127406140E+00 | −4.488168637E−03 |
| A20 = | −1.954972693E+01 | −2.392759213E+00 | 3.242317963E−01 | 4.202936207E−04 |
| A22 = | 6.886759988E+00 | 6.980540437E−01 | −6.722350216E−02 | 4.327986723E−05 |
| A24 = | −1.705165896E+00 | −1.432445599E−01 | 9.832650684E−03 | −1.881153284E−05 |
| A26 = | 2.809288358E−01 | 1.955302249E−02 | −9.651718178E−04 | 2.543628155E−06 |
| A28 = | −2.761123391E−02 | −1.589772316E−03 | 5.714611288E−05 | −1.681720715E−07 |
| A30 = | 1.223433184E−03 | 5.812560690E−05 | −1.543778650E−06 | 4.566053308E−09 |

In the 2nd embodiment, the equation of the aspheric surface profiles of the aforementioned lens elements is the same as the equation of the 1st embodiment. Also, the definitions of these parameters shown in Table 2C below are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

Values of Conditional Expressions

| f[mm] | 3.03 | R11/R10 | 0.37 |
|---|---|---|---|
| Fno | 2.08 | R12/R1 | 0.33 |
| HFOV [deg.] | 44.6 | EPD/(CT1 + T12) | 1.57 |
| FOV [deg.] | 89.2 | (CT4 − T12)/CT1 | 0.40 |
| TL/ImgH | 1.35 | CT4/CT1 | 0.72 |
| SD/f | 1.03 | T12/CT4 | 0.44 |
| f/f6 | −0.61 | T12/T34 | 1.27 |
| f4/f2 | −0.24 | 10 × T23/CT1 | 1.83 |
| |f6/f3| | 0.50 | T23/T12 | 0.58 |
| (|f/f2| + |f/f5|)/|f/f4| | 0.47 | (T23 + T45)/T12 | 1.02 |
| (|f/f3| + |f/f6|)/|f/f1| | 1.12 | (T23 + T56)/CT1 | 0.65 |
| f/R1 | 1.58 | T56/CT1 | 0.47 |
| f/R10 | 1.13 | Vmin | 19.5 |
| |f/R9| + f/R10 | 1.78 | V2/V3 | 0.52 |
| |f6/R11| + |f6/R12| | 12.73 | ET1/CT1 | 0.73 |
| (R1 − R11)/(R1 + R11) | 0.32 | 10 × SAG1R1/R1 | 0.69 |
| (R4 − R11)/(R4 + R11) | 0.79 | SAG1R1/CT1 | 0.19 |
| (R4 − R10)/(R4 + R10) | 0.51 | Y2R2/Y1R1 | 1.19 |
| R5/R4 | 0.67 | Y1R1/ImgH | 0.24 |
| |R11/R4| | 0.12 | — | — |

3rd Embodiment

Figure 5:
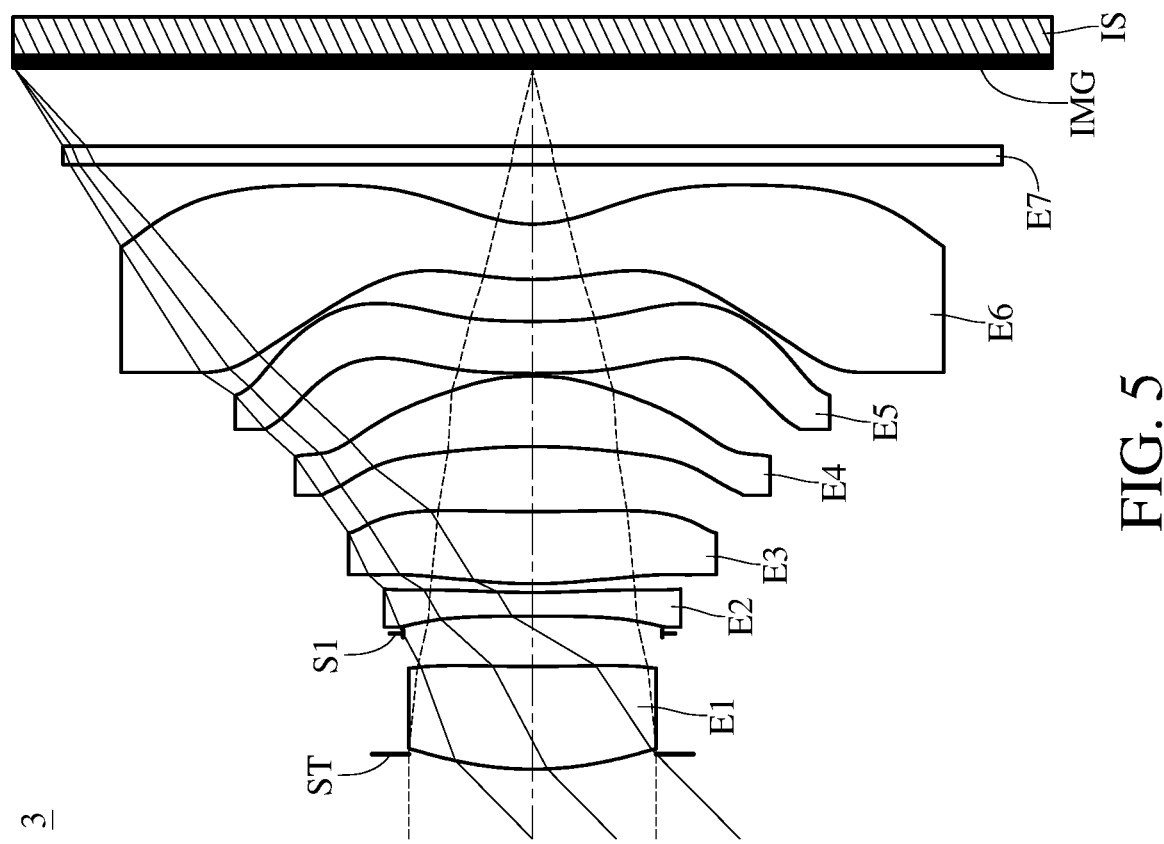
FIG. 5 is a schematic view of an image capturing unit according to the 3rd embodiment of the present disclosure.
Figure 6:
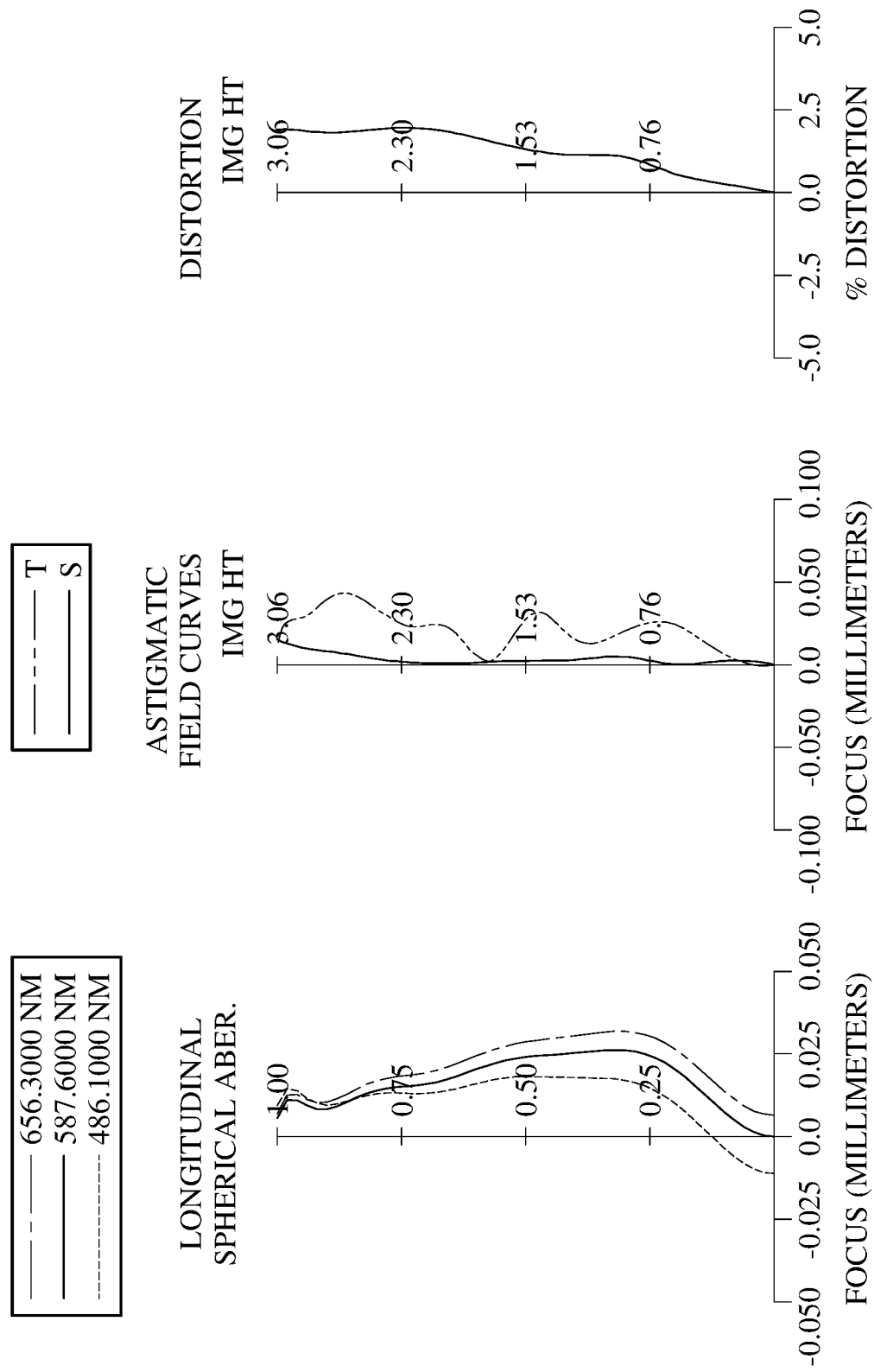
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes an optical photographing lens assembly (its reference numeral is omitted) of the present disclosure and an image sensor IS. The optical photographing lens assembly includes, in order from an object side to an image side along an optical path, an aperture stop ST, a first lens element E1, a stop S1, a second lens element E2, a third lens element E3, a fourth lens element E4, a fifth lens element E5, a sixth lens element E6, a filter E7 and an image surface IMG. The optical photographing lens assembly includes six lens elements (E1, E2, E3, E4, E5 and E6) with no additional lens element disposed between each of the adjacent six lens elements.

The first lens element E1 with positive refractive power has an object-side surface being convex in a paraxial region thereof and an image-side surface being concave in a paraxial region thereof. The first lens element E1 is made of glass material and has the object-side surface and the image-side surface being both aspheric. The image-side surface of the first lens element E1 has one inflection point. The image-side surface of the first lens element E1 has one convex critical point in an off-axis region thereof.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has two inflection points. The image-side surface of the second lens element E2 has one concave critical point and one convex critical point in an off-axis region thereof.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has two inflection points. The object-side surface of the third lens element E3 has one concave critical point and one convex critical point in an off-axis region thereof. The image-side surface of the third lens element E3 has one convex critical point in an off-axis region thereof.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has two inflection points. The object-side surface of the fifth lens element E5 has one concave critical point in an off-axis region thereof. The image-side surface of the fifth lens element E5 has one convex critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points. The image-side surface of the sixth lens element E6 has two inflection points. The object-side surface of the sixth lens element E6 has one concave critical point and one convex critical point in an off-axis region thereof. The image-side surface of the sixth lens element E6 has one convex critical point in an off-axis region thereof.

The filter E7 is made of glass material and located between the sixth lens element E6 and the image surface IMG, and will not affect the focal length of the optical photographing lens assembly. The image sensor IS is disposed on or near the image surface IMG of the optical photographing lens assembly.

The detailed optical data of the 3rd embodiment are shown in Table 3A and the aspheric surface data are shown in Table 3B below.

TABLE 3A

3rd Embodiment
f = 3.03 mm, Fno = 2.08, HFOV = 44.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.089 | | | | |
| 2 | Lens 1 | 2.0047 (ASP) | 0.607 | Glass | 1.569 | 56.0 | 4.28 |
| 3 | | 10.0927 (ASP) | 0.194 | | | | |
| 4 | Stop | Plano | 0.103 | | | | |
| 5 | Lens 2 | −67.2227 (ASP) | 0.140 | Plastic | 1.680 | 18.2 | −6.40 |
| 6 | | 4.6559 (ASP) | 0.052 | | | | |
| 7 | Lens 3 | 2.6880 (ASP) | 0.426 | Plastic | 1.544 | 56.0 | 6.52 |
| 8 | | 10.4847 (ASP) | 0.384 | | | | |
| 9 | Lens 4 | −4.6300 (ASP) | 0.417 | Plastic | 1.544 | 56.0 | 4.51 |
| 10 | | −1.6542 (ASP) | 0.015 | | | | |
| 11 | Lens 5 | 3.6993 (ASP) | 0.308 | Plastic | 1.660 | 20.4 | 9.84 |
| 12 | | 8.3060 (ASP) | 0.248 | | | | |
| 13 | Lens 6 | 1.9073 (ASP) | 0.327 | Plastic | 1.544 | 56.0 | −2.68 |
| 14 | | 0.7767 (ASP) | 0.350 | | | | |
| 15 | Filter | Plano | 0.110 | Glass | 1.517 | 64.2 | — |
| 16 | | Plano | 0.462 | | | | |
| 17 | Image | Plano | — | | | | |

Note:
Reference wavelength is 587.6 nm (d-line).
An effective radius of the stop S1 (Surface 4) is 0.765 mm.

TABLE 3B

Aspheric Coefficients

| Surface # | 2 | 3 | 5 | 6 |
|---|---|---|---|---|
| k = | −2.443870000E+00 | 0.000000000E+00 | 0.000000000E+00 | −9.282490000E+00 |
| A4 = | −4.091378600E−02 | −7.151732745E−02 | −1.814714338E−01 | −3.086614163E−01 |
| A6 = | 9.053990118E−01 | −6.493678361E−01 | −3.917146875E−01 | 9.203267582E−01 |

TABLE 3B-continued

| Aspheric Coefficients | | | | |
|---|---|---|---|---|
| A8 = | −9.663465944E+00 | 5.552637801E+00 | 5.821563692E+00 | −3.516489072E+00 |
| A10 = | 5.845152450E+01 | −3.182486010E+01 | −4.312395875E+01 | 8.987062385E+00 |
| A12 = | −2.174635542E+02 | 1.112548963E+02 | 1.791516684E+02 | −1.126905910E+01 |
| A14 = | 5.004554925E+02 | −2.376927365E+02 | −4.384208501E+02 | 1.993482683E+00 |
| A16 = | −6.917269399E+02 | 3.012021532E+02 | 6.332941082E+02 | 1.179140647E+01 |
| A18 = | 5.234948002E+02 | −2.054362300E+02 | −4.997885582E+02 | −1.310398024E+01 |
| A20 = | −1.656144532E+02 | 5.719263941E+01 | 1.662272817E+02 | 4.497002895E+00 |

| Surface # | 7 | 8 | 9 | 10 |
|---|---|---|---|---|
| k = | 0.000000000E+00 | −9.573120000E+00 | 0.000000000E+00 | −1.000000000E+00 |
| A4 = | −3.758334634E−01 | −1.151872417E−01 | −5.194566551E−02 | −1.343122262E+00 |
| A6 = | 1.868365050E+00 | 3.462920876E−01 | −2.014273145E+00 | 8.306173855E+00 |
| A8 = | −1.148946090E+01 | −2.113458763E+00 | 2.226610164E+01 | −2.499778625E+01 |
| A10 = | 4.852202336E+01 | 8.431253629E+00 | −1.050473999E+02 | 4.592179195E+01 |
| A12 = | −1.354290315E+02 | −2.794013328E+01 | 2.957346315E+02 | −5.518075379E+01 |
| A14 = | 2.503768914E+02 | 6.962223981E+01 | −5.522365434E+02 | 4.401629178E+01 |
| A16 = | −3.021930493E+02 | −1.194714144E+02 | 7.117829846E+02 | −2.310100462E+01 |
| A18 = | 2.271406481E+02 | 1.345048177E+02 | −6.411836875E+02 | 7.759191464E+00 |
| A20 = | −9.568733006E+01 | −9.449273027E+01 | 4.012531401E+02 | −1.572340989E+00 |
| A22 = | 1.713273910E+01 | 3.748420526E+01 | −1.700449393E+02 | 1.691659700E−01 |
| A24 = | — | −6.392940584E+00 | 4.622106965E+01 | −6.890511008E−03 |
| A26 = | — | — | −7.205474343E+00 | — |
| A28 = | — | — | 4.836917799E−01 | — |

| Surface # | 11 | 12 | 13 | 14 |
|---|---|---|---|---|
| k = | 0.000000000E+00 | −1.512270000E+01 | −7.855680000E+00 | −2.919630000E+00 |
| A4 = | −7.015433912E−01 | 8.614975922E−01 | 8.461289413E−03 | −3.383008212E−01 |
| A6 = | 6.440196976E+00 | −3.042254765E+00 | −1.278909251E+00 | 9.746490981E−02 |
| A8 = | −2.587467409E+01 | 7.668560391E+00 | 2.486515421E+00 | 2.163671626E−01 |
| A10 = | 6.411664392E+01 | −1.597258001E+01 | −3.046167518E+00 | −3.727951551E−01 |
| A12 = | −1.117395512E+02 | 2.524556029E+01 | 3.064132652E+00 | 3.428449376E−01 |
| A14 = | 1.432581383E+02 | −2.932133999E+01 | −2.604751308E+00 | −2.150750361E−01 |
| A16 = | −1.373619056E+02 | 2.491738839E+01 | 1.754465943E+00 | 9.618827376E−02 |
| A18 = | 9.867283274E+01 | −1.550278309E+01 | −8.839460815E−01 | −3.103966338E−02 |
| A20 = | −5.262778489E+01 | 7.035946093E+00 | 3.224357535E−01 | 7.234809202E−03 |
| A22 = | 2.044116491E+01 | −2.299472729E+00 | −8.319547682E−02 | −1.206408138E−03 |
| A24 = | −5.592855734E+00 | 5.262916486E−01 | 1.474090294E−02 | 1.403766420E−04 |
| A26 = | 1.017810809E+00 | −7.994114924E−02 | −1.702636479E−03 | −1.083035712E−05 |
| A28 = | −1.102713572E−01 | 7.227758753E−03 | 1.153268451E−04 | 4.980971209E−07 |
| A30 = | 5.370365909E−03 | −2.939557344E−04 | −3.472901297E−06 | −1.034038310E−08 |

In the 3rd embodiment, the equation of the aspheric surface profiles of the aforementioned lens elements is the same as the equation of the 1st embodiment. Also, the definitions of these parameters shown in Table 3C below are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions:

TABLE 3C

| Values of Conditional Expressions | | | |
|---|---|---|---|
| f[mm] | 3.03 | R11/R10 | 0.23 |
| Fno | 2.08 | R12/R1 | 0.39 |
| HFOV [deg.] | 44.6 | EPD/(CT1 + T12) | 1.61 |
| FOV [deg.] | 89.2 | (CT4 − T12)/CT1 | 0.20 |
| TL/ImgH | 1.35 | CT4/CT1 | 0.69 |
| SD/f | 1.03 | T12/CT4 | 0.71 |
| f/f6 | −1.13 | T12/T34 | 0.77 |
| f4/f2 | −0.70 | 10 × T23/CT1 | 0.86 |
| $\|f6/f3\|$ | 0.41 | T23/T12 | 0.18 |
| $(\|f/f2\| + \|f/f5\|)/\|f/f4\|$ | 1.16 | (T23 + T45)/T12 | 0.23 |
| $(\|f/f3\| + \|f/f6\|)/\|f/f1\|$ | 2.25 | (T23 + T56)/T12 | 0.49 |
| f/R1 | 1.51 | T56/CT1 | 0.41 |
| f/R10 | 0.36 | Vmin | 18.2 |
| $\|f/R9\| + f/R10$ | 1.18 | V2/V3 | 0.33 |
| $\|f6/R11\| + \|f6/R12\|$ | 4.86 | ET1/CT1 | 0.77 |
| (R1 − R11)/(R1 + R11) | 0.02 | 10 × SAG1R1/R1 | 0.62 |
| (R4 − R11)/(R4 + R11) | 0.42 | SAG1R1/CT1 | 0.21 |
| (R4 − R10)/(R4 + R10) | −0.28 | Y2R2/Y1R1 | 1.19 |
| R5/R4 | 0.58 | Y1R1/ImgH | 0.24 |
| $\|R11/R4\|$ | 0.41 | — | — |

4th Embodiment

Figure 7:
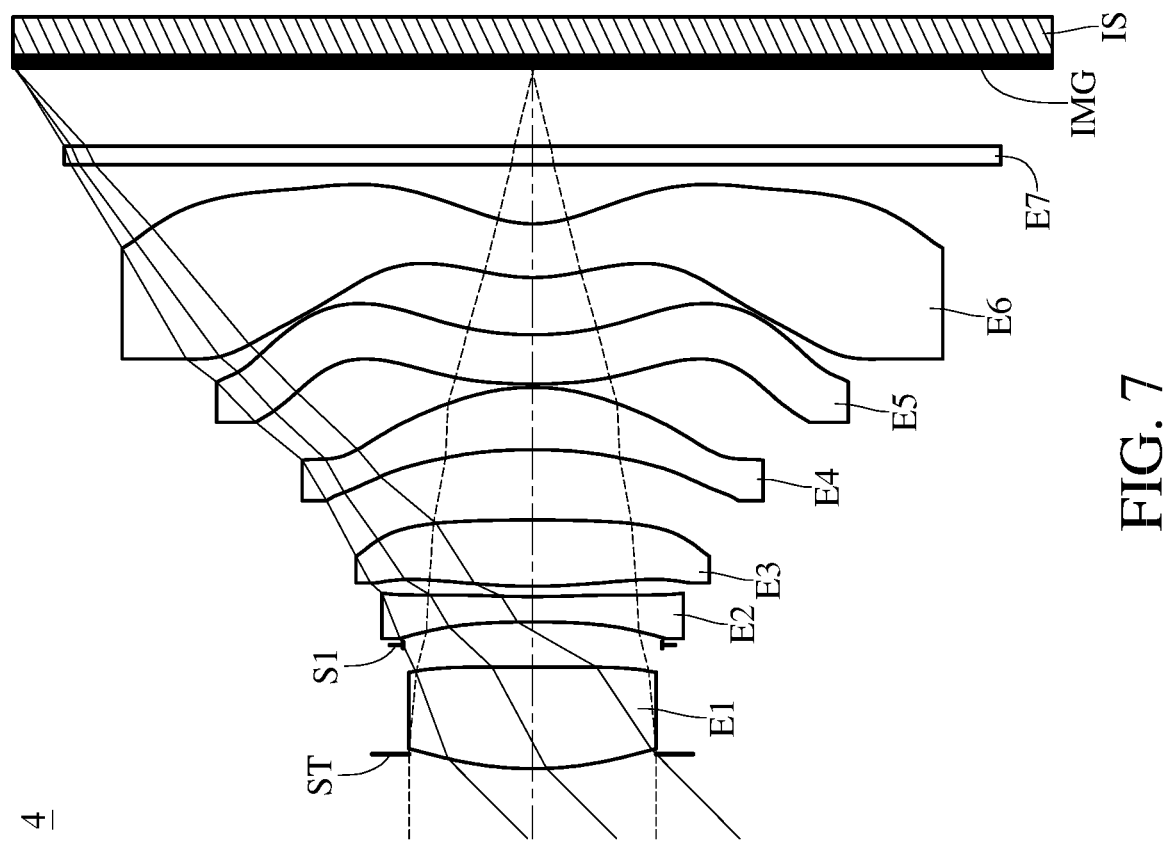
FIG. 7 is a schematic view of an image capturing unit according to the 4th embodiment of the present disclosure.
Figure 8:
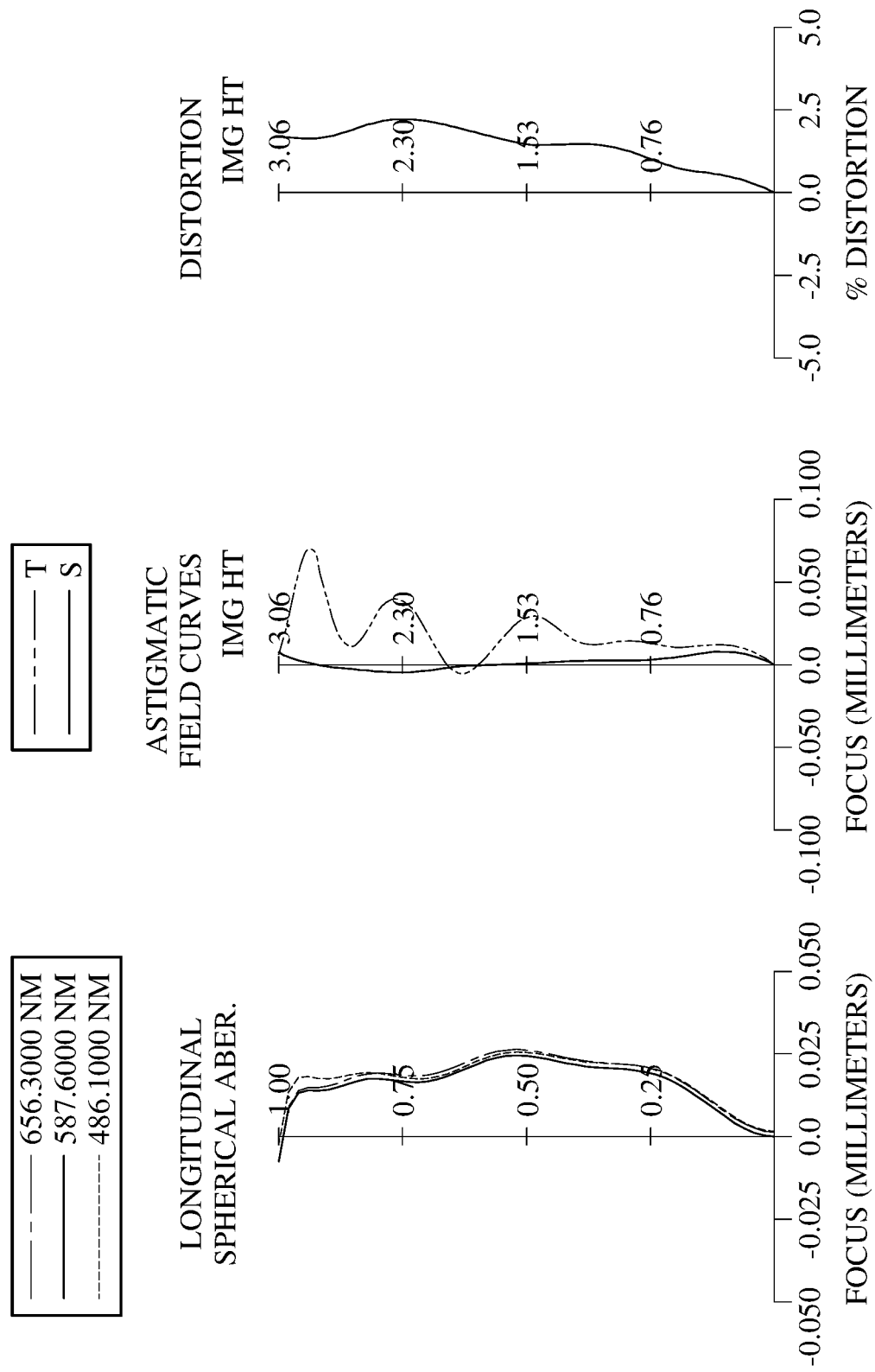
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes an optical photographing lens assembly (its reference numeral is omitted) of the present disclosure and an image sensor IS. The optical photographing lens assembly includes, in order from an object side to an image side along an optical path, an aperture stop ST, a first lens element E1, a stop S1, a second lens element E2, a third lens element E3, a fourth lens element E4, a fifth lens element E5, a sixth lens element E6, a filter E7 and an image surface IMG. The optical photographing lens assembly includes six lens elements (E1, E2, E3, E4, E5 and E6) with no additional lens element disposed between each of the adjacent six lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has two inflection points. The image-side surface of the first lens element E1 has one inflection point. The image-side surface of the first lens element E1 has one convex critical point in an off-axis region thereof.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has two inflection points.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has two inflection points. The image-side surface of the third lens element E3 has one inflection point. The object-side surface of the third lens element E3 has one concave critical point in an off-axis region thereof.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has three inflection points.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has three inflection points. The image-side surface of the fifth lens element E5 has three inflection points. The object-side surface of the fifth lens element E5 has one concave critical point in an off-axis region thereof. The image-side surface of the fifth lens element E5 has one convex critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has four inflection points. The image-side surface of the sixth lens element E6 has four inflection points. The object-side surface of the sixth lens element E6 has one concave critical point and one convex critical point in an off-axis region thereof. The image-side surface of the sixth lens element E6 has one convex critical point in an off-axis region thereof.

The filter E7 is made of glass material and located between the sixth lens element E6 and the image surface IMG, and will not affect the focal length of the optical photographing lens assembly. The image sensor IS is disposed on or near the image surface IMG of the optical photographing lens assembly.

The detailed optical data of the 4th embodiment are shown in Table 4A and the aspheric surface data are shown in Table 4B below.

TABLE 4A

4th Embodiment
f = 3.03 mm, Fno = 2.08, HFOV = 44.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.086 | | | | |
| 2 | Lens 1 | 2.0305 (ASP) | 0.600 | Plastic | 1.544 | 56.0 | 4.01 |
| 3 | | 26.4609 (ASP) | 0.131 | | | | |
| 4 | Stop | Plano | 0.136 | | | | |
| 5 | Lens 2 | −7.3008 (ASP) | 0.150 | Plastic | 1.669 | 19.5 | −4.76 |
| 6 | | 5.6855 (ASP) | 0.061 | | | | |
| 7 | Lens 3 | 3.4157 (ASP) | 0.392 | Plastic | 1.562 | 44.6 | 4.82 |
| 8 | | −12.5000 (ASP) | 0.415 | | | | |
| 9 | Lens 4 | −3.6520 (ASP) | 0.368 | Plastic | 1.544 | 56.0 | 3.49 |
| 10 | | −1.2943 (ASP) | 0.020 | | | | |
| 11 | Lens 5 | 3.6829 (ASP) | 0.291 | Plastic | 1.614 | 25.6 | −7.20 |
| 12 | | 1.9478 (ASP) | 0.338 | | | | |
| 13 | Lens 6 | 0.9746 (ASP) | 0.317 | Plastic | 1.544 | 56.0 | −5.33 |
| 14 | | 0.6459 (ASP) | 0.350 | | | | |
| 15 | Filter | Plano | 0.110 | Glass | 1.517 | 64.2 | — |
| 16 | | Plano | 0.461 | | | | |
| 17 | Image | Plano | — | | | | |

Note:
Reference wavelength is 587.6 nm (d-line).
An effective radius of the stop S1 (Surface 4) is 0.765 mm.

TABLE 4B

Aspheric Coefficients

| Surface # | 2 | 3 | 5 | 6 |
|---|---|---|---|---|
| k = | −2.709940000E+00 | 0.000000000E+00 | 0.000000000E+00 | −2.601610000E+00 |
| A4 = | −6.147793048E−02 | −1.004287100E−01 | −2.177503043E−01 | −2.516403518E−01 |
| A6 = | 1.332134456E+00 | −4.778979885E−01 | −1.266328742E+00 | −2.131656844E−01 |
| A8 = | −1.396797910E+01 | 3.940191445E+00 | 1.590584977E+01 | 3.372807633E+00 |
| A10 = | 8.254331205E+01 | −1.987162539E+01 | −9.612049333E+01 | −1.118552677E+01 |
| A12 = | −2.971910532E+02 | 5.538820464E+01 | 3.603550968E+02 | 2.302742212E+01 |
| A14 = | 6.568882735E+02 | −7.881778239E+01 | −8.523202005E+02 | −3.414297425E+01 |
| A16 = | −8.645492009E+02 | 3.493541230E+01 | 1.231447434E+03 | 3.561157357E+01 |
| A18 = | 6.152592400E+02 | 3.531289942E+01 | −9.890315731E+02 | −2.248873295E+01 |
| A20 = | −1.793057612E+02 | −3.312259355E+01 | 3.375950482E+02 | 6.261233077E+00 |

| Surface # | 7 | 8 | 9 | 10 |
|---|---|---|---|---|
| k = | 0.000000000E+00 | −8.996110000E+01 | 0.000000000E+00 | −1.000000000E+00 |
| A4 = | −1.308047697E−01 | −8.844223460E−02 | −3.587194489E−01 | −1.575896254E−01 |
| A6 = | 3.038926860E−02 | 3.173096081E−01 | 6.170042344E−01 | 1.267231787E+00 |
| A8 = | −8.717971412E−01 | −2.344237477E+00 | 2.766616690E+00 | −3.036801330E+00 |
| A10 = | 6.903655783E+00 | 1.239866228E+01 | −1.482492876E+01 | 3.109656228E+00 |
| A12 = | −2.751705982E+01 | −4.899524379E+01 | 2.818999050E+01 | 9.138116922E−01 |
| A14 = | 6.609290685E+01 | 1.278525790E+02 | −1.724683482E+01 | −7.152417985E+00 |
| A16 = | −9.990469162E+01 | −2.161653787E+02 | −3.337251093E+01 | 9.853195282E+00 |
| A18 = | 9.093321121E+01 | 2.346506987E+02 | 9.321117106E+01 | −7.033048354E+00 |
| A20 = | −4.464561755E+01 | −1.582332032E+02 | −1.107964722E+02 | 2.826183566E+00 |
| A22 = | 8.982244477E+00 | 6.046090114E+01 | 7.790889424E+01 | −6.043772264E−01 |
| A24 = | — | −1.000232157E+01 | −3.340241976E+01 | 5.351510444E−02 |
| A26 = | — | — | 8.092913142E+00 | — |
| A28 = | — | — | −8.506109603E−01 | — |

| Surface # | 11 | 12 | 13 | 14 |
|---|---|---|---|---|
| k = | 0.000000000E+00 | −8.138510000E+00 | −1.026740000E+01 | −3.683500000E+00 |
| A4 = | 1.441735497E−01 | 2.322518907E−02 | −1.864206256E−01 | −4.145451095E−01 |
| A6 = | 1.325379135E+00 | 1.426815936E+00 | −1.052823348E+00 | 5.776847489E−01 |
| A8 = | −7.281570944E+00 | −6.227737610E+00 | 4.700373073E+00 | −6.821930994E−01 |
| A10 = | 1.795440202E+01 | 1.294899465E+01 | −1.117374095E+01 | 4.977110220E−01 |
| A12 = | −2.918756862E+01 | −1.723413777E+01 | 1.624147646E+01 | −1.747593204E−01 |
| A14 = | 3.443684489E+01 | 1.598452072E+01 | −1.542453628E+01 | −1.256729559E−02 |
| A16 = | −3.045202538E+01 | −1.067789301E+01 | 1.004867660E+01 | 4.345846314E−02 |
| A18 = | 2.028865082E+01 | 5.195290885E+00 | −4.621317399E+00 | −2.246641181E−02 |
| A20 = | −1.009980507E+01 | −1.836431055E+00 | 1.517436244E+00 | 6.635168749E−03 |
| A22 = | 3.687843693E+00 | 4.644908935E−01 | −3.541315577E−01 | −1.280366434E−03 |
| A24 = | −9.564931358E−01 | −8.146938777E−02 | 5.741843330E−02 | 1.649831661E−04 |
| A26 = | 1.664980592E−01 | 9.351355909E−03 | −6.151235716E−03 | −1.376403838E−05 |
| A28 = | −1.741021243E−02 | −6.268322548E−04 | 3.915772255E−04 | 6.751066940E−07 |
| A30 = | 8.252226837E−04 | 1.841300969E−05 | −1.121781403E−05 | −1.482064332E−08 |

In the 4th embodiment, the equation of the aspheric surface profiles of the aforementioned lens elements is the same as the equation of the 1st embodiment. Also, the definitions of these parameters shown in Table 4C below are the same as those stated in the 1st embodiment with corresponding values for the 4th embodiment, so an explanation in this regard will not be provided again.

Moreover, these parameters can be calculated from Table 4A and Table 4B as the following values and satisfy the following conditions:

TABLE 4C

| Values of Conditional Expressions | | | |
|---|---|---|---|
| f [mm] | 3.03 | R11/R10 | 0.50 |
| Fno | 2.08 | R12/R1 | 0.32 |
| HFOV [deg.] | 44.7 | EPD/(CT1 + T12) | 1.68 |
| FOV [deg.] | 89.4 | (CT4 − T12)/CT1 | 0.17 |
| TL/ImgH | 1.35 | CT4/CT1 | 0.61 |
| SD/f | 1.03 | T12/CT4 | 0.73 |
| f/f6 | −0.57 | T12/T34 | 0.64 |
| f4/f2 | −0.73 | 10 × T23/CT1 | 1.02 |
| \|f6/f3\| | 1.11 | T23/T12 | 0.23 |
| (\|f/f2\| + \|f/f5\|)/\|f/f4\| | 1.22 | (T23 + T45)/T12 | 0.30 |

TABLE 4C-continued

| Values of Conditional Expressions | | | |
|---|---|---|---|
| (\|f/f3\| + \|f/f6\|)/\|f/f1\| | 1.58 | (T23 + T56)/CT1 | 0.67 |
| f/R1 | 1.49 | T56/CT1 | 0.56 |
| f/R10 | 1.55 | Vmin | 19.5 |
| \|f/R9\| + f/R10 | 2.38 | V2/V3 | 0.44 |
| \|f6/R11\| + \|f6/R12\| | 13.73 | ET1/CT1 | 0.73 |
| (R1 − R11)/(R1 + R11) | 0.35 | 10 × SAG1R1/R1 | 0.60 |
| (R4 − R11)/(R4 + R11) | 0.71 | SAG1R1/CT1 | 0.20 |
| (R4 − R10)/(R4 + R10) | 0.49 | Y2R2/Y1R1 | 1.21 |
| R5/R4 | 0.60 | Y1R1/ImgH | 0.24 |
| \|R11/R4\| | 0.17 | — | — |

5th Embodiment

Figure 9:
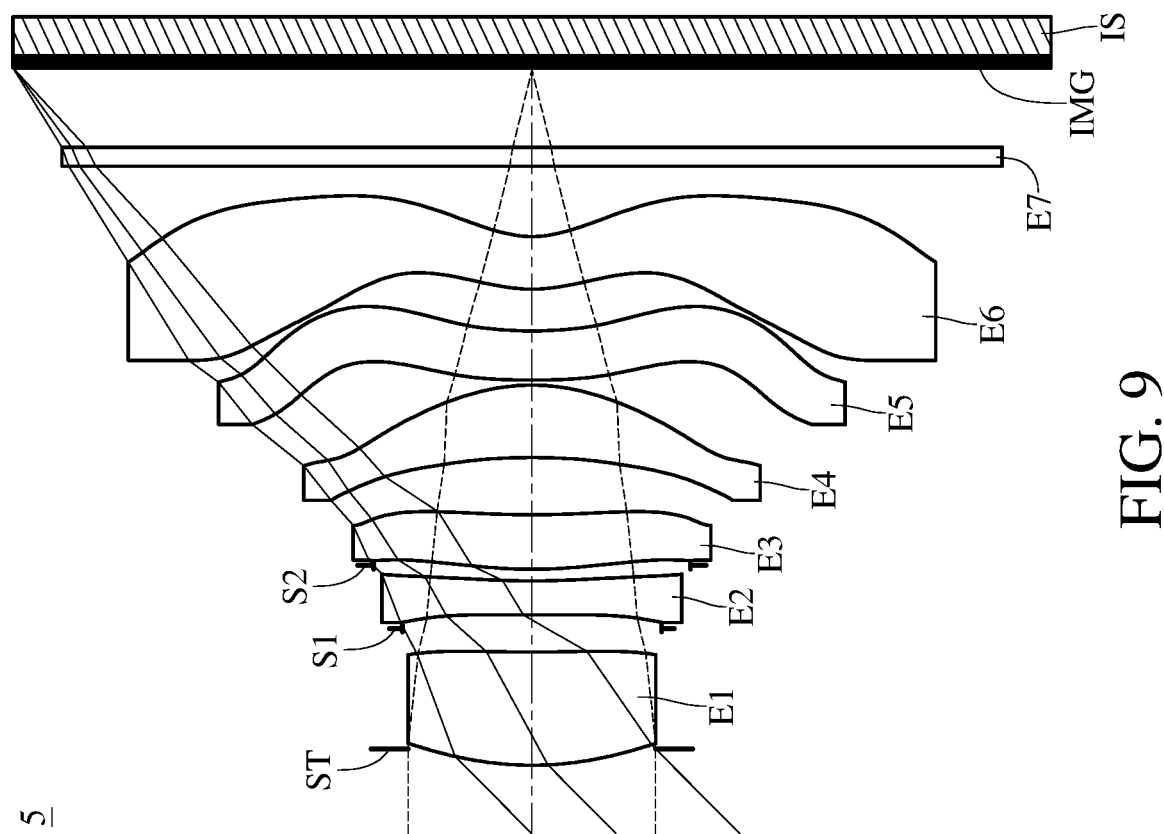
FIG. 9 is a schematic view of an image capturing unit according to the 5th embodiment of the present disclosure.
Figure 10:
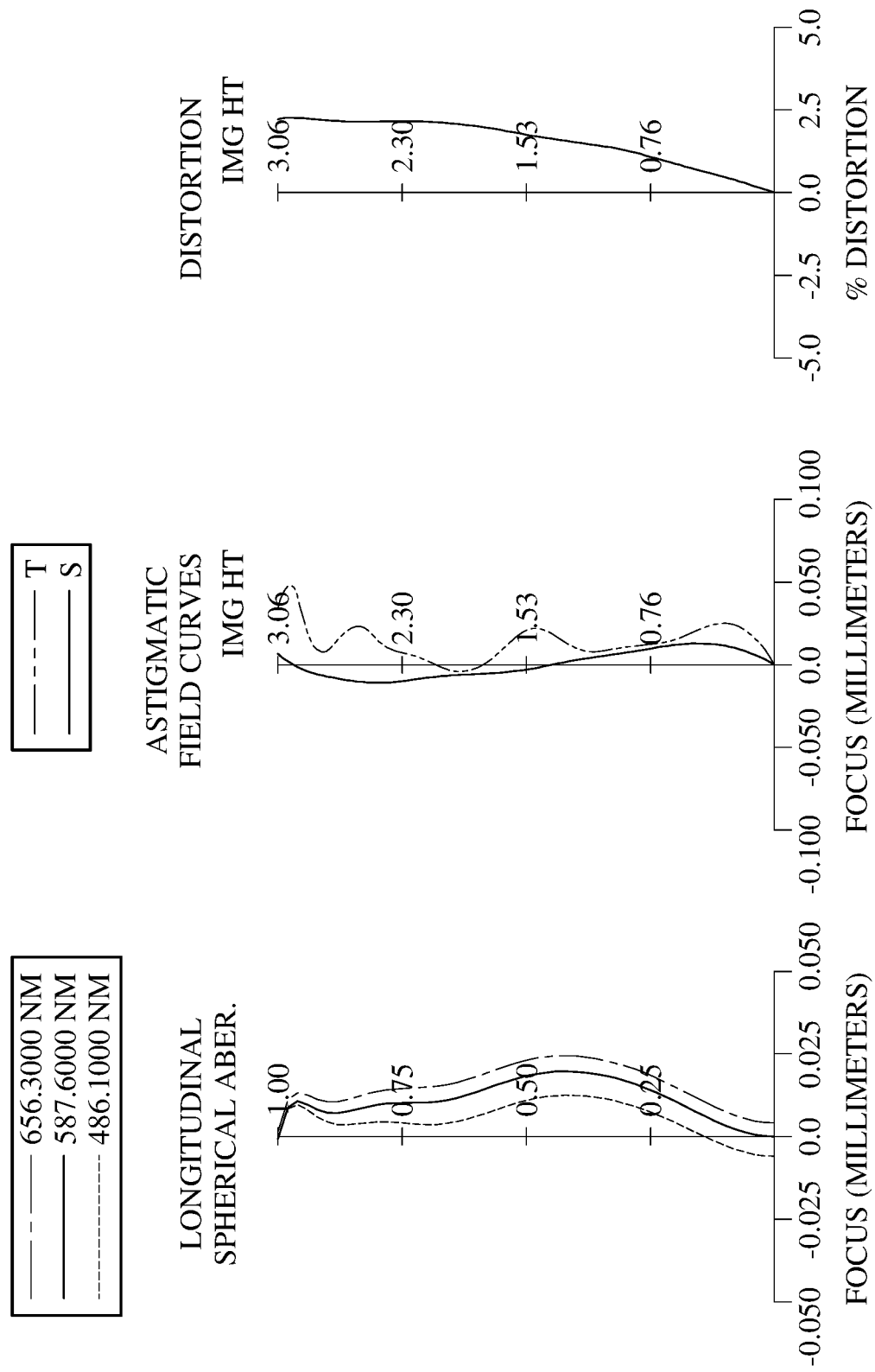
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes an optical photographing lens assembly (its reference numeral is omitted) of the present disclosure and an image sensor IS.

The optical photographing lens assembly includes, in order from an object side to an image side along an optical path, an aperture stop ST, a first lens element E1, a stop S1, a second lens element E2, a stop S2, a third lens element E3, a fourth lens element E4, a fifth lens element E5, a sixth lens element E6, a filter E7 and an image surface IMG. The optical photographing lens assembly includes six lens elements (E1, E2, E3, E4, E5 and E6) with no additional lens element disposed between each of the adjacent six lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The image-side surface of the first lens element E1 has one inflection point. The image-side surface of the first lens element E1 has one convex critical point in an off-axis region thereof.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has two inflection points. The image-side surface of the second lens element E2 has two inflection points. The object-side surface of the second lens element E2 has one concave critical point in an off-axis region thereof.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has two inflection points. The object-side surface of the third lens element E3 has one concave critical point and one convex critical point in an off-axis region thereof. The image-side surface of the third lens element E3 has one concave critical point and one convex critical point in an off-axis region thereof.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has three inflection points. The object-side surface of the fifth lens element E5 has one concave critical point in an off-axis region thereof. The image-side surface of the fifth lens element E5 has one convex critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has four inflection points. The image-side surface of the sixth lens element E6 has two inflection points. The object-side surface of the sixth lens element E6 has one concave critical point and one convex critical point in an off-axis region thereof. The image-side surface of the sixth lens element E6 has one convex critical point in an off-axis region thereof.

The filter E7 is made of glass material and located between the sixth lens element E6 and the image surface IMG, and will not affect the focal length of the optical photographing lens assembly. The image sensor IS is disposed on or near the image surface IMG of the optical photographing lens assembly.

The detailed optical data of the 5th embodiment are shown in Table 5A and the aspheric surface data are shown in Table 5B below.

TABLE 5A

5th Embodiment
f = 3.01 mm, Fno = 2.06, HFOV = 44.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.097 | | | | |
| 2 | Lens 1 | 1.9469 (ASP) | 0.669 | Plastic | 1.545 | 56.1 | 4.29 |
| 3 | | 10.1952 (ASP) | 0.139 | | | | |
| 4 | Stop | Plano | 0.081 | | | | |
| 5 | Lens 2 | 37.8807 (ASP) | 0.200 | Plastic | 1.669 | 19.5 | −7.56 |
| 6 | | 4.4527 (ASP) | 0.093 | | | | |
| 7 | Stop | Plano | −0.024 | | | | |
| 8 | Lens 3 | 2.6379 (ASP) | 0.322 | Plastic | 1.544 | 56.0 | 9.33 |
| 9 | | 5.2530 (ASP) | 0.338 | | | | |
| 10 | Lens 4 | −4.3776 (ASP) | 0.428 | Plastic | 1.544 | 56.0 | 3.06 |
| 11 | | −1.2464 (ASP) | 0.030 | | | | |
| 12 | Lens 5 | 5.0653 (ASP) | 0.290 | Plastic | 1.639 | 23.5 | −8.14 |
| 13 | | 2.5081 (ASP) | 0.247 | | | | |
| 14 | Lens 6 | 0.9222 (ASP) | 0.311 | Plastic | 1.534 | 56.0 | −5.82 |
| 15 | | 0.6278 (ASP) | 0.416 | | | | |

TABLE 5A-continued

5th Embodiment
f = 3.01 mm, Fno = 2.06, HFOV = 44.8 deg.

| Surface # | | Curvature Radius | Thickness | Material | Index | Abbe # | Focal Length |
|---|---|---|---|---|---|---|---|
| 16 | Filter | Plano | 0.110 | Glass | 1.517 | 64.2 | — |
| 17 | | Plano | 0.469 | | | | |
| 18 | Image | Plano | — | | | | |

Note:
Reference wavelength is 587.6 nm (d-line).
An effective radius of the stop S1 (Surface 4) is 0.765 mm.
An effective radius of the stop S2 (Surface 7) is 0.935 mm.

TABLE 5B

Aspheric Coefficients

| Surface # | 2 | 3 | 5 | 6 |
|---|---|---|---|---|
| k = | −2.111520000E+00 | 0.000000000E+00 | 0.000000000E+00 | 5.580440000E+00 |
| A4 = | −1.493990499E−02 | −1.190023499E−01 | −1.189772489E−01 | −2.068444296E−01 |
| A6 = | 3.956580950E−01 | −5.275422608E−02 | −8.410547469E−01 | 2.051641679E−01 |
| A8 = | −4.303325373E+00 | −3.684499021E−01 | 8.282682767E+00 | 2.591830464E−01 |
| A10 = | 2.638211115E+01 | 3.265111676E+00 | −5.007746935E+01 | −2.191505497E+00 |
| A12 = | −9.973404089E+01 | −1.850941838E+01 | 1.864837800E+02 | 6.371085913E+00 |
| A14 = | 2.306299884E+02 | 6.338086854E+01 | −4.317962919E+02 | −1.064638172E+01 |
| A16 = | −3.144974543E+02 | −1.218324508E+02 | 6.092571003E+02 | 1.046954704E+01 |
| A18 = | 2.287405084E+02 | 1.222096914E+02 | −4.786399415E+02 | −5.391792391E+00 |
| A20 = | −6.684299711E+01 | −4.988412147E+01 | 1.601303135E+02 | 1.057547859E+00 |

| Surface # | 8 | 9 | 10 | 11 |
|---|---|---|---|---|
| k = | 0.000000000E+00 | −7.187720000E+00 | 0.000000000E+00 | −1.000000000E+00 |
| A4 = | −3.144877634E−01 | −1.823272170E−01 | −4.450819153E−01 | −2.574505298E−01 |
| A6 = | 1.144804349E+00 | 6.321098494E−01 | 2.677337648E+00 | 2.384795300E+00 |
| A8 = | −7.161812256E+00 | −2.831886761E+00 | −1.208468323E+01 | −8.754271327E+00 |
| A10 = | 3.303529231E+01 | 8.301460906E+00 | 5.136955568E+01 | 1.877646192E+01 |
| A12 = | −1.003224891E+02 | −1.884989766E+01 | −1.827906189E+02 | −2.513485856E+01 |
| A14 = | 1.992980286E+02 | 3.540599963E+01 | 4.816447480E+02 | 2.104603631E+01 |
| A16 = | −2.558216474E+02 | −5.409318028E+01 | −9.036855059E+02 | −1.057255691E+01 |
| A18 = | 2.025419050E+02 | 6.174318684E+01 | 1.194357519E+03 | 2.802186476E+00 |
| A20 = | −8.897135312E+01 | −4.748097259E+01 | −1.099413888E+03 | −1.921222455E−01 |
| A22 = | 1.643207113E+01 | 2.142543418E+01 | 6.879352601E+02 | −7.118920664E−02 |
| A24 = | — | −4.211695401E+00 | −2.783510710E+02 | 1.235320354E−02 |
| A26 = | — | — | 6.555245769E+01 | — |
| A28 = | — | — | −6.812182081E+00 | — |

| Surface # | 12 | 13 | 14 | 15 |
|---|---|---|---|---|
| k = | 0.000000000E+00 | −1.104630000E+01 | −8.130300000E+00 | −3.503000000E+00 |
| A4 = | 2.665502346E−01 | 2.657172821E−01 | −1.624306351E−01 | −3.678705095E−01 |
| A6 = | 8.091060440E−01 | 3.363096311E−01 | −8.530228618E−01 | 3.017508441E−01 |
| A8 = | −6.527629972E+00 | −4.165619823E+00 | 2.836584957E+00 | −1.688414957E−01 |
| A10 = | 1.729834734E+01 | 1.107532617E+01 | −5.760556797E+00 | −1.982973924E−03 |
| A12 = | −2.770785619E+01 | −1.715105197E+01 | 7.782851042E+00 | 1.312044657E−01 |
| A14 = | 3.039560962E+01 | 1.796755480E+01 | −7.092871507E+00 | −1.436613681E−01 |
| A16 = | −2.394960357E+01 | −1.341492173E+01 | 4.494193424E+00 | 8.586378267E−02 |
| A18 = | 1.378470201E+01 | 7.282533036E+00 | −2.026899007E+00 | −3.337949506E−02 |
| A20 = | −5.795841349E+00 | −2.882370031E+00 | 6.570386188E−01 | 8.907904843E−03 |
| A22 = | 1.758120695E+00 | 8.222305512E−01 | −1.522438445E−01 | −1.653822321E−03 |
| A24 = | −3.744305331E−01 | −1.643507979E−01 | 2.462633647E−02 | 2.106982930E−04 |
| A26 = | 5.313255179E−02 | 2.179905507E−02 | −2.642149765E−03 | −1.760612842E−05 |
| A28 = | −4.514138002E−03 | −1.719952941E−03 | 1.689506180E−04 | 8.703446547E−07 |
| A30 = | 1.738383241E−04 | 6.099366900E−05 | −4.872873410E−06 | −1.931034206E−08 |

In the 5th embodiment, the equation of the aspheric surface profiles of the aforementioned lens elements is the same as the equation of the 1st embodiment. Also, the definitions of these parameters shown in Table 5C below are the same as those stated in the 1st embodiment with corresponding values for the 5th embodiment, so an explanation in this regard will not be provided again.

Moreover, these parameters can be calculated from Table 5A and Table 5B as the following values and satisfy the following conditions:

TABLE 5C

| Values of Conditional Expressions | | | |
|---|---|---|---|
| f [mm] | 3.01 | R11/R10 | 0.37 |
| Fno | 2.06 | R12/R1 | 0.32 |
| HFOV [deg.] | 44.8 | EPD/(CT1 + T12) | 1.64 |
| FOV [deg.] | 89.6 | (CT4 − T12)/CT1 | 0.31 |
| TL/ImgH | 1.35 | CT4/CT1 | 0.64 |
| SD/f | 1.01 | T12/CT4 | 0.51 |
| f/f6 | −0.52 | T12/T34 | 0.65 |
| f4/f2 | −0.40 | 10 × T23/CT1 | 1.03 |
| |f6/f3| | 0.62 | T23/T12 | 0.31 |
| (|f/f2| + |f/f5|)/|f/f4| | 0.78 | (T23 + T45)/T12 | 0.45 |
| (|f/f3| + |f/f6|)/|f/f1| | 1.20 | (T23 + T56)/CT1 | 0.47 |
| f/R1 | 1.55 | T56/CT1 | 0.37 |
| f/R10 | 1.20 | Vmin | 19.5 |
| |f/R9| + f/R10 | 1.79 | V2/V3 | 0.35 |
| |f6/R11| + |f6/R12| | 15.59 | ET1/CT1 | 0.77 |
| (R1 − R11)/(R1 + R11) | 0.36 | 10 × SAG1R1/R1 | 0.68 |
| (R4 − R11)/(R4 + R11) | 0.66 | SAG1R1/CT1 | 0.20 |
| (R4 − R10)/(R4 + R10) | 0.28 | Y2R2/Y1R1 | 1.20 |
| R5/R4 | 0.59 | Y1R1/ImgH | 0.24 |
| |R11/R4| | 0.21 | — | — |

6th Embodiment

Figure 11:
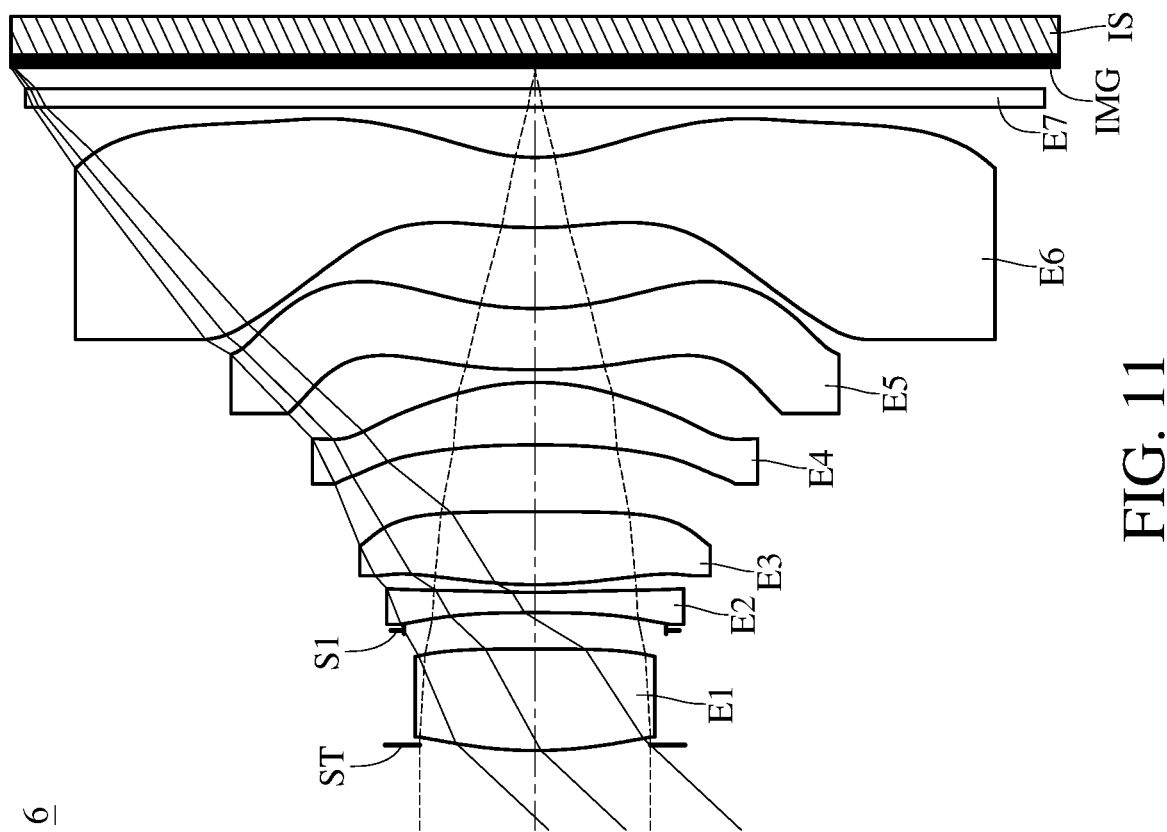
FIG. 11 is a schematic view of an image capturing unit according to the 6th embodiment of the present disclosure.
Figure 12:
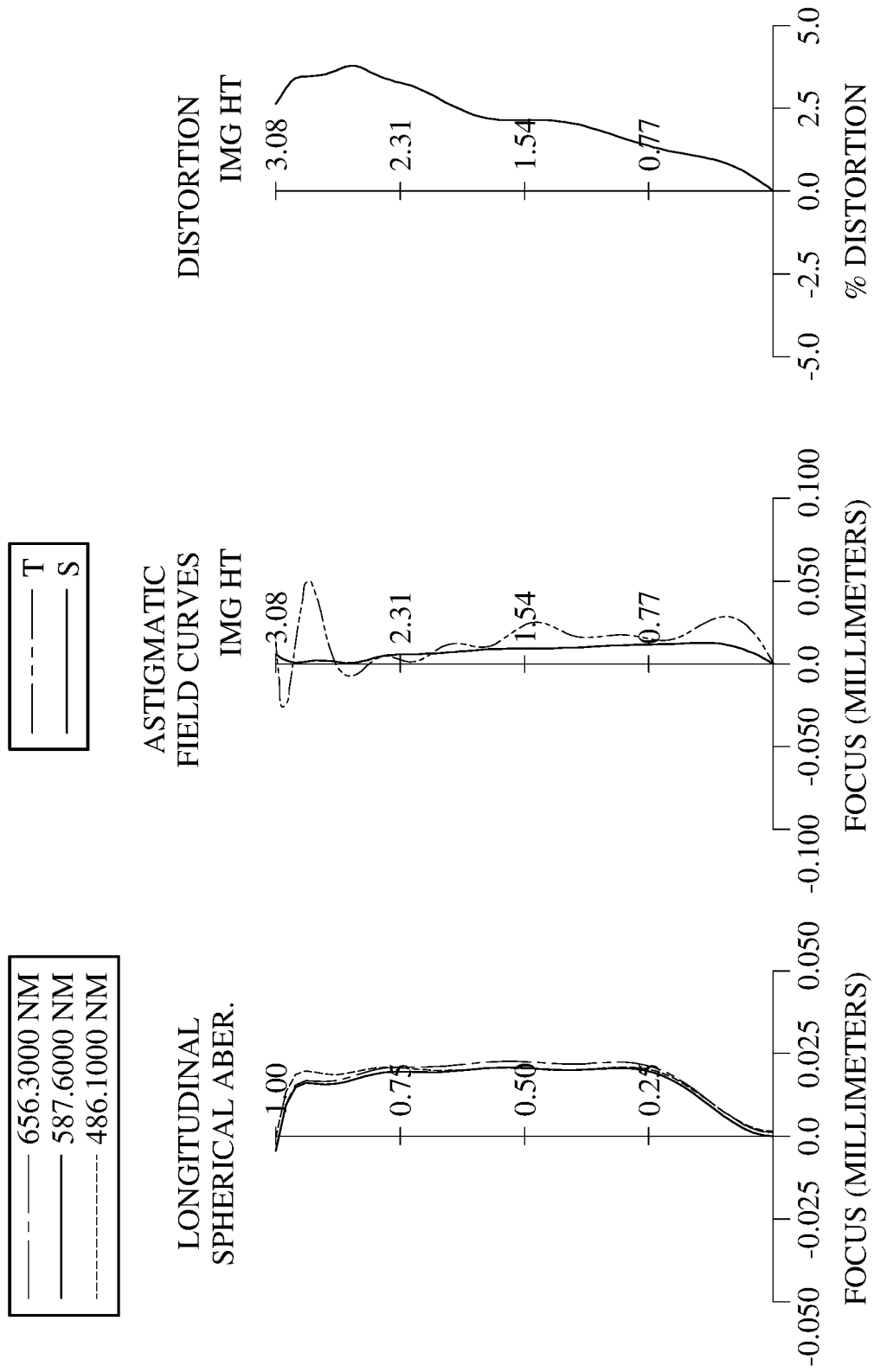
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes an optical photographing lens assembly (its reference numeral is omitted) of the present disclosure and an image sensor IS. The optical photographing lens assembly includes, in order from an object side to an image side along an optical path, an aperture stop ST, a first lens element E1, a stop S1, a second lens element E2, a third lens element E3, a fourth lens element E4, a fifth lens element E5, a sixth lens element E6, a filter E7 and an image surface IMG. The optical photographing lens assembly includes six lens elements (E1, E2, E3, E4, E5 and E6) with no additional lens element disposed between each of the adjacent six lens elements.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has two inflection points.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has two inflection points.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has two inflection points. The object-side surface of the third lens element E3 has one concave critical point in an off-axis region thereof. The image-side surface of the third lens element E3 has one convex critical point in an off-axis region thereof.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has three inflection points. The image-side surface of the fourth lens element E4 has one concave critical point in an off-axis region thereof.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has three inflection points. The image-side surface of the fifth lens element E5 has three inflection points. The object-side surface of the fifth lens element E5 has one concave critical point in an off-axis region thereof. The image-side surface of the fifth lens element E5 has one convex critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points. The image-side surface of the sixth lens element E6 has four inflection points. The object-side surface of the sixth lens element E6 has one concave critical point in an off-axis region thereof. The image-side surface of the sixth lens element E6 has one convex critical point in an off-axis region thereof.

The filter E7 is made of glass material and located between the sixth lens element E6 and the image surface IMG, and will not affect the focal length of the optical photographing lens assembly. The image sensor IS is disposed on or near the image surface IMG of the optical photographing lens assembly.

The detailed optical data of the 6th embodiment are shown in Table 6A and the aspheric surface data are shown in Table 6B below.

TABLE 6A

6th Embodiment
f = 2.79 mm, Fno = 2.05, HFOV = 46.9 deg.

| Surface # |  | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.032 | | | | |
| 2 | Lens 1 | 2.4479 (ASP) | 0.600 | Plastic | 1.544 | 56.0 | 4.40 |
| 3 |  | −102.7341 (ASP) | 0.110 | | | | |
| 4 | Stop | Plano | 0.105 | | | | |
| 5 | Lens 2 | −13.1928 (ASP) | 0.120 | Plastic | 1.669 | 19.5 | −5.82 |
| 6 |  | 5.5447 (ASP) | 0.045 | | | | |
| 7 | Lens 3 | 2.5438 (ASP) | 0.431 | Plastic | 1.544 | 56.0 | 4.76 |
| 8 |  | 140.6293 (ASP) | 0.395 | | | | |
| 9 | Lens 4 | −8.7290 (ASP) | 0.370 | Plastic | 1.544 | 56.0 | 3.30 |
| 10 |  | −1.5109 (ASP) | 0.074 | | | | |
| 11 | Lens 5 | 4.4533 (ASP) | 0.362 | Plastic | 1.614 | 25.6 | −6.51 |
| 12 |  | 2.0400 (ASP) | 0.478 | | | | |
| 13 | Lens 6 | 2.3327 (ASP) | 0.414 | Plastic | 1.544 | 56.0 | −3.88 |
| 14 |  | 1.0390 (ASP) | 0.297 | | | | |
| 15 | Filter | Plano | 0.110 | Glass | 1.517 | 64.2 | — |
| 16 |  | Plano | 0.124 | | | | |
| 17 | Image | Plano | — | | | | |

Note:
Reference wavelength is 587.6 nm (d-line).
An effective radius of the stop S1 (Surface 4) is 0.773 mm.

TABLE 6B

Aspheric Coefficients

| Surface # | 2 | 3 | 5 | 6 |
|---|---|---|---|---|
| k = | −5.099120000E+00 | 0.000000000E+00 | 0.000000000E+00 | 3.666310000E+00 |
| A4 = | −6.874073535E−02 | −1.230192514E−01 | −1.770790770E−01 | −3.436289287E−01 |
| A6 = | 1.341067822E+00 | −7.587074577E−01 | −8.408872343E−01 | 1.138301906E+00 |
| A8 = | −1.725855399E+01 | 6.811202303E+00 | 8.503065078E+00 | −5.007332222E+00 |
| A10 = | 1.246396605E+02 | −3.858359278E+01 | −4.469569691E+01 | 2.001255713E+01 |
| A12 = | −5.523934001E+02 | 1.387743205E+02 | 1.593285319E+02 | −5.027287708E+01 |
| A14 = | 1.517547464E+03 | −3.151828518E+02 | −3.723298970E+02 | 7.478988174E+01 |
| A16 = | −2.514296185E+03 | 4.385085660E+02 | 5.364623596E+02 | −6.431031369E+01 |
| A18 = | 2.294663933E+03 | −3.410211490E+02 | −4.287690040E+02 | 2.955653292E+01 |
| A20 = | −8.827415533E+02 | 1.135990331E+02 | 1.448234881E+02 | −5.620942345E+00 |

| Surface # | 7 | 8 | 9 | 10 |
|---|---|---|---|---|
| k = | 0.000000000E+00 | −9.000000000E+01 | 0.000000000E+00 | −1.000000000E+00 |
| A4 = | −4.091436560E−01 | −1.996405820E−01 | −3.089041216E−01 | 2.122538641E−01 |
| A6 = | 2.599490416E+00 | 5.711174771E−01 | 5.836927480E−01 | −2.210852360E+00 |
| A8 = | −1.606532049E+01 | −1.690677475E+00 | −4.871698682E−01 | 1.230118735E+01 |
| A10 = | 6.859679114E+01 | 3.699503816E+00 | 6.862561533E+00 | −3.731780355E+01 |
| A12 = | −1.986347276E+02 | −1.115757268E+01 | −4.861478940E+01 | 7.097158334E+01 |
| A14 = | 3.859872622E+02 | 3.290368368E+01 | 1.631006533E+02 | −8.953480554E+01 |
| A16 = | −4.939137727E+02 | −6.631132019E+01 | −3.312484331E+02 | 7.561986708E+01 |
| A18 = | 3.958812704E+02 | 8.397796127E+01 | 4.430742525E+02 | −4.194939186E+01 |
| A20 = | −1.784824132E+02 | −6.457462768E+01 | −4.005945628E+02 | 1.458135138E+01 |
| A22 = | 3.428974254E+01 | 2.764331956E+01 | 2.431974517E+02 | −2.868691332E+00 |
| A24 = | — | −5.041229570E+00 | −9.518178232E+01 | 2.431554310E−01 |
| A26 = | — | — | 2.171582692E+01 | — |
| A28 = | — | — | −2.193424262E+00 | — |

| Surface # | 11 | 12 | 13 | 14 |
|---|---|---|---|---|
| k = | 0.000000000E+00 | −9.575570000E+00 | −1.050920000E+01 | −2.802560000E+00 |
| A4 = | 4.391207041E−01 | 3.712013953E−01 | −4.003599959E−01 | −2.824106114E−01 |
| A6 = | −2.735361754E+00 | −1.668748502E+00 | 8.496413445E−01 | 1.499148576E−01 |
| A8 = | 1.109137170E+01 | 4.375384591E+00 | −3.515069568E+00 | 8.376373168E−02 |
| A10 = | −3.214850280E+01 | −7.964240491E+00 | 9.434996726E+00 | −2.360047574E−01 |
| A12 = | 6.684547101E+01 | 9.763644817E+00 | −1.588321496E+01 | 2.160565617E−01 |
| A14 = | −1.031568786E+02 | −7.980410143E+00 | 1.756978058E+01 | −1.183720863E−01 |
| A16 = | 1.202873006E+02 | 4.149615967E+00 | −1.323642444E+01 | 4.412966101E−02 |
| A18 = | −1.060720684E+02 | −1.107837445E+00 | 6.951798048E+00 | −1.178059389E−02 |
| A20 = | 6.983950670E+01 | −9.824528406E−02 | −2.571795939E+00 | 2.291443943E−03 |
| A22 = | −3.351177801E+01 | 2.088960954E−01 | 6.676340424E−01 | −3.230104938E−04 |
| A24 = | 1.128380314E+01 | −8.423555218E−02 | −1.190324440E−01 | 3.213099921E−05 |
| A26 = | −2.507365198E+00 | 1.777185046E−02 | 1.387785076E−02 | −2.134774697E−06 |

TABLE 6B-continued

| Aspheric Coefficients | | | | |
|---|---|---|---|---|
| A28 = | 3.279509394E−01 | −2.011543051E−03 | −9.524192419E−04 | 8.481763715E−08 |
| A30 = | −1.899760458E−02 | 9.663786945E−05 | 2.915649174E−05 | −1.520698836E−09 |

In the 6th embodiment, the equation of the aspheric surface profiles of the aforementioned lens elements is the same as the equation of the 1st embodiment. Also, the definitions of these parameters shown in Table 6C below are the same as those stated in the 1st embodiment with corresponding values for the 6th embodiment, so an explanation in this regard will not be provided again.

Moreover, these parameters can be calculated from Table 6A and Table 6B as the following values and satisfy the following conditions:

TABLE 6C

| Values of Conditional Expressions | | | |
|---|---|---|---|
| f [mm] | 2.79 | R11/R10 | 1.14 |
| Fno | 2.05 | R12/R1 | 0.42 |
| HFOV [deg.] | 46.9 | EPD/(CT1 + T12) | 1.67 |
| FOV [deg.] | 93.8 | (CT4 − T12)/CT1 | 0.26 |
| TL/ImgH | 1.31 | CT4/CT1 | 0.62 |
| SD/f | 1.24 | T12/CT4 | 0.58 |
| f/f6 | −0.72 | T12/T34 | 0.54 |
| f4/f2 | −0.57 | 10 × T23/CT1 | 0.75 |
| |f6/f3| | 0.82 | T23/T12 | 0.21 |
| (|f/f2| + |f/f5|)/|f/f4| | 1.07 | (T23 + T45)/T12 | 0.55 |
| (|f/f3| + |f/f6|)/|f/f1| | 2.06 | (T23 + T56)/CT1 | 0.87 |
| f/R1 | 1.14 | T56/CT1 | 0.80 |
| f/R10 | 1.37 | Vmin | 19.5 |
| |f/R9| + f/R10 | 1.99 | V2/V3 | 0.35 |
| |f6/R11| + |f6/R12| | 5.40 | ET1/CT1 | 0.77 |
| (R1 − R11)/(R1 + R11) | 0.02 | 10 × SAG1R1/R1 | 0.34 |
| (R4 − R11)/(R4 + R11) | 0.41 | SAG1R1/CT1 | 0.14 |
| (R4 − R10)/(R4 + R10) | 0.46 | Y2R2/Y1R1 | 1.26 |
| R5/R4 | 0.46 | Y1R1/ImgH | 0.23 |
| |R11/R4| | 0.42 | — | — |

7th Embodiment

Figure 13:
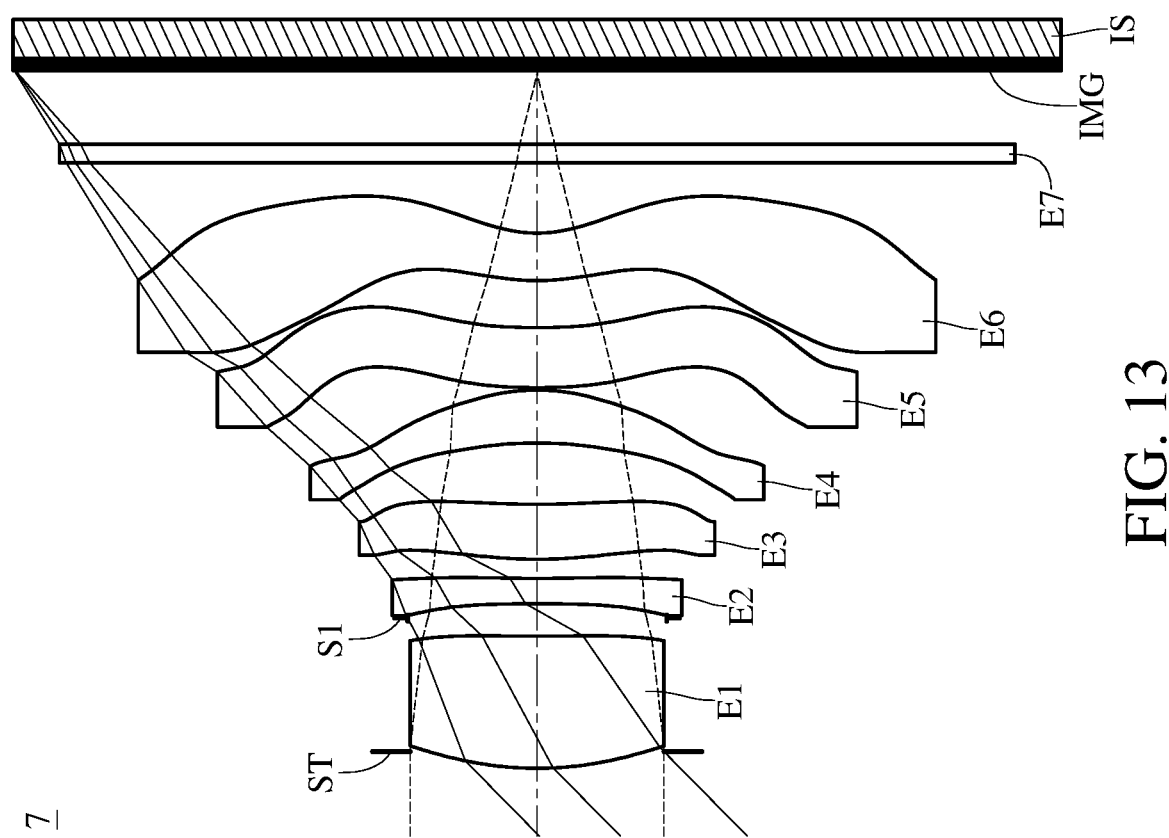
FIG. 13 is a schematic view of an image capturing unit according to the 7th embodiment of the present disclosure.
Figure 14:
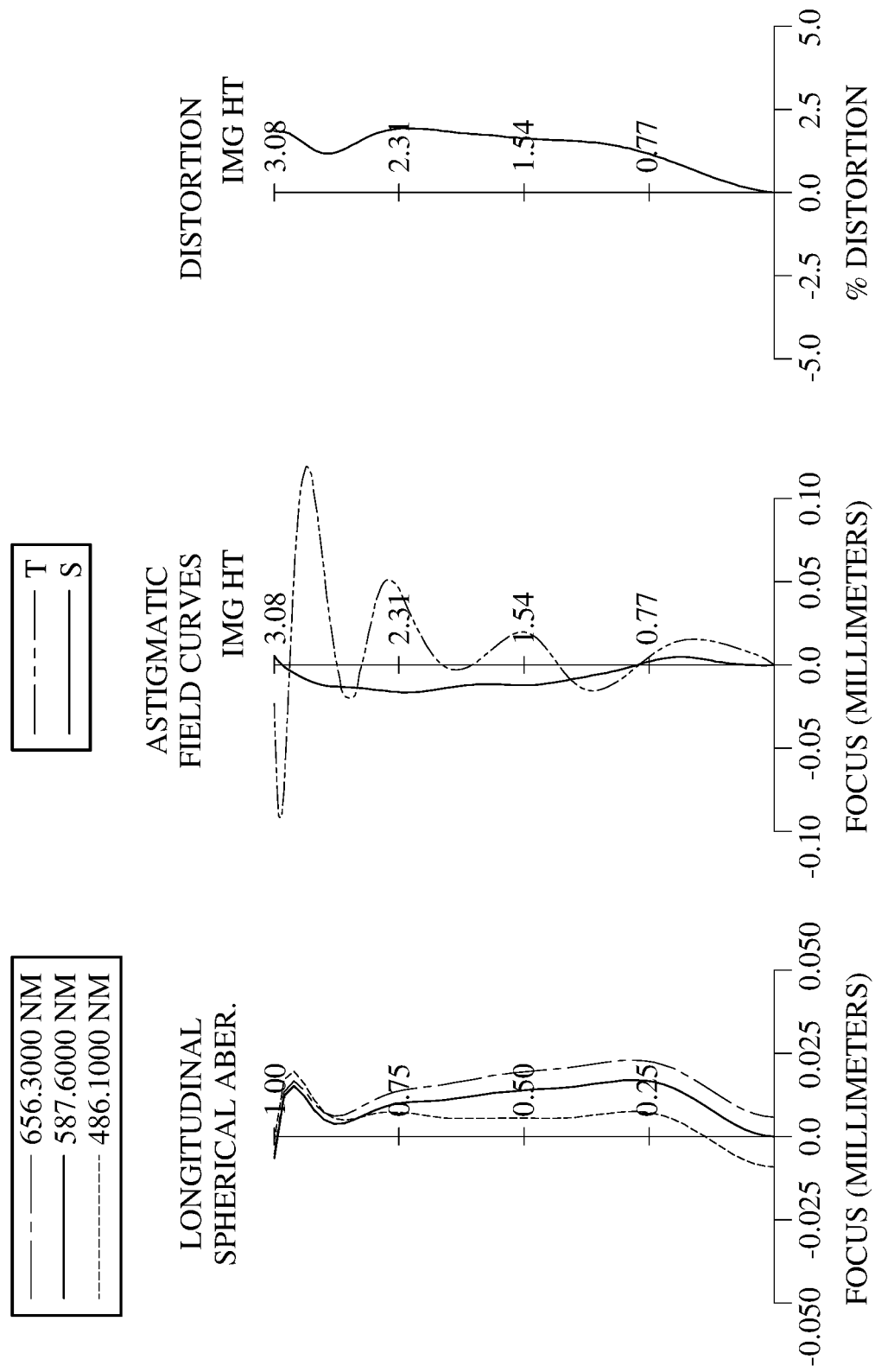
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes an optical photographing lens assembly (its reference numeral is omitted) of the present disclosure and an image sensor IS. The optical photographing lens assembly includes, in order from an object side to an image side along an optical path, an aperture stop ST, a first lens element E1, a stop S1, a second lens element E2, a third lens element E3, a fourth lens element E4, a fifth lens element E5, a sixth lens element E6, a filter E7 and an image surface IMG. The optical photographing lens assembly includes six lens elements (E1, E2, E3, E4, E5 and E6) with no additional lens element disposed between each of the adjacent six lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The image-side surface of the first lens element E1 has two inflection points. The image-side surface of the first lens element E1 has one convex critical point in an off-axis region thereof.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has two inflection points. The image-side surface of the second lens element E2 has one convex critical point in an off-axis region thereof.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has two inflection points. The object-side surface of the third lens element E3 has one concave critical point in an off-axis region thereof. The image-side surface of the third lens element E3 has one concave critical point and one convex critical point in an off-axis region thereof.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has three inflection points. The image-side surface of the fifth lens element E5 has three inflection points. The object-side surface of the fifth lens element E5 has one concave critical point in an off-axis region thereof. The image-side surface of the fifth lens element E5 has one convex critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has five inflection points. The image-side surface of the sixth lens element E6 has three inflection points. The object-side surface of the sixth lens element E6 has one concave critical point and one convex critical point in an off-axis region thereof. The image-side surface of the sixth lens element E6 has one convex critical point in an off-axis region thereof.

The filter E7 is made of glass material and located between the sixth lens element E6 and the image surface IMG, and will not affect the focal length of the optical photographing lens assembly. The image sensor IS is disposed on or near the image surface IMG of the optical photographing lens assembly.

The detailed optical data of the 7th embodiment are shown in Table 7A and the aspheric surface data are shown in Table 7B below.

TABLE 7A

7th Embodiment
f = 3.07 mm, Fno = 2.05, HFOV = 44.5 deg.

| Surface # |        | Curvature Radius | Thickness | Material | Index | Abbe # | Focal Length |
|-----------|--------|------------------|-----------|----------|-------|--------|--------------|
| 0         | Object | Plano            | Infinity  |          |       |        |              |
| 1         | Ape. Stop | Plano         | −0.099    |          |       |        |              |
| 2         | Lens 1 | 2.0005 (ASP)     | 0.781     | Plastic  | 1.544 | 56.0   | 4.12         |
| 3         |        | 16.1382 (ASP)    | 0.106     |          |       |        |              |
| 4         | Stop   | Plano            | 0.085     |          |       |        |              |
| 5         | Lens 2 | −16.2759 (ASP)   | 0.150     | Plastic  | 1.697 | 16.3   | −7.53        |
| 6         |        | 7.7762 (ASP)     | 0.113     |          |       |        |              |
| 7         | Lens 3 | 2.5215 (ASP)     | 0.325     | Plastic  | 1.562 | 44.6   | 8.45         |
| 8         |        | 5.1273 (ASP)     | 0.362     |          |       |        |              |
| 9         | Lens 4 | −2.6151 (ASP)    | 0.312     | Plastic  | 1.515 | 56.4   | 4.64         |
| 10        |        | −1.2997 (ASP)    | 0.015     |          |       |        |              |
| 11        | Lens 5 | 3.3401 (ASP)     | 0.355     | Plastic  | 1.567 | 37.4   | 20.35        |
| 12        |        | 4.5216 (ASP)     | 0.278     |          |       |        |              |
| 13        | Lens 6 | 1.3892 (ASP)     | 0.280     | Plastic  | 1.545 | 56.1   | −3.43        |
| 14        |        | 0.7399 (ASP)     | 0.416     |          |       |        |              |
| 15        | Filter | Plano            | 0.110     | Glass    | 1.517 | 64.2   | —            |
| 16        |        | Plano            | 0.434     |          |       |        |              |
| 17        | Image  | Plano            | —         |          |       |        |              |

Note:
Reference wavelength is 587.6 nm (d-line).
An effective radius of the stop S1 (Surface 4) is 0.765 mm.

TABLE 7B

Aspheric Coefficients

| Surface # | 2 | 3 | 5 | 6 |
|-----------|---|---|---|---|
| k =  | −2.034510000E+00 | 9.000000000E+01 | −7.630020000E+01 | −2.365580000E+00 |
| A4 = | −5.313002129E−02 | −1.714644045E−01 | −2.763238991E−01 | −3.588726251E−01 |
| A6 = | 1.061351022E+00 | 9.837935031E−01 | 1.045239313E+00 | 1.678537386E+00 |
| A8 = | −1.042223062E+01 | −1.212081759E+01 | −7.022437062E+00 | −7.692265292E+00 |
| A10 = | 5.866037599E+01 | 7.909473171E+01 | 2.790094380E+01 | 2.407315114E+01 |
| A12 = | −2.012653019E+02 | −3.129824701E+02 | −6.437519070E+01 | −4.811012343E+01 |
| A14 = | 4.231234371E+02 | 7.681369964E+02 | 8.436317789E+01 | 5.957107449E+01 |
| A16 = | −5.274409147E+02 | −1.136586003E+03 | −4.822362055E+01 | −4.193921827E+01 |
| A18 = | 3.531937428E+02 | 9.264897935E+02 | −8.567607295E+00 | 1.303756184E+01 |
| A20 = | −9.580357978E+01 | −3.188541947E+02 | 1.657658841E+01 | −1.815572970E−01 |

| Surface # | 7 | 8 | 9 | 10 |
|-----------|---|---|---|----|
| k =  | −2.114310000E+00 | −3.144360000E+01 | −2.564280000E+00 | −1.013660000E+00 |
| A4 = | −4.144748217E−01 | −2.194405314E−01 | −3.736435437E−01 | −6.608187389E−01 |
| A6 = | 2.350815128E+00 | 1.575968221E+00 | 2.404905550E+00 | 6.390786448E+00 |
| A8 = | −1.464316441E+01 | −1.210470577E+01 | −1.130805601E+00 | −2.548036013E+01 |
| A10 = | 6.404493014E+01 | 5.806113779E+01 | −4.420822978E+01 | 6.149081572E+01 |
| A12 = | −1.855857525E+02 | −1.855901603E+02 | 2.398905327E+02 | −1.005122054E+02 |
| A14 = | 3.500266469E+02 | 4.048492614E+02 | −6.874650224E+02 | 1.141108399E+02 |
| A16 = | −4.227464670E+02 | −6.058093274E+02 | 1.267423984E+03 | −8.904444735E+01 |
| A18 = | 3.122078961E+02 | 6.110105542E+02 | −1.579275804E+03 | 4.650831020E+01 |
| A20 = | −1.268725279E+02 | −3.967055060E+02 | 1.339837857E+03 | −1.547613268E+01 |
| A22 = | 2.146615214E+01 | 1.496380176E+02 | −7.602431716E+02 | 2.960035577E+00 |
| A24 = | — | −2.487459982E+01 | 2.751100562E+02 | −2.473364358E−01 |
| A26 = | — | — | −5.719828065E+01 | — |
| A28 = | — | — | 5.180255507E+00 | — |

| Surface # | 11 | 12 | 13 | 14 |
|-----------|----|----|----|----|
| k =  | −7.467970000E+00 | −1.691780000E−01 | −8.563020000E+00 | −3.266020000E+00 |
| A4 = | 1.471219590E−02 | 6.220726653E−01 | −2.887487495E−01 | −3.881829382E−01 |
| A6 = | 2.485984882E+00 | −2.246230963E+00 | 3.980713560E−01 | 4.976039239E−01 |
| A8 = | −1.435477398E+01 | 5.404971765E+00 | −2.150636226E+00 | −8.241727667E−01 |

TABLE 7B-continued

| Aspheric Coefficients | | | | |
|---|---|---|---|---|
| A10 = | 4.315552136E+01 | −1.025983446E+01 | 5.166244790E+00 | 1.103589967E+00 |
| A12 = | −8.632099938E+01 | 1.420023295E+01 | −7.166403951E+00 | −1.009826802E+00 |
| A14 = | 1.218186132E+02 | −1.404173940E+01 | 6.597022252E+00 | 6.394860347E−01 |
| A16 = | −1.237501123E+02 | 9.963930998E+00 | −4.239761846E+00 | −2.877767059E−01 |
| A18 = | 9.111951754E+01 | −5.097853434E+00 | 1.939235317E+00 | 9.348887406E−02 |
| A20 = | −4.853658492E+01 | 1.875713681E+00 | −6.340632279E−01 | −2.200991992E−02 |
| A22 = | 1.847532415E+01 | −4.898306188E−01 | 1.470375050E−01 | 3.722759441E−03 |
| A24 = | −4.889895770E+00 | 8.825405267E−02 | −2.361559342E−02 | −4.412995582E−04 |
| A26 = | 8.532972737E−01 | −1.039377641E−02 | 2.498521740E−03 | 3.484009563E−05 |
| A28 = | −8.811253753E−02 | 7.174648313E−04 | −1.566852936E−04 | −1.647447156E−06 |
| A30 = | 4.071775595E−03 | −2.192237912E−05 | 4.413461857E−06 | 3.534827106E−08 |

In the 7th embodiment, the equation of the aspheric surface profiles of the aforementioned lens elements is the same as the equation of the 1st embodiment. Also, the definitions of these parameters shown in Table 7C below are the same as those stated in the 1st embodiment with corresponding values for the 7th embodiment, so an explanation in this regard will not be provided again.

Moreover, these parameters can be calculated from Table 7A and Table 7B as the following values and satisfy the following conditions:

TABLE 7C

| Values of Conditional Expressions | | | |
|---|---|---|---|
| f [mm] | 3.07 | R11/R10 | 0.31 |
| Fno | 2.05 | R12/R1 | 0.37 |
| HFOV [deg.] | 44.5 | EPD/(CT1 + T12) | 1.54 |
| FOV [deg.] | 89.0 | (CT4 − T12)/CT1 | 0.15 |
| TL/ImgH | 1.34 | CT4/CT1 | 0.40 |
| SD/f | 1.00 | T12/CT4 | 0.61 |
| f/f6 | −0.90 | T12/T34 | 0.53 |
| f4/f2 | −0.62 | 10 × T23/CT1 | 1.45 |
| \|f6/f3\| | 0.41 | T23/T12 | 0.59 |
| (\|f/f2\| + \|f/f5\|)/\|f/f4\| | 0.84 | (T23 + T45)/T12 | 0.67 |
| (\|f/f3\| + \|f/f6\|)/\|f/f1\| | 1.69 | (T23 + T56)/CT1 | 0.50 |
| f/R1 | 1.53 | T56/CT1 | 0.36 |
| f/R10 | 0.68 | Vmin | 16.3 |
| \|f/R9\| + f/R10 | 1.60 | V2/V3 | 0.37 |
| \|f6/R11\| + \|f6/R12\| | 7.10 | ET1/CT1 | 0.79 |
| (R1 − R11)/(R1 + R11) | 0.18 | 10 × SAG1R1/R1 | 0.67 |
| (R4 − R11)/(R4 + R11) | 0.70 | SAG1R1/CT1 | 0.17 |
| (R4 − R10)/(R4 + R10) | 0.26 | Y2R2/Y1R1 | 1.13 |
| R5/R4 | 0.32 | Y1R1/ImgH | 0.25 |
| \|R11/R4\| | 0.18 | — | — |

8th Embodiment

Figure 15:
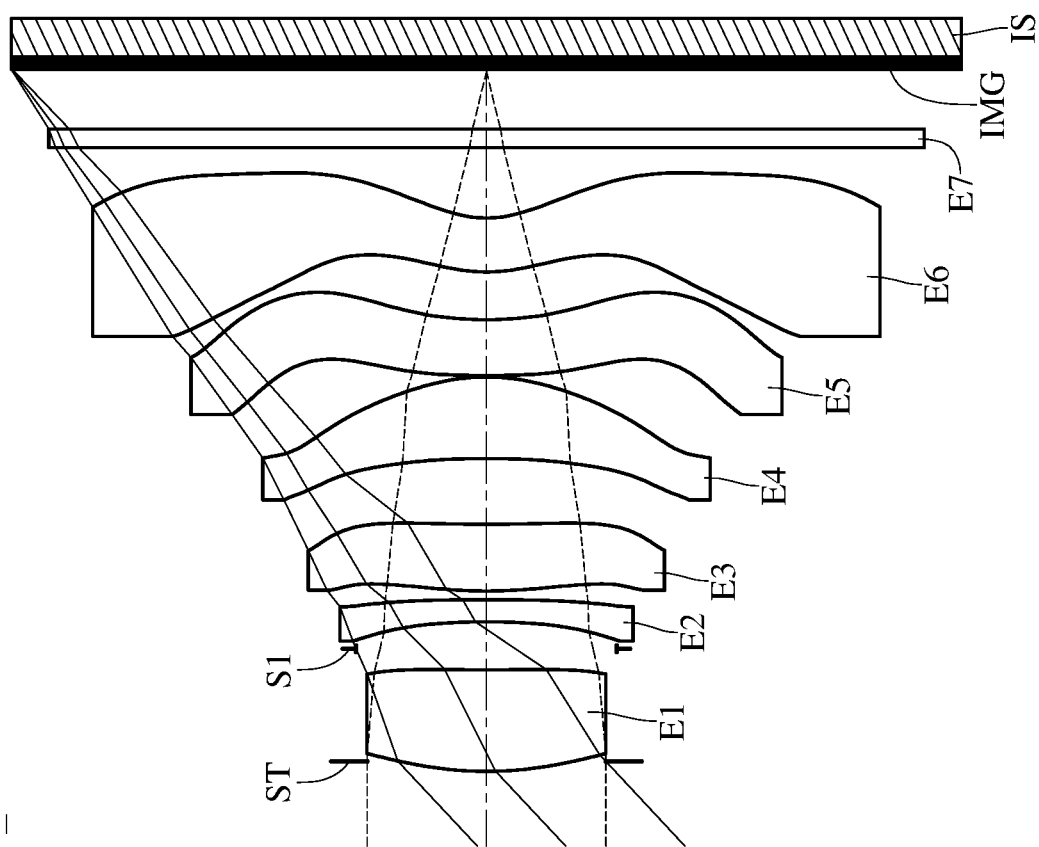
FIG. 15 is a schematic view of an image capturing unit according to the 8th embodiment of the present disclosure.
Figure 16:
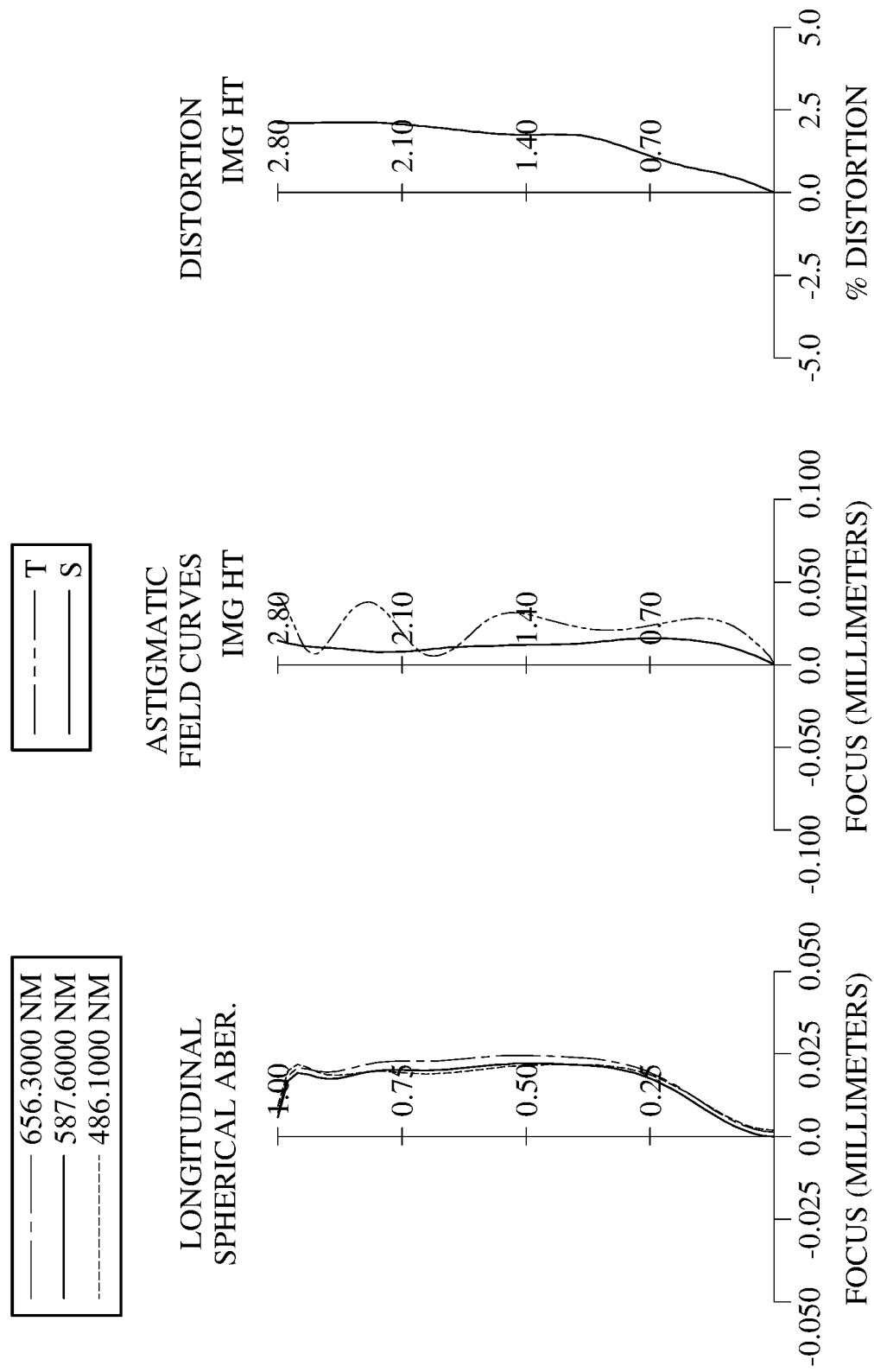
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit 8 includes an optical photographing lens assembly (its reference numeral is omitted) of the present disclosure and an image sensor IS. The optical photographing lens assembly includes, in order from an object side to an image side along an optical path, an aperture stop ST, a first lens element E1, a stop S1, a second lens element E2, a third lens element E3, a fourth lens element E4, a fifth lens element E5, a sixth lens element E6, a filter E7 and an image surface IMG. The optical photographing lens assembly includes six lens elements (E1, E2, E3, E4, E5 and E6) with no additional lens element disposed between each of the adjacent six lens elements.

The first lens element E1 with positive refractive power has an object-side surface being convex in a paraxial region thereof and an image-side surface being concave in a paraxial region thereof. The first lens element E1 is made of glass material and has the object-side surface and the image-side surface being both aspheric. The object-side surface of the first lens element E1 has two inflection points. The image-side surface of the first lens element E1 has one inflection point. The image-side surface of the first lens element E1 has one convex critical point in an off-axis region thereof.

The second lens element E2 with negative refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point. The image-side surface of the second lens element E2 has one concave critical point in an off-axis region thereof.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has two inflection points. The object-side surface of the third lens element E3 has one concave critical point in an off-axis region thereof. The image-side surface of the third lens element E3 has one convex critical point in an off-axis region thereof.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has two inflection points. The object-side surface of the fifth lens element E5 has one concave critical point in an off-axis region thereof. The image-side surface of the fifth lens element E5 has one convex critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has four inflection points. The image-side surface of the sixth lens element E6 has three inflection points. The object-side surface of the sixth lens element E6 has one concave critical point in an off-axis region thereof. The image-side surface of the sixth lens element E6 has one convex critical point in an off-axis region thereof.

The filter E7 is made of glass material and located between the sixth lens element E6 and the image surface IMG, and will not affect the focal length of the optical photographing lens assembly. The image sensor IS is disposed on or near the image surface IMG of the optical photographing lens assembly.

The detailed optical data of the 8th embodiment are shown in Table 8A and the aspheric surface data are shown in Table 8B below.

TABLE 8A

8th Embodiment
f = 2.93 mm, Fno = 2.08, HFOV = 43.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.059 | | | | |
| 2 | Lens 1 | 2.1277 (ASP) | 0.600 | Glass | 1.561 | 58.3 | 4.25 |
| 3 | | 17.7297 (ASP) | 0.125 | | | | |
| 4 | Stop | Plano | 0.159 | | | | |
| 5 | Lens 2 | −4.0224 (ASP) | 0.130 | Plastic | 1.680 | 18.2 | −6.74 |
| 6 | | −33.3333 (ASP) | 0.052 | | | | |
| 7 | Lens 3 | 2.6450 (ASP) | 0.394 | Plastic | 1.544 | 56.0 | 7.26 |
| 8 | | 7.5913 (ASP) | 0.388 | | | | |
| 9 | Lens 4 | −7.8201 (ASP) | 0.481 | Plastic | 1.544 | 56.0 | 2.72 |
| 10 | | −1.2710 (ASP) | 0.010 | | | | |
| 11 | Lens 5 | 8.4755 (ASP) | 0.329 | Plastic | 1.587 | 28.3 | −5.19 |
| 12 | | 2.2090 (ASP) | 0.282 | | | | |
| 13 | Lens 6 | 0.9071 (ASP) | 0.319 | Plastic | 1.544 | 56.0 | −5.85 |
| 14 | | 0.6186 (ASP) | 0.416 | | | | |
| 15 | Filter | Plano | 0.110 | Glass | 1.517 | 64.2 | — |
| 16 | | Plano | 0.352 | | | | |
| 17 | Image | Plano | — | | | | |

Note:
Reference wavelength is 587.6 nm (d-line).
An effective radius of the stop S1 (Surface 4) is 0.770 mm.

TABLE 8B

Aspheric Coefficients

| Surface # | 2 | 3 | 5 | 6 |
|---|---|---|---|---|
| k = | −3.108946000E+00 | 9.000000000E+01 | −5.048805000E+01 | −9.000000000E+01 |
| A4 = | −2.202990730E−02 | −1.040381416E−01 | −7.934437054E−02 | −1.078951953E−01 |
| A6 = | 4.969979762E−01 | −4.357428439E−01 | −1.533065944E+01 | −2.938167906E−01 |
| A8 = | −5.684221026E+00 | 3.298398883E+00 | 1.307014670E+01 | 1.925473797E+00 |
| A10 = | 3.453858107E+01 | −1.911339566E+01 | −7.164060739E+01 | −5.160438231E+00 |
| A12 = | −1.265444803E+02 | 6.996467073E+01 | 2.591597049E+02 | 1.189781151E+01 |
| A14 = | 2.779646170E+02 | −1.633012619E+02 | −6.024190044E+02 | −2.555189832E+01 |
| A16 = | −3.486045401E+02 | 2.367491253E+02 | 8.573864042E+02 | 3.619615749E+01 |
| A18 = | 2.167552162E+02 | −1.942618821E+02 | −6.752788868E+02 | −2.663755645E+01 |
| A20 = | −4.344019856E+01 | 6.917654085E+01 | 2.248623796E+02 | 7.796301611E+00 |

| Surface # | 7 | 8 | 9 | 10 |
|---|---|---|---|---|
| k = | −4.958985000E+00 | −9.000000000E+01 | 5.214064000E+00 | −9.570093000E−01 |
| A4 = | −2.930426250E−01 | −2.343090230E−01 | −8.663198308E−01 | −2.478087857E−01 |
| A6 = | 1.492187816E+00 | 7.618374623E−01 | 3.133359893E+00 | 6.055721323E+00 |
| A8 = | −1.000553295E+01 | −2.391424613E+00 | 4.206627477E+00 | −2.906207883E+01 |
| A10 = | 4.487944124E+01 | 1.470153592E−01 | −9.353421509E+01 | 6.174687044E+01 |
| A12 = | −1.316111593E+02 | 1.973325143E+01 | 4.868222277E+02 | −6.382414032E+00 |
| A14 = | 2.528469322E+02 | −6.890827460E+01 | −1.568947330E+03 | −3.090222203E+02 |
| A16 = | −3.144101584E+02 | 1.261144741E+02 | 3.495609240E+03 | 8.077813010E+02 |
| A18 = | 2.416373936E+02 | −1.398837620E+02 | −5.490437080E+03 | −1.004767137E+03 |
| A20 = | −1.034144794E+02 | 9.271653907E+01 | 6.033223549E+03 | 6.743347985E+02 |
| A22 = | 1.872924456E+01 | −3.286984695E+01 | −4.511217944E+03 | −2.313959844E+02 |
| A24 = | — | 4.600638316E+00 | 2.172538987E+03 | 3.121220501E+01 |

TABLE 8B-continued

| Aspheric Coefficients | | | | |
|---|---|---|---|---|
| A26 = | — | — | −6.039761794E+02 | — |
| A28 = | — | — | 7.328771791E+01 | — |

| Surface # | 11 | 12 | 13 | 14 |
|---|---|---|---|---|
| k = | −8.995797000E+01 | −1.101427000E+01 | −7.808256000E+00 | −3.258819000E+00 |
| A4 = | 2.209367718E+00 | 2.587138792E+00 | −2.662657379E+00 | −1.447936664E+01 |
| A6 = | −4.503420304E−01 | −8.551429155E+00 | −7.786604942E+01 | 9.033493863E+01 |
| A8 = | −7.674816817E+01 | 1.930956651E+01 | 1.202704555E+03 | −2.404860984E+02 |
| A10 = | 5.111955738E+02 | −8.918496422E+02 | −9.757607338E+03 | −2.019377417E+03 |
| A12 = | −2.166585421E+03 | 9.536836043E+03 | 4.822008438E+04 | 2.502416733E+04 |
| A14 = | 7.038671268E+03 | −5.264046752E+04 | −1.527272412E+05 | −1.299176806E+05 |
| A16 = | −1.772106062E+04 | 1.839867790E+05 | 3.190061279E+05 | 4.131719648E+05 |
| A18 = | 3.328903922E+04 | −4.368877276E+05 | −4.396152769E+05 | −8.858552264E+05 |
| A20 = | −4.476482247E+04 | 7.226720073E+05 | 3.813487629E+05 | 1.325868540E+06 |
| A22 = | 4.136125391E+04 | −8.336791904E+05 | −1.711669790E+05 | −1.393642907E+06 |
| A24 = | −2.483984109E+04 | 6.576957098E+05 | −9.561784276E+03 | 1.011125688E+06 |
| A26 = | 8.766568149E+03 | −3.381598568E+05 | 5.592441460E+04 | −4.830169116E+05 |
| A28 = | −1.427428047E+03 | 1.020661648E+05 | −2.745347654E+04 | 1.368613643E+05 |
| A30 = | 2.762455754E+01 | −1.371242186E+04 | 4.659748110E+03 | −1.743635938E+04 |

In the 8th embodiment, the equation of the aspheric surface profiles of the aforementioned lens elements is the same as the equation of the 1st embodiment. Also, the definitions of these parameters shown in Table 8C below are the same as those stated in the 1st embodiment with corresponding values for the 8th embodiment, so an explanation in this regard will not be provided again.

Moreover, these parameters can be calculated from Table 8A and Table 8B as the following values and satisfy the following conditions:

TABLE 8C

| Values of Conditional Expressions | | | |
|---|---|---|---|
| f [mm] | 2.93 | R11/R10 | 0.41 |
| Fno | 2.08 | R12/R1 | 0.29 |
| HFOV [deg.] | 43.0 | EPD/(CT1 + T12) | 1.59 |
| FOV [deg.] | 86.0 | (CT4 − T12)/CT1 | 0.33 |
| TL/ImgH | 1.48 | CT4/CT1 | 0.80 |
| SD/f | 1.10 | T12/CT4 | 0.59 |
| f/f6 | −0.50 | T12/T34 | 0.73 |
| f4/f2 | −0.40 | 10 × T23/CT1 | 0.87 |
| |f6/f3| | 0.81 | T23/T12 | 0.18 |
| (|f/f2| + |f/f5|)/|f/f4| | 0.93 | (T23 + T45)/T12 | 0.22 |
| (|f/f3| + |f/f6|)/|f/f1| | 1.31 | (T23 + T56)/CT1 | 0.56 |
| f/R1 | 1.38 | T56/CT1 | 0.47 |
| f/R10 | 1.32 | Vmin | 18.2 |
| |f/R9| + f/R10 | 1.67 | V2/V3 | 0.33 |
| |f6/R11| + |f6/R12| | 15.91 | ET1/CT1 | 0.75 |
| (R1 − R11)/(R1 + R11) | 0.40 | 10 × SAG1R1/R1 | 0.51 |
| (R4 − R11)/(R4 + R11) | 1.06 | SAG1R1/CT1 | 0.18 |
| (R4 − R10)/(R4 + R10) | 1.14 | Y2R2/Y1R1 | 1.20 |
| R5/R4 | −0.08 | Y1R1/ImgH | 0.26 |
| |R11/R4| | 0.03 | — | — |

9th Embodiment

Figure 17:
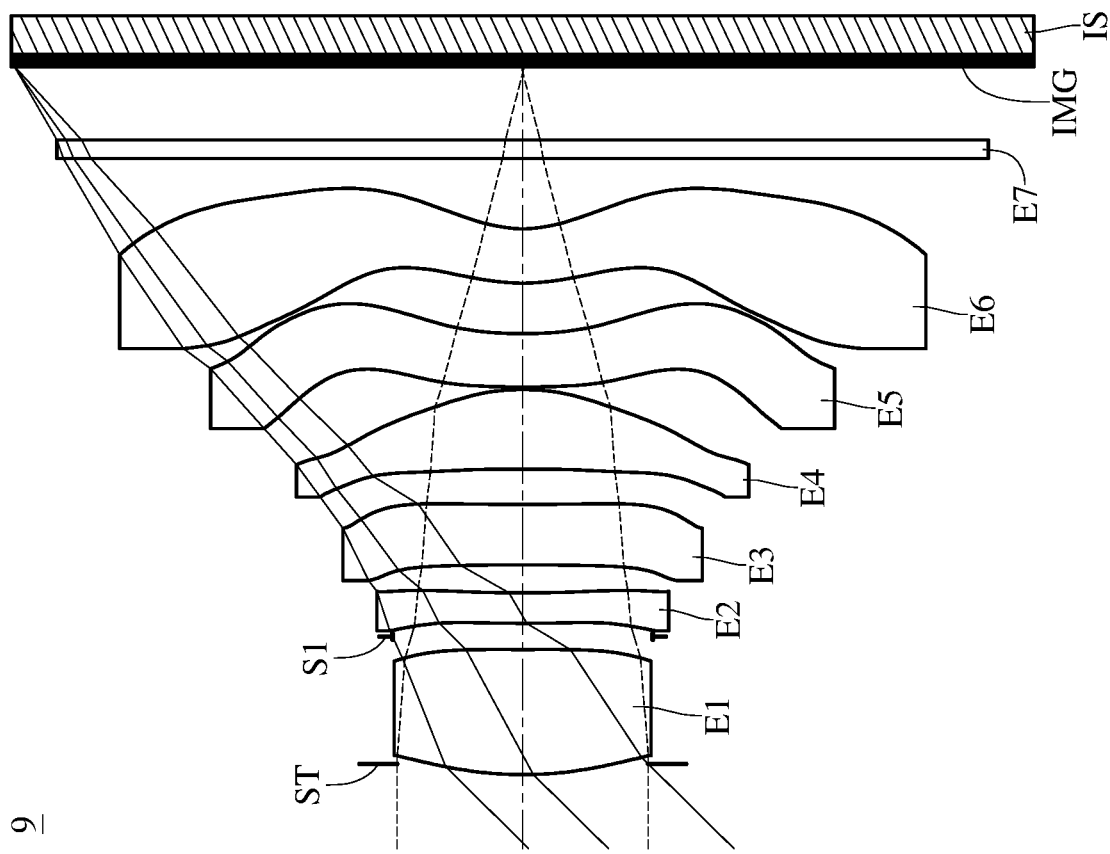
FIG. 17 is a schematic view of an image capturing unit according to the 9th embodiment of the present disclosure.
Figure 18:
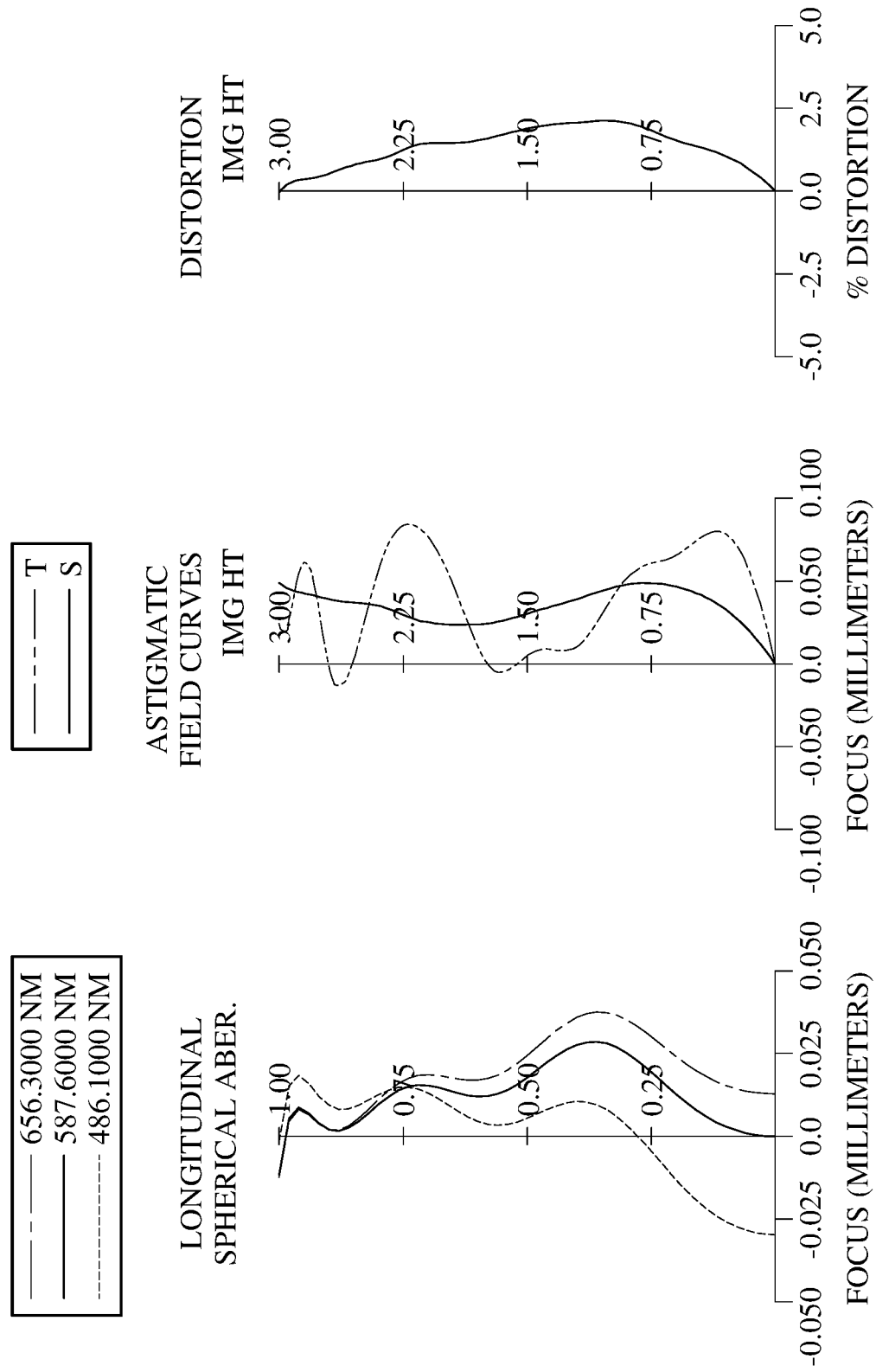
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit 9 includes an optical photographing lens assembly (its reference numeral is omitted) of the present disclosure and an image sensor IS. The optical photographing lens assembly includes, in order from an object side to an image side along an optical path, an aperture stop ST, a first lens element E1, a stop S1, a second lens element E2, a third lens element E3, a fourth lens element E4, a fifth lens element E5, a sixth lens element E6, a filter E7 and an image surface IMG. The optical photographing lens assembly includes six lens elements (E1, E2, E3, E4, E5 and E6) with no additional lens element disposed between each of the adjacent six lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has two inflection points. The image-side surface of the first lens element E1 has one inflection point. The image-side surface of the first lens element E1 has one convex critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has two inflection points. The image-side surface of the second lens element E2 has two inflection points. The object-side surface of the second lens element E2 has one concave critical point in an off-axis region thereof. The image-side surface of the second lens element E2 has one concave critical point and one convex critical point in an off-axis region thereof.

The third lens element E3 with negative refractive power has an object-side surface being concave in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has two inflection points. The image-side surface of the third lens element E3 has one convex critical point in an off-axis region thereof.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has four inflection points. The image-side surface of the fourth lens element E4 has two inflection points.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has three inflection points. The image-side surface of the fifth lens element E5 has three inflection points. The object-side surface of the fifth lens element E5 has one concave critical point in an off-axis region thereof. The image-side surface of the fifth lens element E5 has one convex critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has five inflection points. The image-side surface of the sixth lens element E6 has three inflection points. The object-side surface of the sixth lens element E6 has one concave critical point in an off-axis region thereof. The image-side surface of the sixth lens element E6 has one convex critical point in an off-axis region thereof.

The filter E7 is made of glass material and located between the sixth lens element E6 and the image surface IMG, and will not affect the focal length of the optical photographing lens assembly. The image sensor IS is disposed on or near the image surface IMG of the optical photographing lens assembly.

The detailed optical data of the 9th embodiment are shown in Table 9A and the aspheric surface data are shown in Table 9B below.

TABLE 9A

9th Embodiment
f = 2.96 mm, Fno = 2.00, HFOV = 45.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.063 | | | | |
| 2 | Lens 1 | 2.1777 (ASP) | 0.739 | Plastic | 1.534 | 56.0 | 4.32 |
| 3 | | 33.8510 (ASP) | 0.076 | | | | |
| 4 | Stop | Plano | 0.079 | | | | |
| 5 | Lens 2 | 8.0151 (ASP) | 0.180 | Plastic | 1.697 | 16.3 | 54.26 |
| 6 | | 10.0759 (ASP) | 0.166 | | | | |
| 7 | Lens 3 | −11.6564 (ASP) | 0.356 | Plastic | 1.544 | 56.0 | −10.79 |
| 8 | | 11.9423 (ASP) | 0.209 | | | | |
| 9 | Lens 4 | −54.2802 (ASP) | 0.470 | Plastic | 1.544 | 56.0 | 2.83 |
| 10 | | −1.4995 (ASP) | 0.015 | | | | |
| 11 | Lens 5 | 4.6015 (ASP) | 0.316 | Plastic | 1.639 | 23.5 | −13.67 |
| 12 | | 2.9326 (ASP) | 0.298 | | | | |
| 13 | Lens 6 | 1.1830 (ASP) | 0.321 | Plastic | 1.534 | 56.0 | −4.45 |
| 14 | | 0.7155 (ASP) | 0.416 | | | | |
| 15 | Filter | Plano | 0.110 | Glass | 1.517 | 64.2 | — |
| 16 | | Plano | 0.431 | | | | |
| 17 | Image | Plano | — | | | | |

Note:
Reference wavelength is 587.6 nm (d-line).
An effective radius of the stop S1 (Surface 4) is 0.768 mm.

TABLE 9B

Aspheric Coefficients

| Surface # | 2 | 3 | 5 | 6 |
|---|---|---|---|---|
| k = | −3.104980000E+00 | −9.000000000E+01 | −9.000000000E+01 | 5.791600000E+01 |
| A4 = | 5.722532385E−02 | −3.431872476E−01 | −1.658034832E−01 | 3.121489595E−01 |
| A6 = | −1.029068779E+00 | 2.038892443E+00 | 2.407260993E−01 | −3.271798171E+00 |
| A8 = | 9.381699399E+00 | −2.069178169E+01 | −7.685233348E+00 | 1.730872513E+01 |
| A10 = | −5.360832110E+01 | 1.181023264E+02 | 4.698064490E+01 | −6.413255880E+01 |
| A12 = | 1.927850424E+02 | −4.116053233E+02 | −1.502316311E+02 | 1.606317581E+02 |
| A14 = | −4.429054041E+02 | 8.977801194E+02 | 2.873988898E+02 | −2.618280369E+02 |
| A16 = | 6.327318556E+02 | −1.194856096E+03 | −3.252800787E+02 | 2.628029943E+02 |
| A18 = | −5.138291712E+02 | 8.872948871E+02 | 1.995566363E+02 | −1.461169802E+02 |
| A20 = | 1.816970268E+02 | −2.817456821E+02 | −5.078028541E+01 | 3.435131377E+01 |

| Surface # | 7 | 8 | 9 | 10 |
|---|---|---|---|---|
| k = | −9.038830000E+01 | 6.682660000E+01 | 5.136280000E+01 | −6.765920000E−01 |
| A4 = | 7.004881229E−02 | −2.197646535E−01 | −3.634715098E−01 | −1.169499262E+00 |
| A6 = | 1.943300171E+00 | 1.313644098E+00 | −1.222425975E+00 | 7.500062691E+00 |

TABLE 9B-continued

Aspheric Coefficients

| | | | | |
|---|---|---|---|---|
| A8 = | −2.897958160E+01 | −4.163170722E+00 | 2.619433333E+01 | −2.163764761E+01 |
| A10 = | 1.821811153E+02 | −4.721720355E−01 | −1.425533748E+02 | 3.760468700E+01 |
| A12 = | −6.717381906E+02 | 3.915798856E+01 | 4.412760888E+02 | −4.268796903E+01 |
| A14 = | 1.553782950E+03 | −1.289169523E+02 | −9.015104254E+02 | 3.232557565E+01 |
| A16 = | −2.274506937E+03 | 2.219291103E+02 | 1.277932184E+03 | −1.629947560E+01 |
| A18 = | 2.034171133E+03 | −2.306985975E+02 | −1.275183659E+03 | 5.441506314E+00 |
| A20 = | −1.008019491E+03 | 1.449238456E+02 | 8.894087105E+02 | −1.203912766E+00 |
| A22 = | 2.110117066E+02 | −5.045999900E+01 | −4.219244079E+02 | 1.744161772E−01 |
| A24 = | — | 7.441851164E+00 | 1.287487175E+02 | −1.358804593E−02 |
| A26 = | — | — | −2.257701183E+01 | — |
| A28 = | — | — | 1.708112846E+00 | — |

| Surface # | 11 | 12 | 13 | 14 |
|---|---|---|---|---|
| k = | −5.069800000E+00 | −2.721890000E+00 | −6.487490000E+00 | −3.349950000E+00 |
| A4 = | −5.502698829E−01 | 6.155131516E−01 | −3.370110713E−01 | −3.516340162E−01 |
| A6 = | 6.684290225E+00 | −1.881106635E+00 | 8.778273423E−01 | 6.185032647E−01 |
| A8 = | −2.964642213E+01 | 3.796314985E+00 | −3.448727746E+00 | −1.353368704E+00 |
| A10 = | 8.060139533E+01 | −6.638947752E+00 | 7.186294254E+00 | 2.014532687E+00 |
| A12 = | −1.538055442E+02 | 8.884629474E+00 | −9.406449071E+00 | −1.959949428E+00 |
| A14 = | 2.131996102E+02 | −8.465708134E+00 | 8.462109285E+00 | 1.302229676E+00 |
| A16 = | −2.162888519E+02 | 5.625763093E+00 | −5.402244964E+00 | −6.086351844E−01 |
| A18 = | 1.602087867E+02 | −2.582363981E+00 | 2.475944224E+00 | 2.031535953E−01 |
| A20 = | −8.585687858E+01 | 8.038326338E−01 | −8.158661534E−01 | −4.859527745E−02 |
| A22 = | 3.270314276E+01 | −1.623579865E−01 | 1.915880760E−01 | 8.258483249E−03 |
| A24 = | −8.577736284E+00 | 1.902114519E−02 | −3.130336971E−02 | −9.727527808E−04 |
| A26 = | 1.463309842E+00 | −8.249057831E−04 | 3.385082932E−03 | 7.545791166E−05 |
| A28 = | −1.450804186E−01 | −5.797569720E−05 | −2.180361068E−04 | −3.465533484E−06 |
| A30 = | 6.283623554E−03 | 5.966435624E−06 | 6.339951015E−06 | 7.135774194E−08 |

In the 9th embodiment, the equation of the aspheric surface profiles of the aforementioned lens elements is the same as the equation of the 1st embodiment. Also, the definitions of these parameters shown in Table 9C below are the same as those stated in the 1st embodiment with corresponding values for the 9th embodiment, so an explanation in this regard will not be provided again.

Moreover, these parameters can be calculated from Table 9A and Table 9B as the following values and satisfy the following conditions:

TABLE 9C

Values of Conditional Expressions

| | | | |
|---|---|---|---|
| f [mm] | 2.96 | R11/R10 | 0.40 |
| Fno | 2.00 | R12/R1 | 0.33 |
| HFOV [deg.] | 45.2 | EPD/(CT1 + T12) | 1.66 |
| FOV [deg.] | 90.4 | (CT4 − T12)/CT1 | 0.43 |
| TL/ImgH | 1.39 | CT4/CT1 | 0.64 |
| SD/f | 1.07 | T12/CT4 | 0.33 |
| f/f6 | −0.67 | T12/T34 | 0.74 |
| f4/f2 | 0.05 | 10 × T23/CT1 | 2.25 |
| |f6/f3| | 0.41 | T23/T12 | 1.07 |
| (|f/f2| + |f/f5|)/|f/f4| | 0.26 | (T23 + T45)/T12 | 1.17 |
| (|f/f3| + |f/f6|)/|f/f1| | 1.37 | (T23 + T56)/CT1 | 0.63 |
| f/R1 | 1.36 | T56/CT1 | 0.40 |
| f/R10 | 1.01 | Vmin | 16.3 |
| |f/R9| + f/R10 | 1.66 | V2/V3 | 0.29 |
| |f6/R11| + |f6/R12| | 9.99 | ET1/CT1 | 0.74 |
| (R1 − R11)/(R1 + R11) | 0.30 | 10 × SAG1R1/R1 | 0.52 |
| (R4 − R11)/(R4 + R11) | 0.79 | SAG1R1/CT1 | 0.15 |
| (R4 − R10)/(R4 + R10) | 0.55 | Y2R2/Y1R1 | 1.15 |
| R5/R4 | −1.16 | Y1R1/ImgH | 0.25 |
| |R11/R4| | 0.12 | — | — |

10th Embodiment

Figure 19:
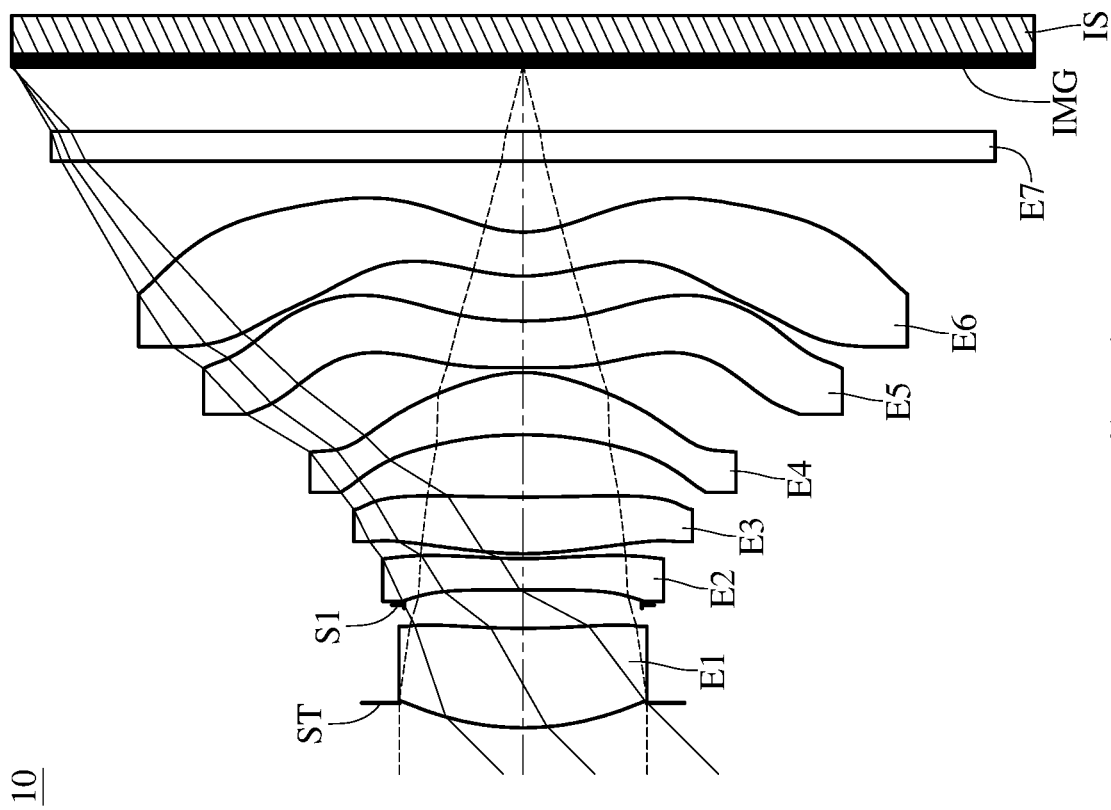
FIG. 19 is a schematic view of an image capturing unit according to the 10th embodiment of the present disclosure.
Figure 20:
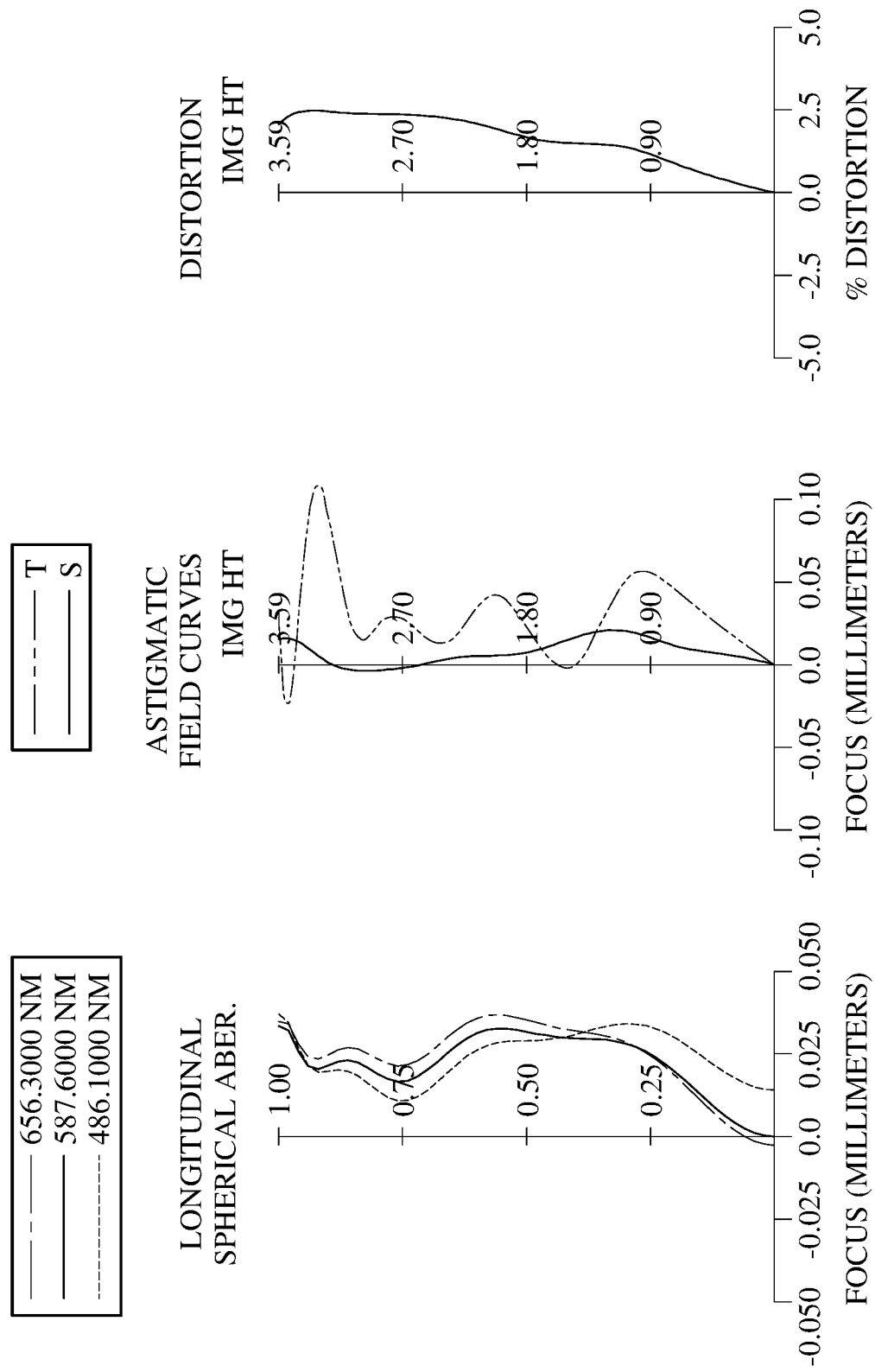
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit 10 includes an optical photographing lens assembly (its reference numeral is omitted) of the present disclosure and an image sensor IS. The optical photographing lens assembly includes, in order from an object side to an image side along an optical path, an aperture stop ST, a first lens element E1, a stop S1, a second lens element E2, a third lens element E3, a fourth lens element E4, a fifth lens element E5, a sixth lens element E6, a filter E7 and an image surface IMG. The optical photographing lens assembly includes six lens elements (E1, E2, E3, E4, E5 and E6) with no additional lens element disposed between each of the adjacent six lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The image-side surface of the first lens element E1 has one inflection point. The image-side surface of the first lens element E1 has one convex critical point in an off-axis region thereof.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point. The object-side surface of the second lens element E2 has one concave critical point in an off-axis region thereof. The image-side surface of the second lens element E2 has one convex critical point in an off-axis region thereof.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has two inflection points. The object-side surface of the third lens element E3 has one concave critical point in an off-axis region thereof. The image-side surface of the third lens element E3 has one convex critical point in an off-axis region thereof.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points.

The fifth lens element E5 with negative refractive power has an object-side surface being concave in a paraxial region thereof and an image-side surface being concave in a paraxial region thereof. The fifth lens element E5 is made of plastic material and has the object-side surface and the image-side surface being both aspheric. The object-side surface of the fifth lens element E5 has three inflection points. The image-side surface of the fifth lens element E5 has three inflection points. The object-side surface of the fifth lens element E5 has one concave critical point and one convex critical point in an off-axis region thereof. The image-side surface of the fifth lens element E5 has one convex critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has four inflection points. The image-side surface of the sixth lens element E6 has two inflection points. The object-side surface of the sixth lens element E6 has one concave critical point in an off-axis region thereof. The image-side surface of the sixth lens element E6 has one convex critical point in an off-axis region thereof.

The filter E7 is made of glass material and located between the sixth lens element E6 and the image surface IMG, and will not affect the focal length of the optical photographing lens assembly. The image sensor IS is disposed on or near the image surface IMG of the optical photographing lens assembly.

The detailed optical data of the 10th embodiment are shown in Table 10A and the aspheric surface data are shown in Table 10B below.

TABLE 10A

10th Embodiment
f = 3.49 mm, Fno = 2.00, HFOV = 45.1 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.175 |  |  |  |  |
| 2 | Lens 1 | 1.9400 | (ASP) | 0.701 | Plastic | 1.545 | 56.1 | 5.12 |
| 3 |  | 5.5547 | (ASP) | 0.164 |  |  |  |  |
| 4 | Stop | Plano |  | 0.107 |  |  |  |  |
| 5 | Lens 2 | 54.5991 | (ASP) | 0.220 | Plastic | 1.669 | 19.5 | −5.32 |
| 6 |  | 3.3357 | (ASP) | 0.035 |  |  |  |  |
| 7 | Lens 3 | 2.1518 | (ASP) | 0.399 | Plastic | 1.544 | 56.0 | 4.89 |
| 8 |  | 10.4800 | (ASP) | 0.439 |  |  |  |  |
| 9 | Lens 4 | −3.1948 | (ASP) | 0.439 | Plastic | 1.566 | 37.4 | 2.20 |
| 10 |  | −0.9400 | (ASP) | 0.035 |  |  |  |  |
| 11 | Lens 5 | −16.6746 | (ASP) | 0.328 | Plastic | 1.669 | 19.5 | −3.53 |
| 12 |  | 2.7718 | (ASP) | 0.317 |  |  |  |  |
| 13 | Lens 6 | 1.2531 | (ASP) | 0.310 | Plastic | 1.534 | 56.0 | −5.62 |
| 14 |  | 0.8081 | (ASP) | 0.500 |  |  |  |  |
| 15 | Filter | Plano |  | 0.210 | Glass | 1.517 | 64.2 | — |
| 16 |  | Plano |  | 0.454 |  |  |  |  |
| 17 | Image | Plano |  | — |  |  |  |  |

Note:
Reference wavelength is 587.6 nm (d-line).
An effective radius of the stop S1 (Surface 4) is 0.836 mm.

TABLE 10B

Aspheric Coefficients

| Surface # | 2 | 3 | 5 | 6 |
|---|---|---|---|---|
| k = | 0.000000000E+00 | 0.000000000E+00 | 0.000000000E+00 | 0.000000000E+00 |
| A4 = | −1.326951277E−02 | −8.071061920E−02 | −2.877578918E−01 | −6.060779758E−01 |
| A6 = | −5.267563933E−02 | 5.749240923E−01 | 2.461838492E+00 | 2.922678791E+00 |
| A8 = | 8.265878235E−01 | −7.629382420E+00 | −2.286552163E+01 | −1.287626571E+01 |
| A10 = | −5.564997822E+00 | 5.329143318E+01 | 1.330522583E+02 | 4.069882025E+01 |
| A12 = | 1.986073362E+01 | −2.311518329E+02 | −5.142954977E+02 | −9.009246517E+01 |
| A14 = | −4.136253976E+01 | 6.375848357E+02 | 1.337996612E+03 | 1.379341841E+02 |

TABLE 10B-continued

| Aspheric Coefficients | | | | |
|---|---|---|---|---|
| A16 = | 5.027093925E+01 | −1.118733100E+03 | −2.338589604E+03 | −1.430019504E+02 |
| A18 = | −3.305909996E+01 | 1.208419326E+03 | 2.688476761E+03 | 9.585763900E+01 |
| A20 = | 9.089420956E+00 | −7.321527543E+02 | −1.930659104E+03 | −3.746562462E+01 |
| A22 = | — | 1.903346219E+02 | 7.745143607E+02 | 6.472304308E+00 |
| A24 = | — | — | −1.297179171E+02 | — |

| Surface # | 7 | 8 | 9 | 10 |
|---|---|---|---|---|
| k = | 0.000000000E+00 | 0.000000000E+00 | 0.000000000E+00 | −1.000000000E+00 |
| A4 = | −6.316856370E−01 | −1.733637982E−01 | −3.442510490E−01 | 5.918143257E−01 |
| A6 = | 2.794696513E+00 | 1.404631868E+00 | 1.223159395E+00 | −1.629022499E+00 |
| A8 = | −1.044863432E+01 | −9.839153952E+00 | −9.508366393E−01 | 5.519239980E+00 |
| A10 = | 2.697683571E+01 | 4.468284871E+01 | −5.465618254E+00 | −1.528830876E+01 |
| A12 = | −4.461482353E+01 | −1.350700861E+02 | 1.994568529E+01 | 2.834275534E+01 |
| A14 = | 4.208106408E+01 | 2.770089273E+02 | −3.267369858E+01 | −3.467749677E+01 |
| A16 = | −1.244208362E+01 | −3.895109876E+02 | 2.983995070E+01 | 2.818043217E+01 |
| A18 = | −1.733470465E+01 | 3.746664127E+02 | −1.392365378E+01 | −1.508658414E+01 |
| A20 = | 2.158680164E+01 | −2.417304279E+02 | 8.690513175E−01 | 5.129930991E+00 |
| A22 = | −9.788220405E+00 | 9.975151125E+01 | 2.332903319E+00 | −9.973718949E−01 |
| A24 = | 1.665112470E+00 | −2.372140081E+01 | −1.050217583E+00 | 7.197402628E−02 |
| A26 = | — | 2.465148465E+00 | 1.478498180E−01 | 7.703445053E−03 |
| A28 = | — | — | — | −1.301760869E−03 |

| Surface # | 11 | 12 | 13 | 14 |
|---|---|---|---|---|
| k = | 0.000000000E+00 | 0.000000000E+00 | −1.000000000E+00 | −1.000000000E+00 |
| A4 = | 7.825043670E−01 | 2.440851543E−01 | −4.148876623E−01 | −7.211578559E−01 |
| A6 = | −1.662728084E+00 | −5.218398452E−01 | −8.097183545E−02 | 6.118368683E−01 |
| A8 = | 2.368120794E+00 | 4.035202017E−01 | 5.414372502E−01 | −4.366344929E−01 |
| A10 = | −2.986215873E+00 | −1.860469782E−01 | −7.649861350E−01 | 2.295815532E−01 |
| A12 = | 3.205803806E+00 | 6.916750194E−02 | 6.377826720E−01 | −8.025408360E−02 |
| A14 = | −2.663688737E+00 | −4.312205092E−02 | −3.419403615E−01 | 1.670925110E−02 |
| A16 = | 1.617610324E+00 | 3.253642895E−02 | 1.225179608E−01 | −1.237253950E−03 |
| A18 = | −7.005009835E−01 | −1.664659365E−02 | −2.999140521E−02 | −3.457121848E−04 |
| A20 = | 2.127001391E−01 | 5.327296733E−03 | 5.042857286E−03 | 1.243797007E−04 |
| A22 = | −4.411809758E−02 | −1.068341592E−03 | −5.739674395E−04 | −1.906802053E−05 |
| A24 = | 5.943149889E−03 | 1.309877826E−04 | 4.231967869E−05 | 1.654275644E−06 |
| A26 = | −4.679289519E−04 | −8.995650802E−06 | −1.826462210E−06 | −7.896625960E−08 |
| A28 = | 1.632331657E−05 | 2.655324183E−07 | 3.506787707E−08 | 1.618939803E−09 |

In the 10th embodiment, the equation of the aspheric surface profiles of the aforementioned lens elements is the same as the equation of the 1st embodiment. Also, the definitions of these parameters shown in Table 10C below are the same as those stated in the 1st embodiment with corresponding values for the 10th embodiment, so an explanation in this regard will not be provided again.

Moreover, these parameters can be calculated from Table 10A and Table 10B as the following values and satisfy the following conditions:

TABLE 10C

| Values of Conditional Expressions | | | |
|---|---|---|---|
| f [mm] | 3.49 | R11/R10 | 0.45 |
| Fno | 2.00 | R12/R1 | 0.42 |
| HFOV [deg.] | 45.1 | EPD/(CT1 + T12) | 1.79 |
| FOV [deg.] | 90.2 | (CT4 − T12)/CT1 | 0.24 |
| TL/ImgH | 1.30 | CT4/CT1 | 0.63 |
| SD/f | 0.95 | T12/CT4 | 0.62 |
| f/f6 | −0.62 | T12/T34 | 0.62 |
| f4/f2 | −0.41 | 10 × T23/CT1 | 0.50 |
| \|f6/f3\| | 1.15 | T23/T12 | 0.13 |
| (\|f/f2\| + \|f/f5\|)/\|f/f4\| | 1.04 | (T23 + T45)/T12 | 0.26 |
| (\|f/f3\| + \|f/f6\|)/\|f/f1\| | 1.96 | (T23 + T56)/CT1 | 0.50 |
| f/R1 | 1.80 | T56/CT1 | 0.45 |
| f/R10 | 1.26 | Vmin | 19.5 |
| \|f/R9\| + f/R10 | 1.47 | V2/V3 | 0.35 |
| \|f6/R11\| + \|f6/R12\| | 11.45 | ET1/CT1 | 0.73 |
| (R1 − R11)/(R1 + R11) | 0.22 | 10 × SAG1R1/R1 | 1.01 |
| (R4 − R11)/(R4 + R11) | 0.45 | SAG1R1/CT1 | 0.28 |
| (R4 − R10)/(R4 + R10) | 0.09 | Y2R2/Y1R1 | 1.13 |

TABLE 10C-continued

| Values of Conditional Expressions | | | |
|---|---|---|---|
| R5/R4 | 0.65 | Y1R1/ImgH | 0.24 |
| \|R11/R4\| | 0.38 | — | — |

11th Embodiment

Figure 21:
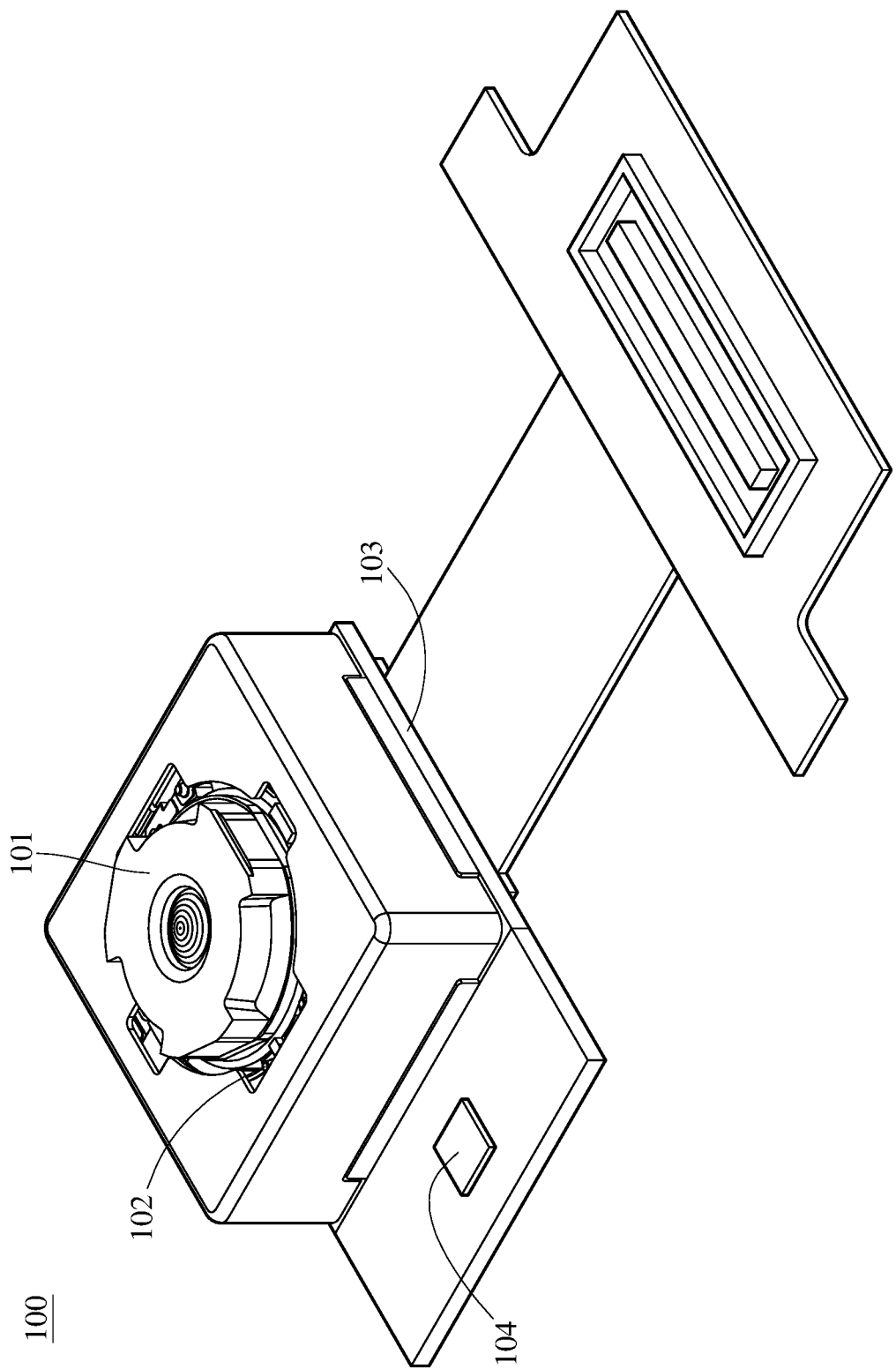
FIG. 21 is a perspective view of an image capturing unit according to the 11th embodiment of the present disclosure.

FIG. 21 is a perspective view of an image capturing unit according to the 11th embodiment of the present disclosure. In this embodiment, an image capturing unit 100 is a camera module including a lens unit 101, a driving device 102, an image sensor 103 and an image stabilizer 104. The lens unit 101 includes the optical photographing lens assembly as disclosed in the 1st embodiment, a barrel and a holder member (their reference numerals are omitted) for holding the optical photographing lens assembly. However, the lens unit 101 may alternatively be provided with the optical photographing lens assembly disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems or shape memory alloy materials. The driving device 102 is favorable for obtaining a better imaging position of the lens unit 101, so that a clear image of the imaged object can be captured by the lens unit 101 with different object distances. The image sensor 103 (for example, CCD or CMOS), which can feature high photosensitivity and low noise, is disposed on the image surface of the optical photographing lens assembly to provide higher image quality.

The image stabilizer 104, such as an accelerometer, a gyro sensor and a Hall Effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

12th Embodiment

Figure 22:
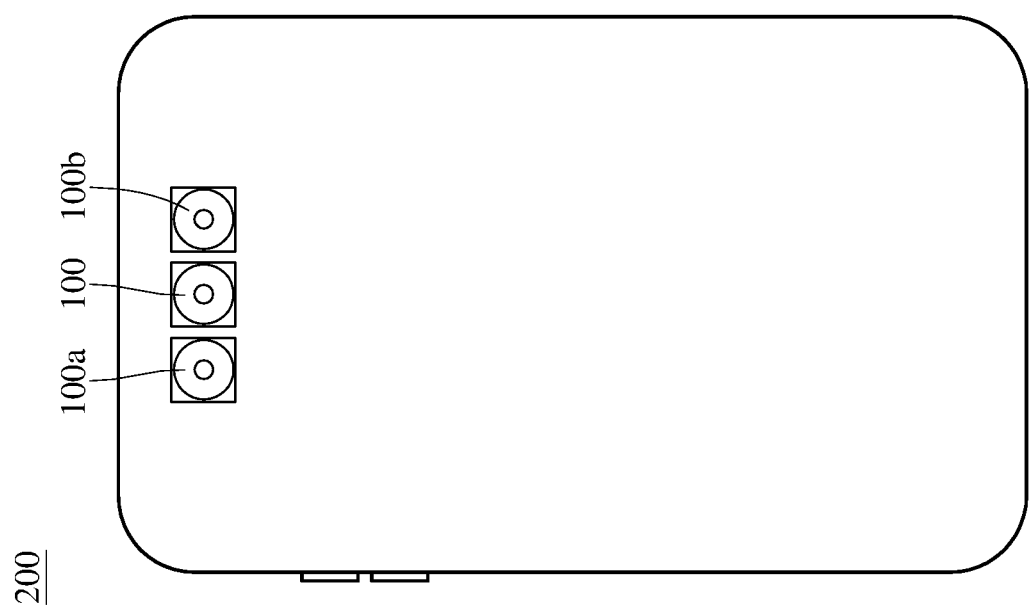
FIG. 22 is one perspective view of an electronic device according to the 12th embodiment of the present disclosure.
Figure 23:
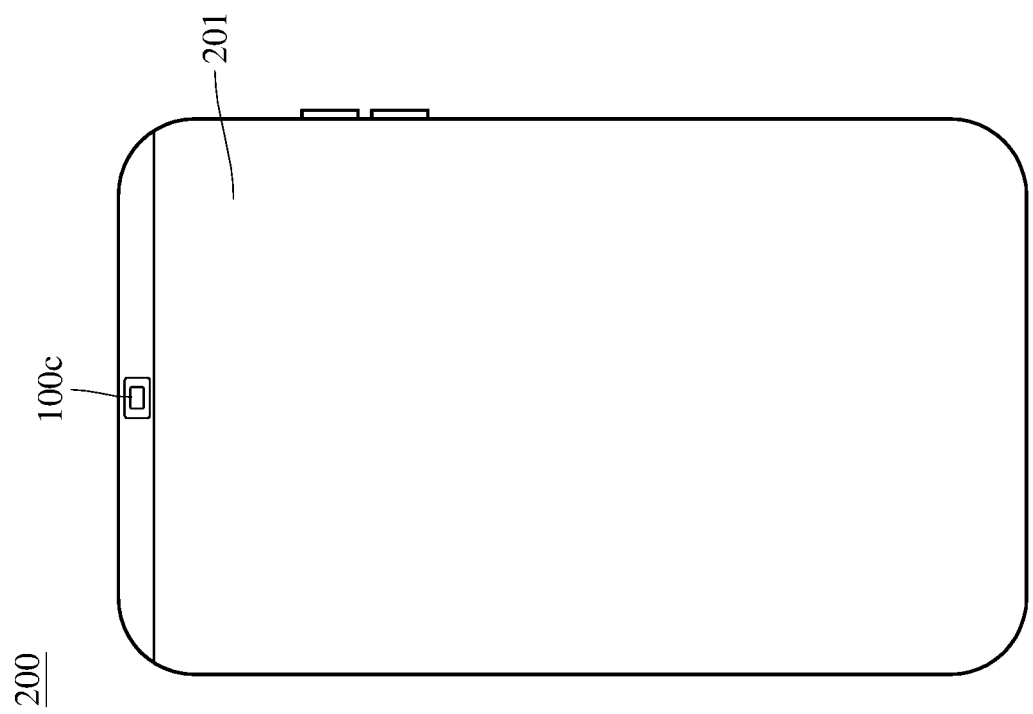
FIG. 23 is another perspective view of the electronic device in FIG. 22.

FIG. 22 is one perspective view of an electronic device according to the 12th embodiment of the present disclosure. FIG. 23 is another perspective view of the electronic device in FIG. 22.

In this embodiment, an electronic device 200 is a smartphone including the image capturing unit 100 disclosed in the 11th embodiment, an image capturing unit 100a, an image capturing unit 100b, an image capturing unit 100c and a display module 201. As shown in FIG. 22, the image capturing unit 100, the image capturing unit 100a and the image capturing unit 100b are disposed on the same side of the electronic device 200 and are all single focus. As shown in FIG. 23, the image capturing unit 100c and the display module 201 are disposed on the opposite side of the electronic device 200. The image capturing unit 100c can be a front-facing camera of the electronic device 200 for taking selfies, but the present disclosure is not limited thereto. Furthermore, each of the image capturing units 100a, 100b and 100c can include the optical photographing lens assembly of the present disclosure and can have a configuration similar to that of the image capturing unit 100. In detail, each of the image capturing units 100a, 100b and 100c can include a lens unit, a driving device, an image sensor and an image stabilizer. In addition, each of the lens unit of the image capturing units 100a, 100b and 100c can include the optical photographing lens assembly of the present disclosure, a barrel and a holder member for holding the optical photographing lens assembly.

The image capturing unit 100 is a wide-angle image capturing unit, the image capturing unit 100a is a telephoto image capturing unit, the image capturing unit 100b is an ultra-wide-angle image capturing unit, and the image capturing unit 100c is a wide-angle image capturing unit. In this embodiment, the image capturing units 100, 100a and 100b have different fields of view, such that the electronic device 200 can have various magnification ratios so as to meet the requirement of optical zoom functionality for various applications with different requirements. The image capturing unit 100c can have a non-circular opening, and optical components in the image capturing unit 100c can have trimmed edges at their outermost positions so as to coordinate with the shape of the non-circular opening. Therefore, it is favorable for reducing the size of the image capturing unit 100c so as to increase the ratio of the area of the display module 201 relative to that of the electronic device 200, and reduce the thickness of the electronic device 200. In this embodiment, the electronic device 200 includes multiple image capturing units 100, 100a, 100b and 100c, but the present disclosure is not limited to the number and arrangement of image capturing units.

13th Embodiment

Figure 24:
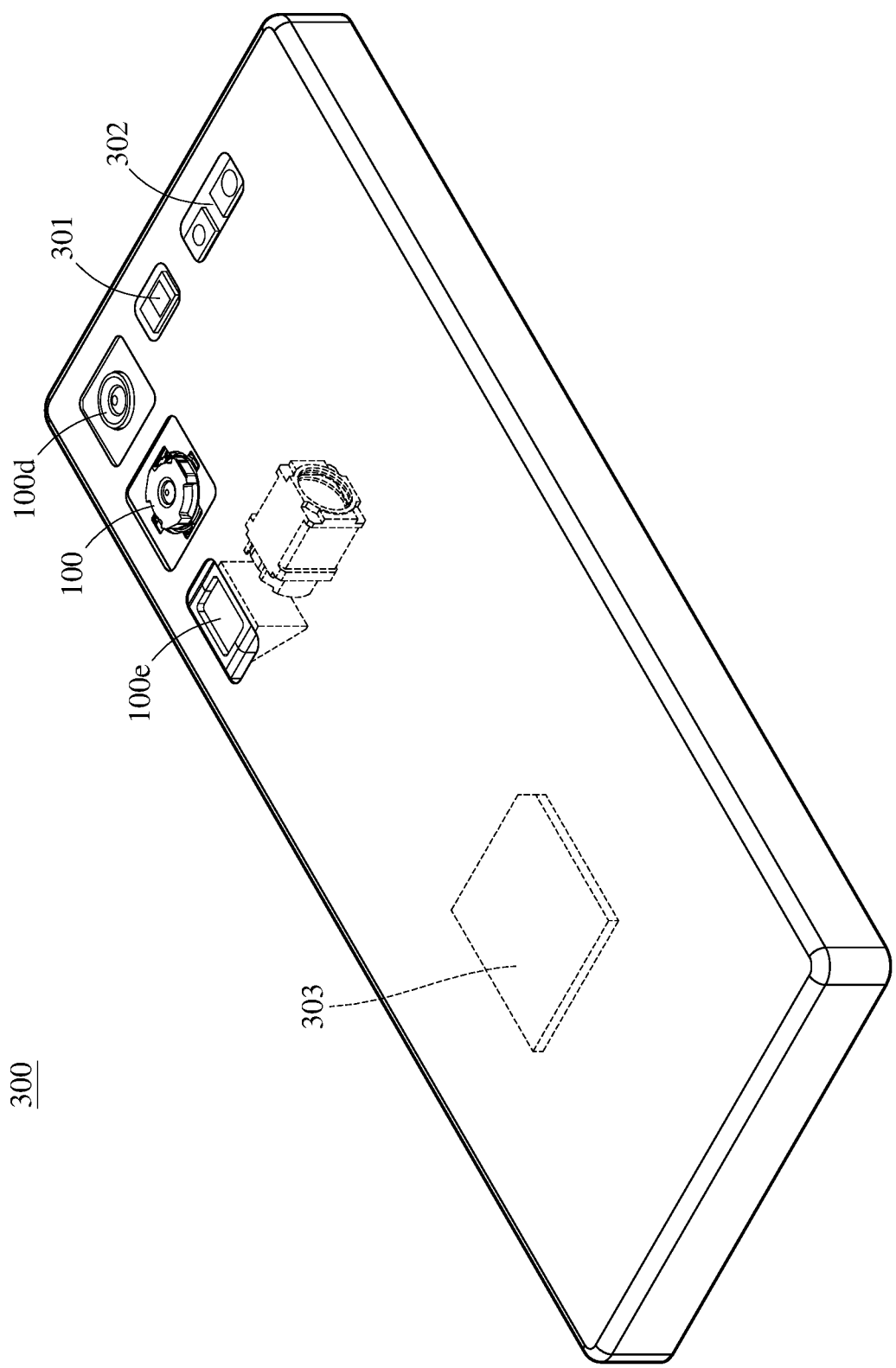
FIG. 24 is one perspective view of an electronic device according to the 13th embodiment of the present disclosure.
Figure 25:
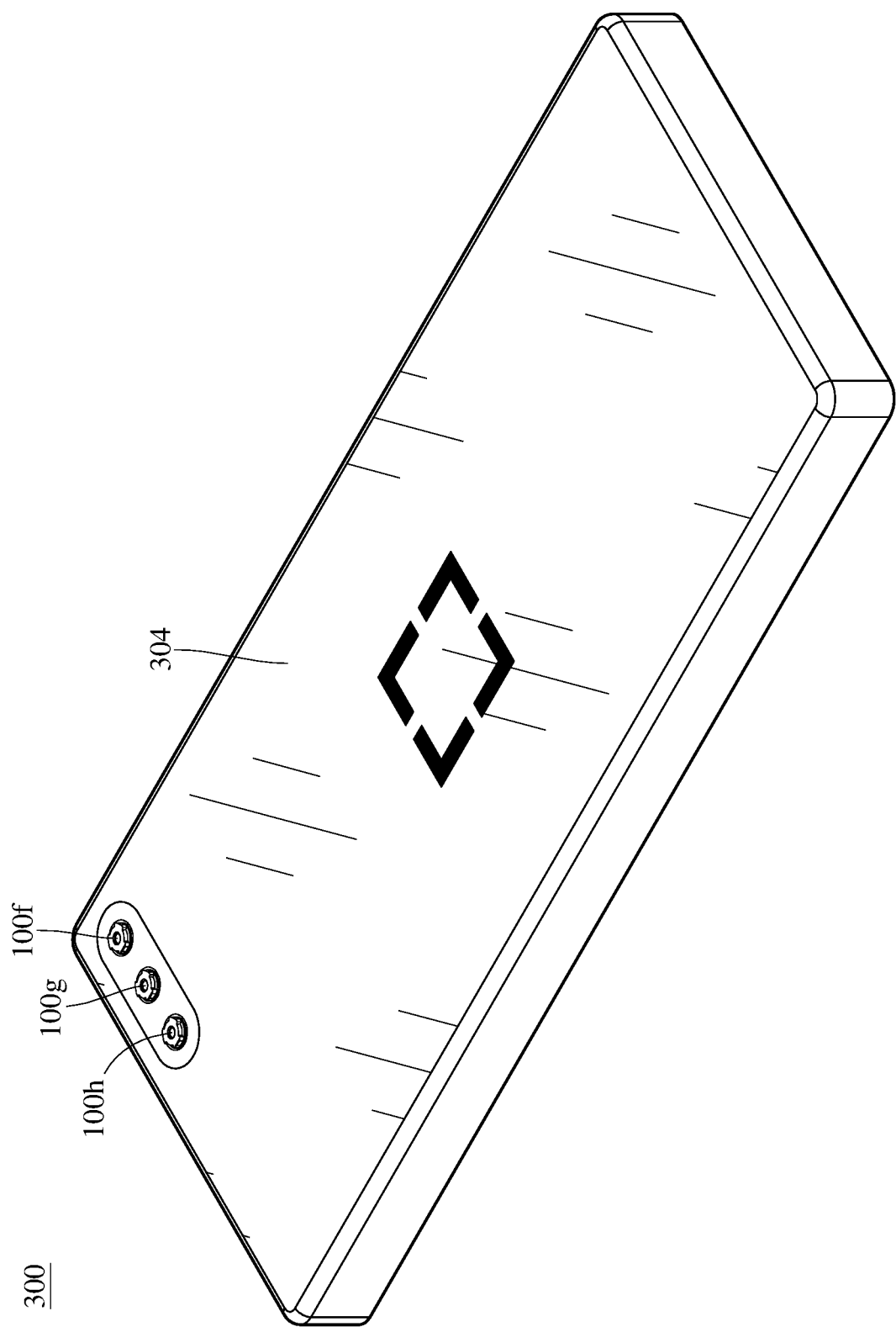
FIG. 25 is another perspective view of the electronic device in FIG. 24.
Figure 26:
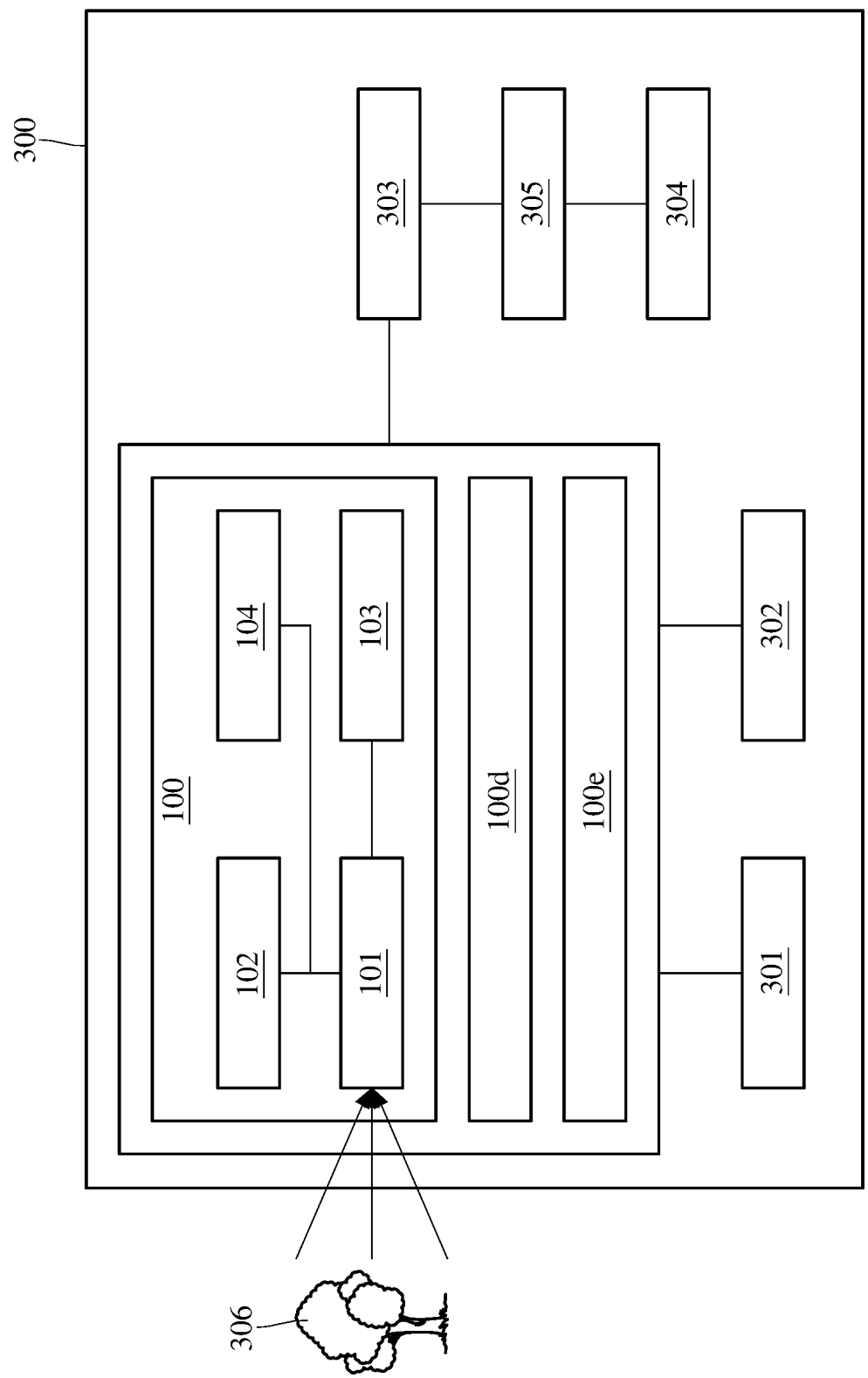
FIG. 26 is a block diagram of the electronic device in FIG. 24.

FIG. 24 is one perspective view of an electronic device according to the 13th embodiment of the present disclosure. FIG. 25 is another perspective view of the electronic device in FIG. 24. FIG. 26 is a block diagram of the electronic device in FIG. 24.

In this embodiment, an electronic device 300 is a smartphone including the image capturing unit 100 disclosed in the 11th embodiment, an image capturing unit 100d, an image capturing unit 100e, an image capturing unit 100f, an image capturing unit 100g, an image capturing unit 100h, a flash module 301, a focus assist module 302, an image signal processor 303, a display module 304 and an image software processor 305. The image capturing unit 100, the image capturing unit 100d and the image capturing unit 100e are disposed on the same side of the electronic device 300. The focus assist module 302 can be a laser rangefinder or a ToF (time of flight) module, but the present disclosure is not limited thereto. The image capturing unit 100f, the image capturing unit 100g, the image capturing unit 100h and the display module 304 are disposed on the opposite side of the electronic device 300, and the display module 304 can be a user interface, such that the image capturing units 100f, 100g, 100h can be front-facing cameras of the electronic device 300 for taking selfies, but the present disclosure is not limited thereto. Furthermore, each of the image capturing units 100d, 100e, 100f, 100g and 100h can include the optical photographing lens assembly of the present disclosure and can have a configuration similar to that of the image capturing unit 100. In detail, each of the image capturing units 100d, 100e, 100f, 100g and 100h can include a lens unit, a driving device, an image sensor and an image stabilizer, and can also include a reflective element for folding optical path. In addition, each of the lens unit of the image capturing units 100d, 100e, 100f, 100g and 100h can include the optical photographing lens assembly of the present disclosure, a barrel and a holder member for holding the optical photographing lens assembly.

The image capturing unit 100 is a wide-angle image capturing unit, the image capturing unit 100d is an ultra-wide-angle image capturing unit, the image capturing unit 100e is a telephoto capturing unit, the image capturing unit 100f is a wide-angle image capturing unit, the image capturing unit 100g is an ultra-wide-angle image capturing unit, and the image capturing unit 100h is a ToF image capturing unit. In this embodiment, the image capturing units 100, 100d and 100e have different fields of view, such that the electronic device 300 can have various magnification ratios so as to meet the requirement of optical zoom functionality. Moreover, the image capturing unit 100e can be a telephoto image capturing unit having a light-folding element configuration, such that the total track length of the image capturing unit 100e is not limited by the thickness of the electronic device 300. In addition, the image capturing unit 100h can determine depth information of the imaged object. In this embodiment, the electronic device 300 includes multiple image capturing units 100, 100d, 100e, 100f, 100g and 100h, but the present disclosure is not limited to the number and arrangement of image capturing units.

When a user captures images of an object 306, the light rays converge in the image capturing unit 100, 100d or 100e to generate images, and the flash module 301 is activated for light supplement. The focus assist module 302 detects the object distance of the imaged object 306 to achieve fast auto focusing. The image signal processor 303 is configured to optimize the captured image to improve image quality. The light beam emitted from the focus assist module 302 can be either conventional infrared or laser. In addition, the light rays may converge in the image capturing unit 100f, 100g or 100h to generate images. The display module 304 can include a touch screen, and the user is able to interact with the display module 304 and the image software processor 305 having multiple functions to capture images and complete image processing. Alternatively, the user may capture images via a physical button. The image processed by the image software processor 305 can be displayed on the display module 304.

14th Embodiment

Figure 27:
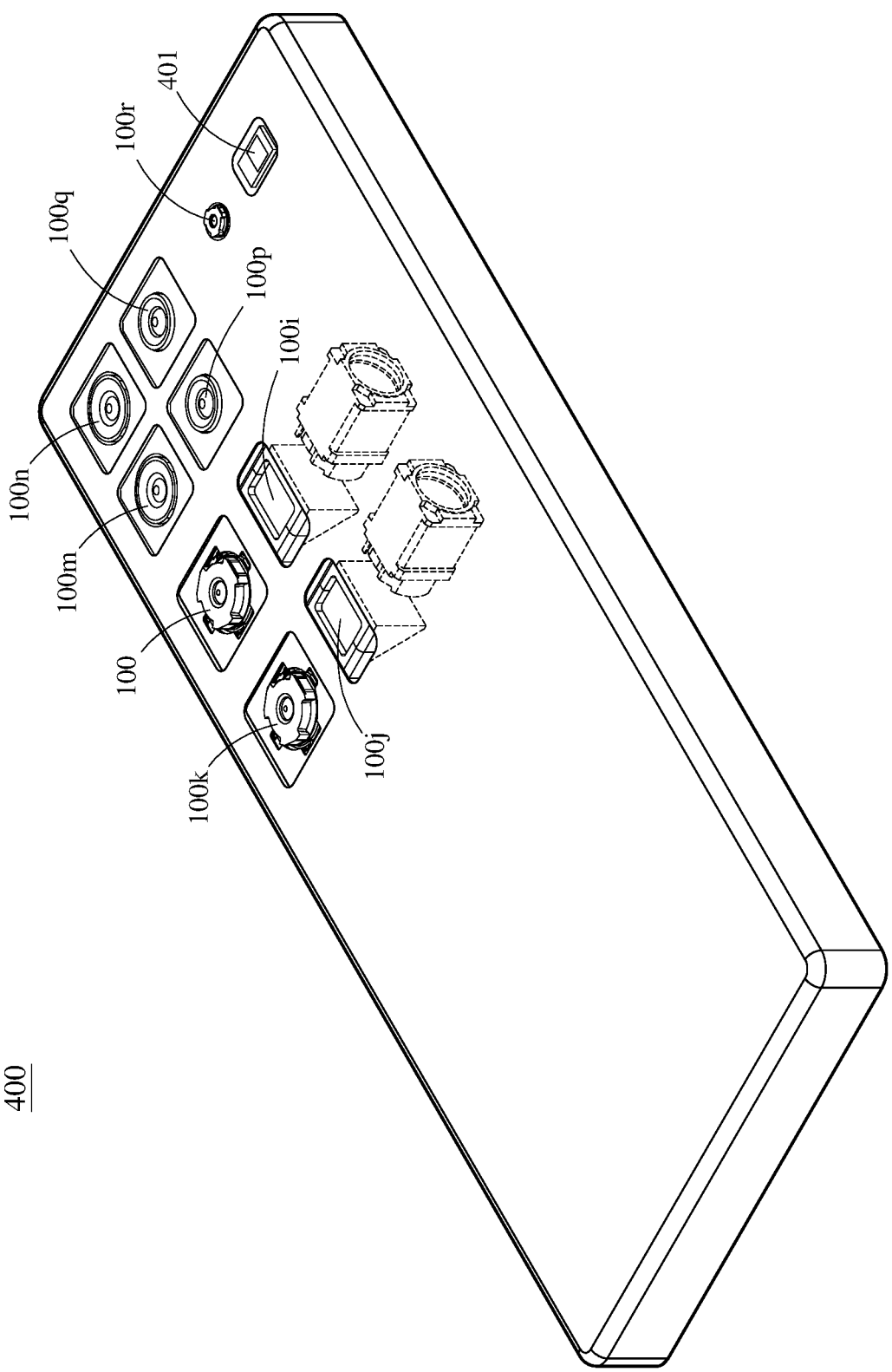
FIG. 27 is one perspective view of an electronic device according to the 14th embodiment of the present disclosure.

FIG. 27 is one perspective view of an electronic device according to the 14th embodiment of the present disclosure.

In this embodiment, an electronic device 400 is a smartphone including the image capturing unit 100 disclosed in the 11th embodiment, an image capturing unit 100i, an image capturing unit 100j, an image capturing unit 100k, an image capturing unit 100m, an image capturing unit 100n, an image capturing unit 100p, an image capturing unit 100q, an image capturing unit 100r, a flash module 401, a focus assist module, an image signal processor, a display module and an image software processor (not shown). The image capturing units 100, 100i, 100j, 100k, 100m, 100n, 100p, 100q and 100r are disposed on the same side of the electronic device 400, while the display module is disposed on the opposite side of the electronic device 400. Furthermore, each of the image capturing units 100, 100i, 100j, 100k, 100m, 100n, 100p, 100q and 100r can include the optical photographing lens assembly of the present disclosure and can have a configuration similar to that of the image capturing unit 100, and the details in this regard will not be provided again.

The image capturing unit 100 is a wide-angle image capturing unit, the image capturing unit 100i is a telephoto image capturing unit, the image capturing unit 100j is a telephoto image capturing unit, the image capturing unit 100k is a wide-angle image capturing unit, the image capturing unit 100m is an ultra-wide-angle image capturing unit, the image capturing unit 100n is an ultra-wide-angle image capturing unit, the image capturing unit 100p is a telephoto image capturing unit, the image capturing unit 100q is a telephoto image capturing unit, and the image capturing unit 100r is a ToF image capturing unit. In this embodiment, the image capturing units 100, 100i, 100j, 100k, 100m, 100n, 100p and 100q have different fields of view, such that the electronic device 400 can have various magnification ratios so as to meet the requirement of optical zoom functionality. Moreover, each of the image capturing units 100i and 100j can be a telephoto image capturing unit having a light-folding element configuration. The light-folding element configuration of each of the image capturing unit 100i and 100j can be similar to, for example, one of the structures shown in FIG. 30 to FIG. 32, which can be referred to aforementioned descriptions corresponding to FIG. 30 to FIG. 32, and the details in this regard will not be provided again. In addition, the image capturing unit 100r can determine depth information of the imaged object. In this embodiment, the electronic device 400 includes multiple image capturing units 100, 100i, 100j, 100k, 100m, 100n, 100p, 100q and 100r, but the present disclosure is not limited to the number and arrangement of image capturing units. When a user captures images of an object, the light rays converge in the image capturing unit 100, 100i, 100j, 100k, 100m, 100n, 100p, 100q or 100r to generate images, and the flash module 401 is activated for light supplement. Further, the subsequent processes are performed in a manner similar to the aforementioned embodiments, and the details in this regard will not be provided again.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the optical photographing lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, aerial cameras, wearable devices, portable video recorders and other electronic imaging devices.

The aforementioned description, for the purpose of explanation, has been described with reference to specific embodiments. It is to be noted that TABLES 1A-10C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical photographing lens assembly comprising six lens elements, the six lens elements being, in order from an object side to an image side along an optical path, a first lens element, a second lens element, a third lens element, a fourth lens element, a fifth lens element and a sixth lens element, and each of the six lens elements having an object-side surface facing toward the object side and an image-side surface facing toward the image side;

wherein the first lens element has positive refractive power, the fourth lens element has positive refractive power, the image-side surface of the fourth lens element is convex in a paraxial region thereof, the object-side surface of the fifth lens element has at least one concave critical point in an off-axis region thereof, the image-side surface of the fifth lens element is concave in a paraxial region thereof, the sixth lens element has negative refractive power, and the object-side surface of the sixth lens element is convex in a paraxial region thereof;

wherein the optical photographing lens assembly further comprises an aperture stop, an axial distance between the first lens element and the second lens element is T12, an axial distance between the second lens element and the third lens element is T23, a central thickness of the first lens element is CT1, a central thickness of the fourth lens element is CT4, a minimum value among Abbe numbers of all lens elements of the optical photographing lens assembly is Vmin, a focal length of the optical photographing lens assembly is f, a focal length of the second lens element is f2, a focal length of the fourth lens element is f4, an axial distance between the aperture stop and the image-side surface of the sixth lens element is SD, and the following conditions are satisfied:

$$0 < 10 \times T23/CT1 < 3.20;$$
$$10.0 < V\text{min} < 21.5;$$
$$-0.90 < f4/f2 < 0.15;$$
$$0.10 < (CT4 - T12)/CT1 < 0.50; \text{ and}$$
$$0.85 < SD/f < 1.50.$$

2. The optical photographing lens assembly of claim 1, wherein the object-side surface of the fifth lens element is convex in a paraxial region thereof, the image-side surface of the sixth lens element has at least one inflection point, the focal length of the optical photographing lens assembly is f, the focal length of the second lens element is f2, the focal length of the fourth lens element is f4, a focal length of the fifth lens element is f5, and the following condition is satisfied:

$$0.05 < (|f/f2| + |f/f5|)/|f/f4| < 1.50.$$

3. The optical photographing lens assembly of claim 1, wherein a maximum field of view of the optical photographing lens assembly is FOV, and the following condition is satisfied:

$$82.0 \text{ degrees} < FOV < 110.0 \text{ degrees}.$$

4. The optical photographing lens assembly of claim 1, wherein a curvature radius of the image-side surface of the second lens element is R4, a curvature radius of the object-side surface of the sixth lens element is R11, and the following condition is satisfied:

$$0.10 < (R4 - R11)/(R4 + R11) < 2.00.$$

5. The optical photographing lens assembly of claim 1, wherein a curvature radius of the object-side surface of the first lens element is R1, a curvature radius of the object-side surface of the sixth lens element is R11, and the following condition is satisfied:

$$0 < (R1 - R11)/(R1 + R11) < 1.00.$$

6. The optical photographing lens assembly of claim 1, wherein the axial distance between the first lens element and the second lens element is T12, the axial distance between the second lens element and the third lens element is T23, and the following condition is satisfied:

$$0.01 < T23/T12 < 0.70.$$

7. The optical photographing lens assembly of claim 1, wherein the focal length of the optical photographing lens assembly is f, a curvature radius of the object-side surface of the fifth lens element is R9, a curvature radius of the image-side surface of the fifth lens element is R10, and the following condition is satisfied:

$$0.50 < |f/R9| + f/R10 < 3.00.$$

8. The optical photographing lens assembly of claim 1, wherein the object-side surface of the third lens element is convex in a paraxial region thereof, a curvature radius of the image-side surface of the second lens element is R4, a curvature radius of the object-side surface of the third lens element is R5, and the following condition is satisfied:

$$0.10 < R5/R4 < 1.00.$$

9. The optical photographing lens assembly of claim 1, wherein a distance in parallel with an optical axis between a maximum effective radius position on the object-side surface of the first lens element and a maximum effective radius position on the image-side surface of the first lens element is ET1, the central thickness of the first lens element is CT1, and the following condition is satisfied:

$$0.60 < ET1/CT1 < 1.00.$$

10. The optical photographing lens assembly of claim 1, wherein a displacement in parallel with an optical axis from an axial vertex on the object-side surface of the first lens element to a maximum effective radius position on the object-side surface of the first lens element is SAG1R1, the central thickness of the first lens element is CT1, and the following condition is satisfied:

$$0.01 < SAG1R1/CT1 < 0.35.$$

11. The optical photographing lens assembly of claim 1, wherein a maximum effective radius of the object-side surface of the first lens element is Y1R1, a maximum image height of the optical photographing lens assembly is ImgH, and the following condition is satisfied:

$$0.15 < Y1R1/ImgH < 0.35.$$

12. The optical photographing lens assembly of claim 1, wherein a maximum effective radius of the object-side surface of the first lens element is Y1R1, a maximum effective radius of the image-side surface of the second lens element is Y2R2, and the following condition is satisfied:

$$0.80 < Y2R2/Y1R1 < 1.40.$$

13. An image capturing unit, comprising:
   the optical photographing lens assembly of claim 1; and
   an image sensor disposed on an image surface of the optical photographing lens assembly.

14. An electronic device, comprising:
   the image capturing unit of claim 13.

15. An optical photographing lens assembly comprising six lens elements, the six lens elements being, in order from an object side to an image side along an optical path, a first lens element, a second lens element, a third lens element, a fourth lens element, a fifth lens element and a sixth lens element, and each of the six lens elements having an object-side surface facing toward the object side and an image-side surface facing toward the image side;
   wherein the first lens element has positive refractive power, the fourth lens element has positive refractive power, the image-side surface of the fourth lens element is convex in a paraxial region thereof, the image-side surface of the fifth lens element is concave in a paraxial region thereof, the sixth lens element has negative refractive power, and the object-side surface of the sixth lens element is convex in a paraxial region thereof;
   wherein the optical photographing lens assembly further comprises an aperture stop disposed between an imaged object and the first lens element, a focal length of the optical photographing lens assembly is f, a focal length of the second lens element is f2, a focal length of the fourth lens element is f4, a focal length of the fifth lens element is f5, a focal length of the sixth lens element is f6, an axial distance between the second lens element and the third lens element is T23, a central thickness of the first lens element is CT1, a central thickness of the fourth lens element is CT4, a minimum value among Abbe numbers of all lens elements of the optical photographing lens assembly is Vmin, an Abbe number of the second lens element is V2, an Abbe number of the third lens element is V3, and the following conditions are satisfied:

$$0 < (|f/f2| + |f/f5|)/|f/f4| < 1.60;$$
$$0 < 10 \times T23/CT1 < 3.00;$$
$$10.0 < V\text{min} < 20.5;$$
$$0.01 < CT4/CT1 < 0.85;$$
$$-2.00 < f/f6 < -0.36; \text{ and}$$
$$0.01 < V2/V3 < 0.90.$$

16. The optical photographing lens assembly of claim 15, wherein at least one of the object-side surface and the image-side surface of the fifth lens element has at least one inflection point, the image-side surface of the sixth lens element has at least one convex critical point in an off-axis region thereof, the focal length of the optical photographing lens assembly is f, a curvature radius of the object-side surface of the first lens element is R1, and the following condition is satisfied:

$$0.70 < f/R1 < 2.00.$$

17. The optical photographing lens assembly of claim 15, wherein an axial distance between the object-side surface of the first lens element and an image surface is TL, a maximum image height of the optical photographing lens assembly is ImgH, and the following condition is satisfied:

$$0.50 < TL/ImgH < 1.40.$$

18. The optical photographing lens assembly of claim 15, wherein a curvature radius of the image-side surface of the second lens element is R4, a curvature radius of the image-side surface of the fifth lens element is R10, and the following condition is satisfied:

$$0 < (R4 - R10)/(R4 + R10) < 2.00.$$

19. The optical photographing lens assembly of claim 15, wherein an entrance pupil diameter of the optical photographing lens assembly is EPD, the central thickness of the first lens element is CT1, the central thickness of the fourth lens element is CT4, an axial distance between the first lens element and the second lens element is T12, and the following conditions are satisfied:

$$1.10 < EPD/(CT1 + T12) < 2.00; \text{ and}$$
$$0.30 < T12/CT4 < 1.00.$$

20. The optical photographing lens assembly of claim 15, wherein the focal length of the optical photographing lens assembly is f, a focal length of the first lens element is f1, a focal length of the third lens element is f3, the focal length of the sixth lens element is f6, and the following condition is satisfied:

$$0.90 < (|f/f3| + |f/f6|)/|f/f1| < 2.00.$$

21. The optical photographing lens assembly of claim 15, wherein an axial distance between the fifth lens element and the sixth lens element is T56, the central thickness of the first lens element is CT1, and the following condition is satisfied:

$$0.30 < T56/CT1 < 1.00.$$

22. The optical photographing lens assembly of claim 15, wherein the focal length of the sixth lens element is f6, a curvature radius of the object-side surface of the sixth lens element is R11, a curvature radius of the image-side surface of the sixth lens element is R12, and the following condition is satisfied:

$$5.00 < |f6/R11| + |f6/R12| < 20.00.$$

23. An optical photographing lens assembly comprising six lens elements, the six lens elements being, in order from an object side to an image side along an optical path, a first lens element, a second lens element, a third lens element, a fourth lens element, a fifth lens element and a sixth lens element, and each of the six lens elements having an object-side surface facing toward the object side and an image-side surface facing toward the image side;

wherein the first lens element has positive refractive power, the second lens element has negative refractive power, the fourth lens element has positive refractive power, the image-side surface of the fourth lens element is convex in a paraxial region thereof, the image-side surface of the fifth lens element is concave in a paraxial region thereof, the sixth lens element has negative refractive power, and the object-side surface of the sixth lens element is convex in a paraxial region thereof;

wherein the optical photographing lens assembly further comprises an aperture stop disposed between an imaged object and the first lens element, a focal length of the optical photographing lens assembly is f, a focal length of the second lens element is f2, a focal length of the fourth lens element is f4, a focal length of the fifth lens element is f5, a minimum value among Abbe numbers of all lens elements of the optical photographing lens assembly is Vmin, a central thickness of the first lens element is CT1, a central thickness of the fourth lens element is CT4, an axial distance between the first lens element and the second lens element is T12, an axial distance between the second lens element and the third lens element is T23, an axial distance between the third lens element and the fourth lens element is T34, an axial distance between the fifth lens element and the sixth lens element is T56, a curvature radius of the image-side surface of the fifth lens element is R10, a curvature radius of the object-side surface of the sixth lens element is R11, and the following conditions are satisfied:

$$0 < (|f/f2| + |f/f5|)/|f/f4| < 1.60;$$

$$10.0 < V\text{min} < 20.5;$$

$$0.10 < (CT4 - T12)/CT1 < 0.50;$$

$$0.10 < R11/R10 < 1.50;$$

$$0.30 < T12/T34 < 2.00; \text{ and}$$

$$0.01 < (T23 + T56)/CT1 < 1.00.$$

24. The optical photographing lens assembly of claim 23, wherein the axial distance between the first lens element and the second lens element is T12, the axial distance between the second lens element and the third lens element is T23, an axial distance between the fourth lens element and the fifth lens element is T45, and the following condition is satisfied:

$$0.01 < (T23 + T45)/T12 < 1.60.$$

25. The optical photographing lens assembly of claim 23, wherein a curvature radius of the object-side surface of the first lens element is R1, a curvature radius of the image-side surface of the sixth lens element is R12, and the following condition is satisfied:

$$0.01 < R12/R1 < 0.60.$$

26. The optical photographing lens assembly of claim 23, wherein a curvature radius of the image-side surface of the second lens element is R4, the curvature radius of the object-side surface of the sixth lens element is R11, and the following condition is satisfied:

$$0.01 < |R11/R4| < 0.50.$$

27. The optical photographing lens assembly of claim 23, wherein a focal length of the third lens element is f3, a focal length of the sixth lens element is f6, and the following condition is satisfied:

$$0.45 < |f6/f3| < 2.00.$$

28. The optical photographing lens assembly of claim 23, wherein the focal length of the optical photographing lens assembly is f, the curvature radius of the image-side surface of the fifth lens element is R10, and the following condition is satisfied:

$$0.50 < f/R10 < 2.00.$$

29. The optical photographing lens assembly of claim 23, wherein a displacement in parallel with an optical axis from an axial vertex on the object-side surface of the first lens element to a maximum effective radius position on the object-side surface of the first lens element is SAG1R1, a curvature radius of the object-side surface of the first lens element is R1, and the following condition is satisfied:

$$0.10 < 10 \times SAG1R1/R1 < 1.50.$$

30. The optical photographing lens assembly of claim 23, wherein the focal length of the optical photographing lens assembly is f, the focal length of the second lens element is f2, the focal length of the fourth lens element is f4, the focal length of the fifth lens element is f5, a focal length of the sixth lens element is f6, the axial distance between the first lens element and the second lens element is T12, the axial distance between the second lens element and the third lens element is T23, the axial distance between the third lens element and the fourth lens element is T34, the axial distance between the fifth lens element and the sixth lens element is T56, the central thickness of the first lens element is CT1, the central thickness of the fourth lens element is CT4, the minimum value among Abbe numbers of all lens elements of the optical photographing lens assembly is Vmin, an Abbe number of the second lens element is V2, an Abbe number of the third lens element is V3, an axial distance between the aperture stop and the image-side surface of the sixth lens element is SD, the curvature radius of the image-side surface of the fifth lens element is R10, the curvature radius of the object-side surface of the sixth lens element is R11, and the following conditions are satisfied:

$$0.26 \leq (|f/f2| + |f/f5|)/|f/f4| \leq 1.22;$$

$$0.50 \leq 10 \times T23/CT1 \leq 2.25;$$

$$16.3 \leq Vmin \leq 19.5;$$

$$-0.73 \leq f4/f2 \leq 0.05;$$

$$0.15 \leq (CT4 - T12)/CT1 \leq 0.43;$$

$$0.95 \leq SD/f \leq 1.24;$$

$$0.40 \leq CT4/CT1 \leq 0.80;$$

$$-1.13 \leq f/f6 \leq -0.50;$$

$$0.29 \leq V2/V3 \leq 0.52;$$

$$0.23 \leq R11/R10 \leq 1.14;$$

$$0.53 \leq T12/T34 \leq 1.27; \text{ and}$$

$$0.47 \leq (T23 + T56)/CT1 \leq 0.87.$$

* * * * *